US010977551B2

(12) United States Patent
Van Seijen et al.

(10) Patent No.: US 10,977,551 B2
(45) Date of Patent: *Apr. 13, 2021

(54) HYBRID REWARD ARCHITECTURE FOR REINFORCEMENT LEARNING

(71) Applicant: Microsoft Technology Licensing, LLC, Redmond, WA (US)

(72) Inventors: Harm Hendrik Van Seijen, Montreal (CA); Seyed Mehdi Fatemi Booshehri, Montreal (CA); Romain Michel Henri Laroche, Verdun (CA); Joshua Samuel Romoff, Montreal (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 897 days.

This patent is subject to a terminal disclaimer.

(21) Appl. No.: 15/634,914

(22) Filed: Jun. 27, 2017

(65) Prior Publication Data
US 2018/0165603 A1   Jun. 14, 2018

Related U.S. Application Data

(60) Provisional application No. 62/434,165, filed on Dec. 14, 2016, provisional application No. 62/508,340, filed on May 18, 2017, provisional application No. 62/524,461, filed on Jun. 23, 2017.

(51) Int. Cl.
*G06N 3/08*   (2006.01)
*G06N 5/04*   (2006.01)
*G06N 20/00*   (2019.01)
*G06N 3/00*   (2006.01)
(Continued)

(52) U.S. Cl.
CPC .............. *G06N 3/08* (2013.01); *G06N 3/006* (2013.01); *G06N 3/0454* (2013.01); *G06N 3/084* (2013.01); *G06N 5/043* (2013.01); *G06N 20/00* (2019.01); *G06N 7/005* (2013.01)

(58) Field of Classification Search
None
See application file for complete search history.

(56) References Cited

U.S. PATENT DOCUMENTS

| 7,837,543 B2 | 11/2010 | Graepel et al. |
| 2010/0332281 A1 | 12/2010 | Horvitz et al. |
| 2015/0102945 A1 | 4/2015 | El-tantawy et al. |

(Continued)

FOREIGN PATENT DOCUMENTS

| CN | 102207928 A | 10/2011 |
| CN | 103248693 A | 8/2013 |

OTHER PUBLICATIONS

Ghavamzadeh et al., Extending Hierarchical Reinforcement Learning to Continuous-Time, Average-Reward, and Multi-Agent Models, University of Massachusetts-Amherst, CMPSCI Technical Report Jul. 3-23, 2003, Total pp. 35 (Year: 2003).*

(Continued)

*Primary Examiner* — Alan Chen

(57) ABSTRACT

Aspects provided herein are relevant to machine learning techniques, including decomposing single-agent reinforcement learning problems into simpler problems addressed by multiple agents. Actions proposed by the multiple agents are then aggregated using an aggregator, which selects an action to take with respect to an environment. Aspects provided herein are also relevant to a hybrid reward model.

17 Claims, 26 Drawing Sheets

(51) Int. Cl.
G06N 3/04 (2006.01)
G06N 7/00 (2006.01)

(56) References Cited

U.S. PATENT DOCUMENTS

2016/0063992 A1 3/2016 Selfridge
2017/0154123 A1 6/2017 Yurchenko et al.
2018/0165602 A1 6/2018 Van seijen et al.

OTHER PUBLICATIONS

Chen et al., Hybrid MDP based integrated hierarchical Q-learning, Science China Information Sciences, vol. 54, No. 11, Nov. 2011, pp. 2279-2294 (Year: 2011).*
Hwang et al., Fusion of Multiple Behaviors Using Layered Reinforcement Learning, IEEE Transactions on Systems, Man, and Cybernetics—Part A: Systems and Humans, vol. 42, No. 4, Jul. 2012, pp. 999-1004 (Year: 2012).*
Iima et al., Reinforcement Learning through Interaction among Multiple Agents, SICE-ICASE International Joint Conference 2006 Oct. 18-21, 2006, pp. 2457-2462 (Year: 2006).*
Rosenblatt, Optimal Selection of Uncertain Actions by Maximizing Expected Utility, Autonomous Robots vol. 9, No. 1, pp. 17-25 (Year: 2000).*
Thomas, Philip S., "Policy gradient coagent networks", In Proceedings of the 24th International Conference on Neural Information Processing Systems, Dec. 12, 2011, pp. 1-9.
Thomas, et al., "Conjugate Markov decision processes", In Proceedings of the Twenty-Eighth International Conference on Machine Learning, Jun. 28, 2011, 8 pages.
Deahl, "Sorry humans, Microsoft's AI is the first to reach a perfect Ms. Pac-Man score," The Verge [online]. Retrieved from the Internet: <URL: https://www.theverge.com/2017/6/14/15801700/microsoft-ai-perfect-ms-pac-man-score>, Jun. 14, 2017, 4 pages.
Laroche, "Multi-Advisor Reinforcement Learning." Retrieved from the Internet: <URL: https://fr.arxiv.org/pdf/1704.00756>, Apr. 3, 2017, 10 pages.
Maluuba, "Hybrid Reward Architecture (HRA) Achieving superhuman performance on Ms. Pac-Man." Retrieved from the Internet: <URL: http://www.maluuba.com/blog/2017/6/14/hra>, Jun. 14, 2017, 10 pages.
Maluuba "Hybrid Reward Architecture (HRA) Solving complex tasks with reinforcement learning." Retrieved from the Internet: <URL: http://www.maluuba.com/hra>, Jun. 23, 2017, 5 pages.
Simonite, "Microsoft Masters Ms. Pac-Man with a Horde of AI Agents," Wired [online] Jun. 14, 2017. Retrieved from the Internet: <URL: https://www.wired.com/story/mircosoftaimspacman/>, 6 pages.
Van Seijen, "Improving Scalability of Reinforcement Learning by Separation of Concern." Retrieved from the Internet: (https://arxiv.org/pdf/1612.05159v1.pdf>, Dec. 15, 2016, 10 pages.
Van Seijen, "Separation of Concerns in Reinforcement Learning." Retrieved from the Internet: <URL: https://arxiv.org/pdf/arXiv:1612.05159v2>, Mar. 28, 2017, 10 pages.
Van Seijen et al., "Hybrid Reward Architecture for Reinforcement Learning." Retrieved from the Internet: <URL: https://arxiv.org/abs/1706.04208>, Jun. 13, 2017, 15 pages.
Russell, et al., "Q-Decomposition for Reinforcement Learning Agents", In Proceedings of the Twentieth International Conference on Machine Learning, Aug. 21, 2003, 8 pages.
Melo, et al., "Learning of Coordination: Exploiting Sparse Interactions in Multiagent Systems", In Proceedings of 8th International Conference on Autonomous Agents and Multiagent Systems, May 10, 2009, pp. 773-780.
Xuan, et al., "Communication Decisions in Multi-agent Cooperation: Model and Experiments", In Proceedings of the fifth international conference on Autonomous agents, May 28, 2001, 8 pages.
Crites, et al., "Elevator Group Control Using Multiple Reinforcement Learning Agents", In Journal of Machine Learning, vol. 33, Issue 2-3, Nov. 1998, pp. 252-262.

Bacon, et al., "The Option-Critic Architecture", In Journal of Computing Research Repository, Sep. 2016, 9 pages.
Barto, et al., "Recent advances in hierarchical reinforcement learning", In Journal of Discrete Event Dynamic Systems, vol. 13, Issue 4, Oct. 2003, pp. 41-77.
Busoniu, et al., "Multi-agent reinforcement learning: An overview", In Publication of Springer-Verlag Berlin Heidelberg, 2010, pp. 1-42.
Simsek, et al., "Identifying useful subgoals in reinforcement learning by local graph partitioning", In Proceedings of the 22nd International Conference on Machine Learning, Aug. 7, 2005, pp. 816-823.
Dietterich, Thomas A, "Hierarchical reinforcement learning with the MAXQ value function decomposition", In Journal of Artificial Intelligence Research, vol. 13, Issue 1, Aug. 2000, pp. 1-64.
Foerster, et al., "Learning to communicate with deep multi-agent reinforcement learning", In Proceedings of 30th Conference on Neural Information Processing Systems, Dec. 9, 2016, pp. 1-9.
Heess, et al., "Learning and Transfer of Modulated Locomotor Controllers", In Journal of Computing Research Repository, Oct. 2016, pp. 1-13.
Hengst, Bernhard, "Discovering Hierarchy in Reinforcement Learning with HEXQ", In Proceedings of the Nineteenth International Conference on Machine Learning, Jul. 8, 2002, 8 pages.
Konidaris, et al., "Skill discovery in continuous reinforcement learning domains using skill chaining", In Proceedings of 23rd Annual Conference on Neural Information Processing Systems, Dec. 7, 2009, pp. 1-9.
Kulkarni, et al., "Hierarchical deep reinforcement learning: Integrating temporal abstraction and intrinsic motivation", In Proceedings of 30th Conference on Neural Information Processing Systems, Dec. 9, 2016, pp. 1-9.
Machado, et al., "Learning Purposeful Behaviour in the Absence of Rewards", In Proceedings of 33rd International Conference on Machine Learning, Jun. 19, 2016, 9 pages.
McGovern, et al., "Automatic Discovery of Subgoals in Reinforcement Learning using Diverse Density", In Proceedings of 18th International Conference on Machine Learning, Jun. 28, 2001, pp. 1-8.
Menache, et al., "Q-Cut—Dynamic Discovery of Sub-Goals in Reinforcement Learning", In Proceedings of the 13th European Conference on Machine Learning, Aug. 19, 2002, 12 pages.
Mnih, et al., "Recurrent Models of Visual Attention", In Proceedings of Annual Conference on Neural Information Processing Systems, Dec. 8, 2014, pp. 1-9.
Mnih, et al., "Human-level control through deep reinforcement learning", In Proceedings of Nature, vol. 518, Feb. 26, 2015, pp. 529-533.
Shoham, et al., "Multiagent Systems: Algorithmic, Game-Theoretic, and Logical Foundations", In Publication of Cambridge University Press, Aug. 14, 2008, 533 pages.
Sutton, et al., "Between MDPs and semi-MDPs: A framework for temporal abstraction in reinforcement learning", In Journal of Artificial Intelligence, vol. 112, Issue 1-2, Aug. 1999, pp. 181-211.
Whitehead, Steven D., "A complexity analysis of cooperative mechanisms in reinforcement learning", In Proceedings of the 9th National Conference on Artificial Intelligence, vol. 2, Jul. 14, 1991, pp. 607-613.
Bohmer, et al., "Autonomous learning of state representations for control: An emerging field aims to autonomously learn state representations for reinforcement learning agents from their real-world sensor observations", In German Journal on Artificial Intelligence, vol. 29, Issue 4, Nov. 2015, pp. 1-11.
Breiman, Leo, "Bagging predictors", In Journal of Machine Learning, vol. 24 Issue 2, Aug. 1996, pp. 124-140.
Breiman, Leo, "Random forests", In Journal of Machine Learning, vol. 45, Issue 1, Oct. 2001, pp. 1-32.
Dayan, et al., "Feudal reinforcement learning", In Proceedings of the 7th Annual Conference on Neural Information Processing Systems, 1993, pp. 1-8.
Dietterich, Thomas G., "Ensemble methods in machine learning", In Proceedings of the First International Workshop on Multiple Classifier Systems, Jun. 21, 2000, pp. 1-15.

(56) References Cited

OTHER PUBLICATIONS

Faußer, et al., "Ensemble methods for reinforcement learning with function approximation", In International Workshop on Multiple Classifier Systems, Jun. 15, 2011, pp. 56-65.
Fernandez, et al., "Probabilistic policy reuse in a reinforcement learning agent", In Proceedings of the 5th International Conference on Autonomous Agents and Multi-Agent Aystems, May 8, 2006, 8 pages.
Gabor, et al., "Multi-criteria reinforcement learning", In Proceedings of the 15th International Conference on Machine Learning, Jul. 24, 1998, 9 pages.
Glorot, et al., "Understanding the difficulty of training deep feedforward neural networks", In Proceedings of the 13th International Conference on Artificial Intelligence and Statistics, vol. 9, May, 2010, pp. 249-256.
Harutyunyan, et al., "Off-policy reward shaping with ensembles", In Proceedings of the Computing Research Repository, Feb. 2015, 8 pages.
Laroche, et al., "Algorithm selection of off-policy reinforcement learning algorithm", In Proceedings of the Computing Research Repository, Jan. 2017, 27 pages.
Laroche, et al., "Hybridisation of expertise and reinforcement learning in dialogue systems", In Proceedings of the 10th Annual Conference of the International Speech Communication Association, Sep. 6, 2009, 5 pages.
Papadimitriou, Christos H, "The euclidean travelling salesman problem is NP-complete", In Journal of Theoretical Computer Science, vol. 4, Issue 3, Jun. 1977, pp. 237-244.
Barr, et al., "Reinforcement learning with hierarchies of machines", In Proceedings of the 11th Advances in Neural Information Processing Systems, Nov. 30, 1998, pp. 1043-1049.
Summery, et al., "On-line Q-learning using connectionist systems", In Technical Report of University of Cambridge, Sep. 1994, pp. 1-20.
Shoham, et al., "Multi-agent reinforcement learning: a critical survey", In Technical Report of Stanford University, May 16, 2003, pp. 1-13.
Sun, et al., "Multi-agent reinforcement learning: weighting and partitioning", In Journal of Neural networks, vol. 12, Issue 4-5, Jun. 30, 1999, pp. 727-753.
Sutton, et al., "Reinforcement Learning: An Introduction", In Publication of MIT Press, Feb. 1998, 334 pages.
Sutton, et al., "Horde: A scalable real-time architecture for learning knowledge from unsupervised sensorimotor interaction", In Proceedings of the 10th International Conference on Autonomous Agents and Multi-Agent Systems, May 2, 2011, pp. 761-768.
Hasselt, et al., "Learning values across many orders of magnitude", In Proceedings of the 29th Advances in Neural Information Processing Systems, Dec. 5, 2016, 19 pages.
Seijen, et al., "Improving scalability of reinforcement learning by separation of concerns", In Proceedings of the Computing Research Repository, Dec. 2016, 10 pages.
Vezhnevets, et al., "Feudal networks for hierarchical reinforcement learning", In Proceedings of the Computing Research Repository, Mar. 2017, 12 pages.
Watkins, Christopher John Cornish Hellaby, "Learning from Delayed Rewards", In PhD thesis of Cambridge University, May 1, 1989, 241 pages.
Wiering, et al., "Ensemble algorithms in reinforcement learning", In Journal of IEEE Transactions on Systems, Man, and Cybernetics, vol. 38, Issue 4, Aug. 2008, pp. 1-6.
Bezdek, et al., "Local convergence analysis of grouped variable version of coordinate descent", In Journal of Optimization Theory and Applications, vol. 54, Issue 3, Sep. 1987, pp. 471-477.
Dietterich, Thomas G., "Ensemble learning", In Publication of MIT Press, Sep. 4, 2002, pp. 1-9.
Schmidhuber, Jurgen, "Formal theory of creativity, fun, and intrinsic motivation", In Journal of IEEE Transactions on Autonomous Mental Development, vol. 2, Issue 3, Sep. 2010, pp. 1-18.
Singh, et al., "Intrinsically motivated reinforcement learning", In Proceedings of Advances in Neural Information Processing Systems, Dec. 13, 2004, 8 pages.
"International Search Report & Written Opinion for PCT Patent Application No. PCT/US18/028743", dated Aug. 8, 2018, 15 Pages.
Schaul, et al., "Universal Value Function Approximators", In the Proceedings of the 32nd International Conference on Machine Learning, vol. 37, Jul. 11, 2015, 9 Pages.
Van Seijen, et al., "Hybrid Reward Architecture for Reinforcement Learning", IIn Journal of Computing Research Repository, Jun. 2017, pp. 1-15.
Watanabe, et al., "Instruction for Reinforcement Learning Agent Based on Sub-Rewards and Forgetting", In Proceedings of IEEE International Conference on Fuzzy Systems, Jul. 18, 2010, 7 pages.
Fu, et al., "A Reward Optimization Method Based on Action Subrewards in Hierarchical Reinforcement Learning", In Scientific World Journal, Jan. 28, 2014, pp. 1-6.
Ghavamzadeh, et al., "Hierarchical Average Reward Reinforcement Learning", In Journal of Machine Learning Research, vol. 8, Nov. 2007, pp. 2629-2669.
Non-Final Office Action Issued in U.S. Appl. No. 15/634,811, dated Jun. 10, 2020, 26 Pages.
Ghavamzadeh, et al., "Learning to Communicate and Act using Hierarchical Reinforcement Learning", In Proceedings of the Third International Joint Conference on Autonomous Agents and Multiagent Systems, Jul. 19, 2004, 8 Pages.
Dolgov, et al., "Graphical Models in Local, Asymmetric Multi-Agent Markov Decision Processes", In Proceedings of the Third International Joint Conference on Autonomous Agents and Multiagent Systems, Jul. 19, 2004, 8 Pages.
"Final Office Action Issued in U.S. Appl. No. 15/634,811", dated Dec. 24, 2020, 26 Pages.
Ghavamzadefi, et al., "Hierarchical multi-agent reinforcement learning", In Journal of Autonomous Agents and Multi-Agent Systems, vol. 13, Issue 2, Sep., 2006, pp. 197-229.

* cited by examiner

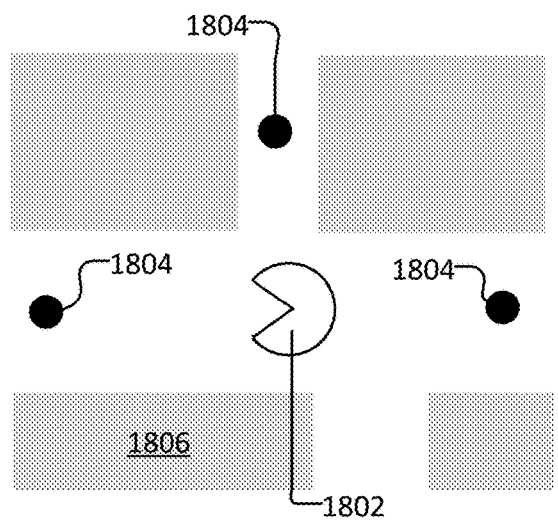
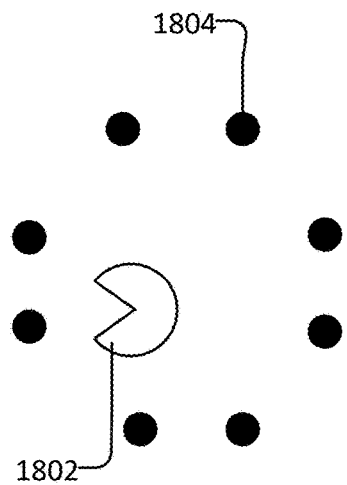
FIG. 18  FIG. 19
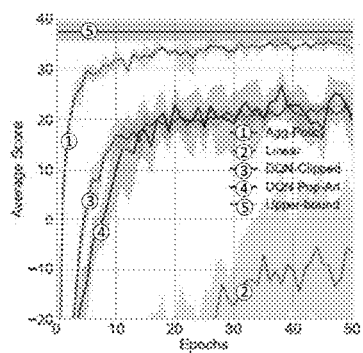
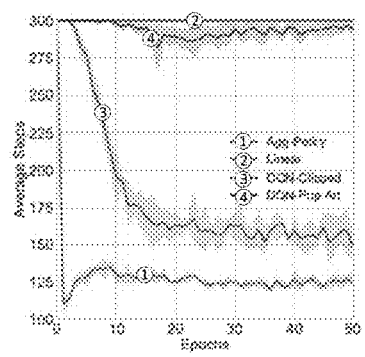
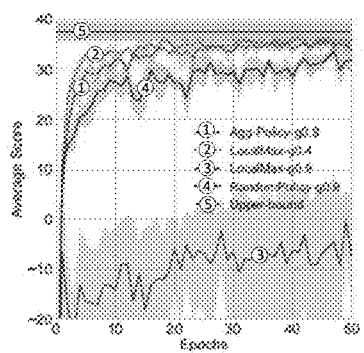
FIG. 20A  FIG. 20B  FIG. 20C

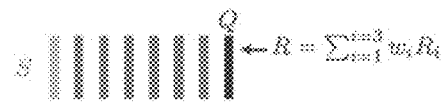
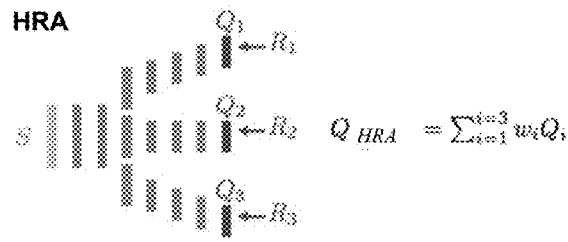
FIG. 22          FIG. 23
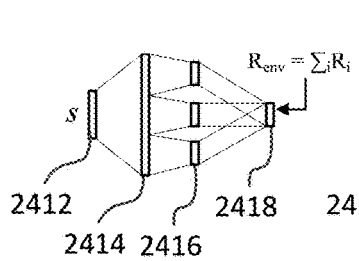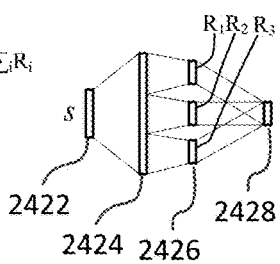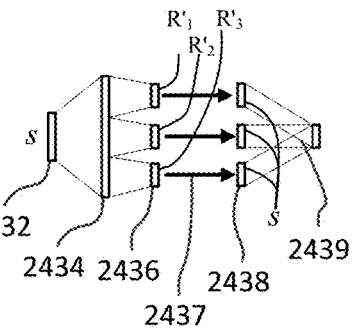
FIG. 24
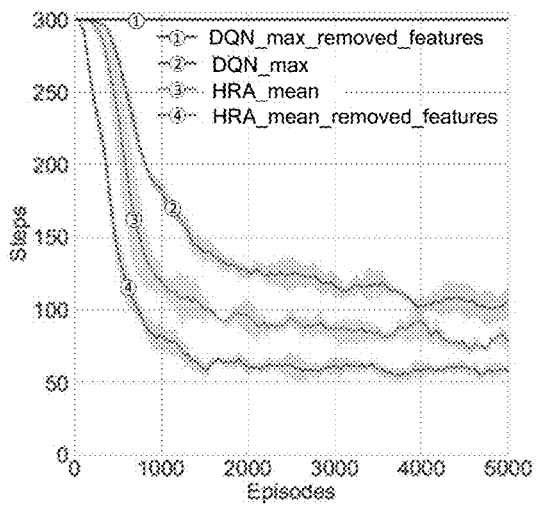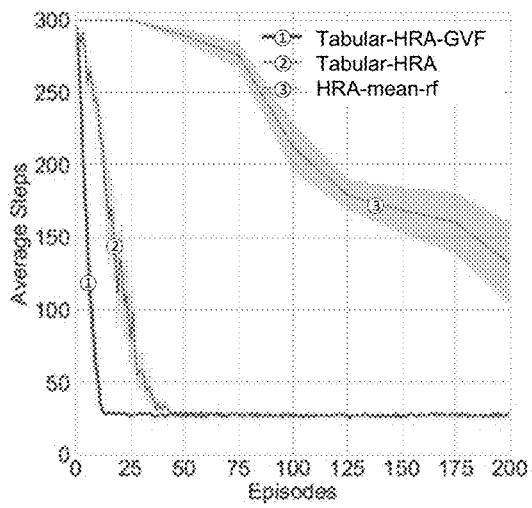
FIG. 25A          FIG. 25B

HYBRID REWARD ARCHITECTURE FOR REINFORCEMENT LEARNING

CROSS-REFERENCE TO RELATED APPLICATIONS

This application claims the benefit of U.S. Provisional Patent Application No. 62/434,165, filed Dec. 14, 2016, titled "Improving Scalability of Reinforcement Learning by Separation of Concerns"; U.S. Provisional Patent Application No. 62/508,340, filed May 18, 2017, titled "Hybrid Reward Architecture for Reinforcement Learning"; and U.S. Provisional Patent Application No. 62/524,461, filed Jun. 23, 2017, titled "Reward Architecture for Reinforcement Learning". The disclosures of each of these priority applications are hereby incorporated by reference in their entireties herein.

BACKGROUND

It is postulated that behavior is not the result of a single cognitive agent, but rather the result of a society of individually simple, interacting processes called agents. The power of this approach lies in specialization: different agents can have different representations, different learning processes, and so on. On a larger scale, society as a whole validates this approach: technological achievements are the result of many cooperating specialized agents.

In reinforcement learning (RL), where the goal is to learn a policy for an agent interacting with an initially unknown environment, breaking large tasks into smaller pieces has been undertaken. Specifically, there has been work on hierarchical RL methods, which decompose a task into hierarchical subtasks. Hierarchical learning can help accelerate learning on individual tasks by mitigating the exploration challenge of sparse-reward problems. One popular framework for this is the options framework, which extends the standard RL framework based on Markov decision processes (MDP) to include temporally-extended actions.

A challenge in RL is generalization. In traditional deep RL methods this is achieved by approximating the optimal value function with a low-dimensional representation using a deep network. While this approach works well in some domains, in domains where the optimal value function cannot easily be reduced to a low-dimensional representation, learning can be very slow and unstable.

It is with respect to these and other general considerations that example aspects, systems, and methods have been described. Also, although relatively specific problems have been discussed, it should be understood that the examples should not be limited to solving the specific problems identified in the background.

SUMMARY

A framework for solving a single-agent task by using multiple agents, each focusing on different aspects of the task, is provided. This approach has at least the following advantages: 1) it allows for specialized agents for different parts of the task, and 2) it provides a new way to transfer knowledge, by transferring trained agents. The framework generalizes the traditional hierarchical decomposition, in which, at any moment in time, a single agent has control until it has solved its particular subtask.

In an aspect, a framework is provided for communicating agents that aims to generalize the traditional hierarchical decomposition and allow for more flexible task decompositions. For example, decompositions where multiple subtasks have to be solved in parallel, or in cases where a subtask does not have a well-defined end but rather is a continuing process that needs constant adjustment (e.g., walking through a crowded street). This framework can be referred to as a separation-of-concerns framework.

To enable cooperation of the agents, a reward function for a specific agent is provided that not only has a component depending on the environment state, but also a component depending on the communication actions of the other agents. Depending on the specific mixture of these components, agents have different degrees of independence. In addition, because the reward in general is state-specific, an agent can show different levels of dependence in different parts of the state-space. Typically, in areas with high environment-reward, an agent will act independent of the communication actions of other agents; while in areas with low environment-reward, an agent's policy will depend strongly on the communication actions of other agents.

The framework can be seen as a sequential multi-agent decision making system with non-cooperative agents. This is a challenging setting, because from the perspective of one agent, the environment is non-stationary due to the learning of other agents. This challenge is addressed by defining trainer agents with a fixed policy. Learning with these trainer agents can occur, for example, by pre-training agents and then freezing their policy, or by learning in parallel using off-policy learning.

Disclosed embodiments further relate to improvements to machine learning and, in particular, reinforcement learning. In an example, there is a hybrid reward architecture that takes as input a decomposed reward function and learns a separate value function for each component reward function. Because each component typically depends only on a subset of all features, the overall value function is much smoother and can be more easily approximated by a low-dimensional representation, enabling more effective learning.

This application is related to versions 1 and 2 of publication arXiv:1612.05159 by van Seijen, et al., titled "Separation of Concerns in Reinforcement Learning, submitted on Dec. 15, 2016 (version 1), and Mar. 28, 2017 (version 2), the disclosures of which are hereby incorporated by reference in their entirety. This application is further related to arXiv: 1704.00756 by Laroche, et al., titled "Multi-Advisor Reinforcement Learning, submitted on Apr. 3, 2017, the disclosure of which is hereby incorporated by reference in its entirety.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawing figures, which form a part of this application, are illustrative of embodiments of systems and methods described below and are not meant to limit the scope of the invention in any manner, which scope is based on the claims.

FIG. 18 illustrates an example three-pellet attractor in Pac-Boy.

FIG. 19 illustrates an example situation in Pac-Boy without a no-op action.

FIG. 20A illustrates average scores of a multi-advisor model in Pac-Boy against baselines.

FIG. 20B illustrates average episode length of a multi-advisor model in Pac-Boy against baselines.

FIG. 20C illustrates average scores for different methods in Pac-Boy.

FIG. 22 illustrates an example single-head architecture.

FIG. 23 illustrates an example Hybrid Reward Architecture (HRA).

FIG. 24 illustrates example DQN, HRA, and HRA with pseudo-rewards architectures.

FIG. 25A illustrates example average steps over episodes of the fruit collection task.

FIG. 25B illustrates example average steps over episodes of the fruit collection task.

DETAILED DESCRIPTION

Figure 1:
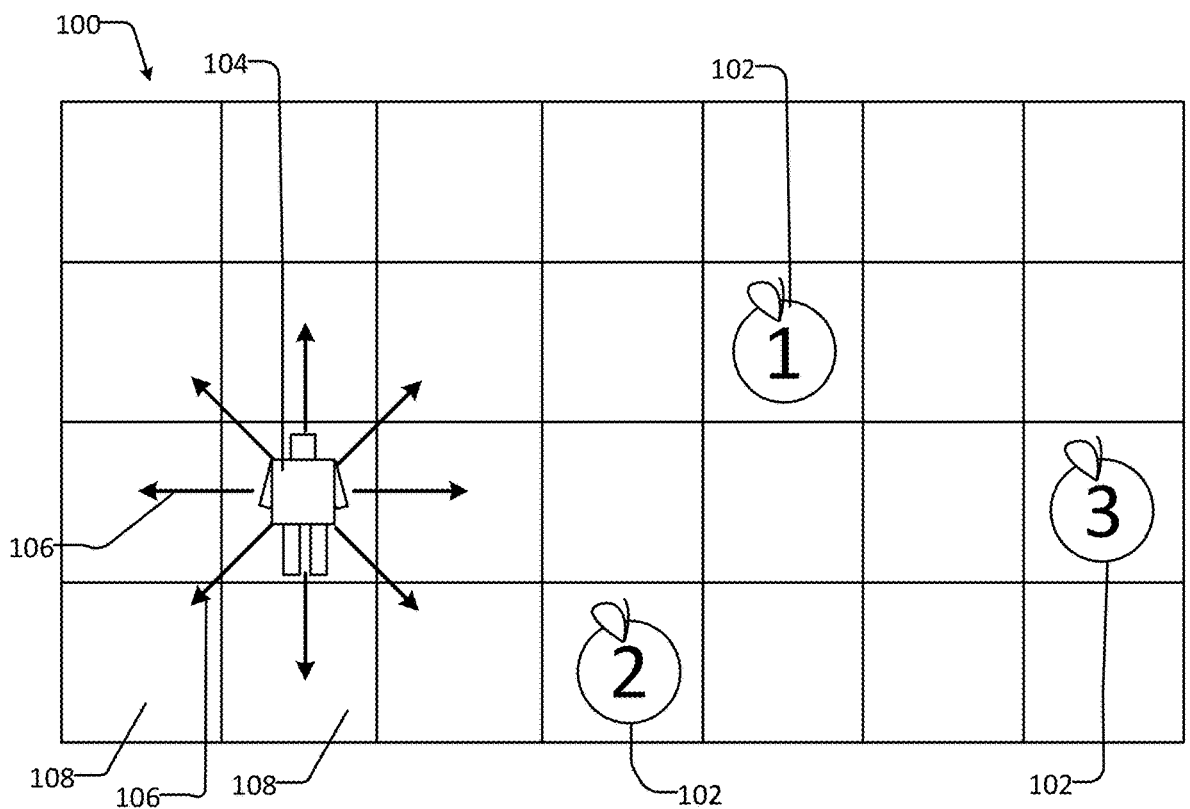
FIG. 1 illustrates an example scenario involving a robot reaching pieces of fruit scattered across a grid.

Hierarchical learning decomposes a value function in a hierarchical way. Options are temporally extended actions consisting of an initialization set, an option policy and a termination condition. Effectively, applying options to a Markov decision process (MDP) changes it into a semi-MDP, which may provide a mechanism for skill discovery.

With respect to option discovery, in the tabular setting, useful sub-goal states can be identified, for example, by using heuristics based on the visitation frequency, by using graph partitioning techniques, or by using the frequency with which state variables change. However, with function approximation, finding good sub-goals becomes significantly more challenging. In some cases, sub-goal states are identified so that only the option policy is learned. Option discovery may also be performed by identifying 'purposes' at the edge of a random agent's visitation area. Learning options towards such edge-purposes brings the agent quickly to a new region where it can continue exploration. An architecture is provided that may learn the policy over options, the options themselves, as well as their respective termination conditions. This is accomplished without defining any particular sub-goal and uses only the number of options known beforehand.

Hierarchical Reinforcement Learning (RL) in the context of deep reinforcement learning is also described. For instance, a high-level controller may specify a goal for a low-level controller. Once the goal is accomplished, the top-level controller selects a new goal for the low-level controller. The system can be trained in two phases: in the first phase the low-level controller is trained on a set of different goals; and in the second phase the high-level and low-level controllers are trained in parallel. In another example, the high-level controller can send a modulation signal to the low-level controller to affect the policy of the low-level controller.

An example multi-agent RL configuration includes multiple agents which are simultaneously acting on an environment and which receive rewards individually based on the joint actions. Such an example can be modelled as a stochastic game. In aspects, multi-agent systems can be divided into fully cooperative, fully competitive or mixed tasks (neither cooperative nor competitive). For a fully cooperative task, all agents share the same reward function. For instance, an Integrated Learning System (ILS), which integrates heterogeneous learning agents (such as search-based and knowledge-based) under a central controller through which the agents critique each other's proposals, may be employed. Alternatively, Learning with an External Critic (LEC) and Learning by Watching (LBW) advocate learning from other agents in a social setting. A society of n Q-learning agents, which are watching each other, can learn O(l/n) faster than a single Q-learning agent. Additionally, a framework of communicating agents based on deep neural networks to solve various complex tasks may be used. In a first approach, each agent learns its own network parameters, while treating the other agents as part of the environment. A second approach uses centralized learning and passes gradients between agents. For fully competitive tasks, which are typically a two-agent case, the agents have opposing goals (e.g., the reward function of one agent is the negative of the reward function of the other).

Separation of Concerns (SoC) improves multi-agent frameworks. For instance, SoC splits a single-agent problem into multiple parallel, communicating agents with simpler and more focused, but different objectives (e.g., skills). An introductory example is detailed below with reference to FIG. 1.

FIG. 1 illustrates an example layout 100 for this introductory example, including three pieces of fruit 102 and the robot 104 with arrows 106 indicating potential directions of movement within a grid of possible positions 108. In this example, the goal of the robot 104 is to reach each piece of fruit 102 scattered across the possible positions 108 as quickly as possible (e.g., in the fewest possible actions). In reinforcement learning, an agent controlling the robot 104 aims to maximize a return, $G_t$, which is the expected discounted sum of rewards: $G_t := \sum_{k=1}^{\infty} \gamma^{k-1} R_{t+k}$. The possible actions of the robot 104 include moving in different directions and a "no movement" (i.e., no-op) action. The robot 104 receives a reward of "+1" once all of the pieces of fruit 102 are reached, otherwise the reward is 0. The fruit 102 can be placed randomly at different positions 108 at the start of each episode.

By giving the agent a reward of +1 only if all the fruit 102 is reached, and by using $\gamma<1$, the optimal policy uses a minimal number of actions to reach all of the fruit 102. For a grid size of 10×10 squares and n pieces of fruit, the state space is $100 \times 100^n = 10^{2n+2}$. So for a large value of n, the state-space size can be enormous. However, large state-spaces are not necessarily an issue. By using deep reinforcement learning, a task can often be mapped to some low-dimensional representation that can accurately represent the optimal policy. The problem above, however, is an instance of the travelling salesman problem, which is known to be "nondeterministic polynomial time complete" (i.e., NP-complete), meaning that it is both in complexity class NP and NP-hard (i.e., at least as hard as the hardest problem in NP). This makes it highly unlikely that some low-dimensional representation can be found that can accurately represent the optimal policy.

While the reward in the above problem is very sparse (e.g., only when all of the fruit 102 has been reached does the agent see a reward), this is not what makes the problem NP-complete. Adding a potential-based intrinsic reward function to make the reward less sparse will not make the problem easier, because this maintains optimality of the solution, and hence the task remains NP-complete. The task can be made easier by adding domain knowledge in the form of a modified learning objective, which still yields a reasonable policy with respect to the performance objective but is easier to learn.

Consider a learning objective that give s+1 reward for reaching a piece of fruit, in combination with $\gamma<1$. For small $\gamma$, finding a low-dimensional representation becomes easier, because pieces of fruit 102 that are far away have minimal impact on the value function and can be ignored. A potential issue is that when all the nearby fruit 102 is reached, the agent might not know what to do (e.g., the small values from distant fruit 102 may be obscured by function approximation errors). On the other hand, a large $\gamma$ can be used that does not ignore distant fruit 102 but then finding a good low-dimensional representation can become much more challenging.

Alternatively, each piece of fruit 102 may be assigned to a specific agent whose only learning objective is to estimate the optimal action-value function for reaching that piece of fruit 102. This agent sees a reward of +1 only if its assigned fruit 102 is reached and otherwise sees no reward. The state-space for this agent can ignore all other fruit 102 because they are irrelevant for its value function. An aggregator can then make the final action selection from among the agents of each piece of fruit 102. Therefore, a single state-space of size $10^{2n+2}$ is replaced by n state-spaces, each having $10^4$ states. Moreover, these n agents can learn in parallel using off-policy learning. Therefore, the machine learning problem becomes much easier.

How well this multi-agent approach performs with respect to the performance objective (quickly reaching each piece of fruit) is influenced by the aggregator. The aggregator can, for example, use a voting scheme, select its action based on the summed action-values, or select its action according to the agent with the highest action-value. This last form of action selection could result in greedy behavior, with the agent always taking an action toward reaching the closet piece of fruit 102 that is closest, which correlates well with the performance metric. Other domains, however, might require a different aggregator.

Additionally, there may be an option-based approach. Having n different pieces of fruit 102 and one agent per piece of fruit 102 would result in n different options, with each option giving the policy for targeting one specific piece of fruit 102. These n options would act as (temporally-extended) actions to a higher-level agent, which would evaluate them based on its own high-level reward function. The state-space of this higher-level agent, however, would still be the same as the flat state-space ($10^{2n+2}$), so the learning problem would not be reduced.

Disclosed embodiments include agent configurations that decompose tasks in different ways. These agent configurations can reduce an overall state space and allow for improved machine learning performance by increasing a convergence speed, reducing the amount of processing and memory resources consumed, among other improvements to computer technology.

In a present embodiment, a single-agent task is defined by a Markov decision process (MDP), including the tuple $\langle X, A, p, r, \gamma \rangle$, where X is the set of states; A is the set of actions; $p(x'|x, a)$ indicates the probability of a transition to state $x' \in X$, when action $a \in A$ is taken in state $x \in X$; $r(x, a, x')$ indicates the reward for a transition from state x to state x' under action a; finally, the discount factor $\gamma$ specifies how future rewards are weighted with respect to the immediate reward. An agent that tries to solve an MDP without decomposition can be referred to as a "flat agent". A flat agent can be defined by an MDP including the tuple $\langle X^{flat}, A^{flat}, p^{flat}, r^{flat}, \gamma^{flat} \rangle$. A performance objective of a SoC model can be to maximize a flat return defined by $r^{flat}$ and $\gamma^{flat}$.

Actions a are taken at discrete time steps according to policy $\pi$, which maps states to actions. For example, actions a may be taken at discrete time steps t=0, 1, 2, . . . according to a policy $\pi$: $X \times A \rightarrow [0,1]$, which defines for each action the selection probability conditioned on the state. Each policy $\pi$ has a corresponding action-value function, $q_\pi(x, a)$, which gives the expected value of the return $G_t$ conditioned on the state $x \in X$ and action $a \in A$: $q_\pi(x, a) = \mathbb{E}\{G_t | X_t = x, A_t = a, \pi\}$. A goal is to maximize the discounted sum of rewards, also referred to as the return: $G_t := \Sigma_{k=1}^{\infty} \gamma^{k-1} R_{t+k}$.

Figure 2:
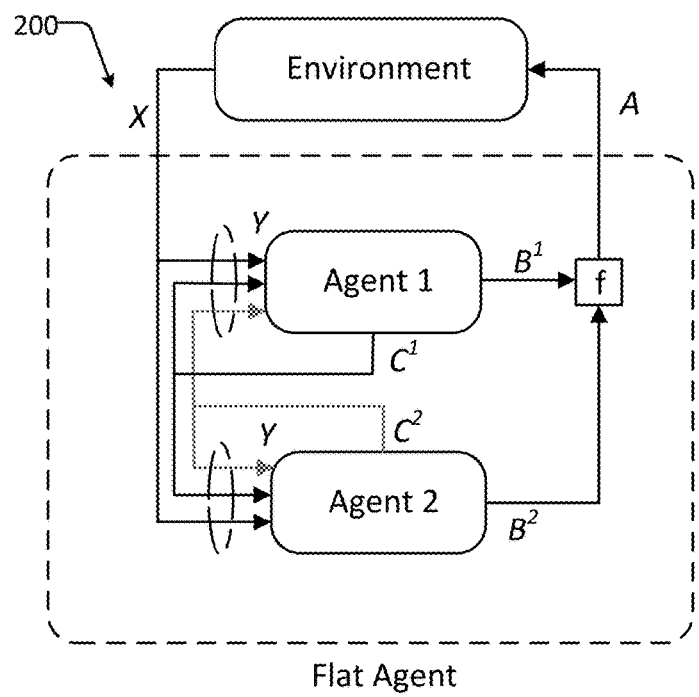
FIG. 2 illustrates an example separation of concern model for two agents.

FIG. 2 illustrates an example SoC model for taking actions with respect to an environment (illustrated as Environment). From the perspective of the environment, the SoC model can act no different from flat agent: the model takes an action A (as illustrated, A) with respect to the environment and can receive a state X (as illustrated, X) of the environment. But beyond this perspective, the illustrated SoC model includes two agents illustrated as Agent 1 and Agent 2. An example task can be expanded into a system of communicating agents as follows. For each agent i (as illustrated, Agent 1 and Agent 2), an environment action-set $B^i$ is defined (as illustrated, $B^1$ and $B^2$), as well as a communication action-set $C^i$ (as illustrated, $C^1$ and $C^2$), and a learning objective. The learning objective can be defined by a reward function, $r^i$, plus a discount factor, $\gamma^i$. An action-mapping function, $f$: $B^1 \times \ldots \times B^n \rightarrow a$, which maps the joint environment-action space to an action of the flat agent, is also defined (as illustrated, $f$). The agents share a common state-space Y (as illustrated, the dashed ellipse marked with Y) including the state-space of the flat agent plus the joint communication actions: $Y := x \times C^1 \times \ldots \times C^n$.

At time t, each agent i, observes state $Y_t := (X_t, c_{t-1}^1, \ldots, c_{t-1}^n) \in Y$. At each time t, each agent i can also select environment action $B_t^i$ and communication action $c_t^i \in c^i$, according to policy $\pi^i: Y \rightarrow B^i \times C^i$. Action $a_t = f(B_t^i, \ldots B_t^n)$ is fed to the environment, which responds with an updated state $x_{t+1}$. The environment also produces a reward $R_{t+1}$. In some examples, this reward is only used to measure the overall performance of the SoC model. For learning, each agent i uses its own reward function, $r^i: Y \times B^i \times C^i \times Y \rightarrow \mathbb{R}$, to compute overall reward, $R_{t+1}^i = r^i(Y_t, B_t^i, c_t^i, Y_{t+1})$.

A property of the SoC model can include that the reward function of a particular agent depends on the communication actions of the other agents. This can provide an incentive for an agent to react in response to communication, even in the case of full observability. For example, agent A can 'ask' agent B to behave in a certain way via a communication action that rewards agent B for this behavior.

Full observability is not an explicit requirement of the framework. The general model described above can be extended in different ways. In particular, extensions that allow for further specialization of agents will increase the benefit of the SoC model as a whole. Some examples are: state abstractions/information hiding: because the agents have different objectives, they can use different state-abstractions; action-selection at different frequencies; state-dependent gamma (such that terminal states can be defined); and state-dependent action sets.

Figure 3:
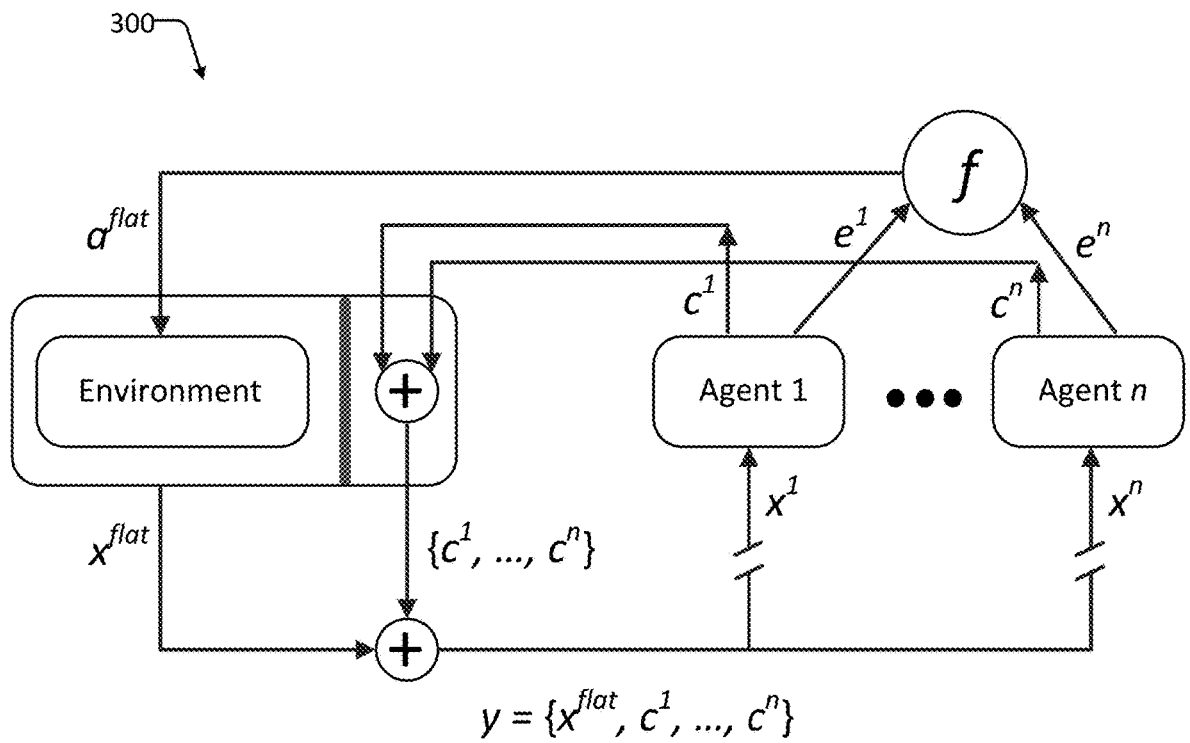
FIG. 3 illustrates an example generalized decomposition of a single-agent task using n agents.

FIG. 3 illustrates an example generalized way to decompose a single-agent task using n agents (as illustrated, Agent 1 through Agent n).

In aspects, at each time step t, an agent i chooses an action $a_t^i := (e_t^i, c_t^i) \in A^i := E^i \times C^i$, with $E^i$ being its set of environment actions (which affect $x^{flat}$), and $C^i$ being its set of communication actions (which do not affect $x^{flat}$). There can also be agents that only have communication actions or only environment actions.

As illustrated, the environment actions e (as illustrated, $e^1$ through $e^n$) of the agents i can be fed into an aggregator function $f$ (as illustrated, $f$). The aggregator function $f$ maps the environment actions $e^n$ to an action $a^{flat}$ (as illustrated $a^{flat}$). In an example, $f: E^1 \times \ldots \times E^n \rightarrow a^{flat}$. The communication actions of the agents are combined into a set of communication actions $\{c^1 \ldots c^n\}$. That set is subsequently combined with the flat state space from the environment to form the input state space of the agents. In this manner, the input space of an agent (illustrated as set $\gamma$) can be based on communication actions (illustrated as set $\{c^1, \ldots c^n\}$ from previous time steps and an updated flat state space $x^{flat}$ from the environment. The combination of the environment and the communication signals can be regarded as the environment of a meta-MDP. A single time step delay of communication actions can be used for a general setting where all agents communicate in parallel. In general, an agent may be partially observable or have limited visibility such that the agent does not see a full flat state-space or all communication actions. From the input space $\gamma$, each agent can receive a subset of the input space $x^i$ (as illustrated, $x^1$ through $x^n$). Formally, state space $x^i$ of an agent i is a projection of $Y := x^{flat} \times C^1 \times \ldots \times C^n$ onto a subspace of Y, such as: $x_i = \sigma^i(Y)$.

Additionally, each agent can have its own reward function, $r^i: x^i \times a^i \times x^i \rightarrow \mathbb{R}$, and a discount factor $\gamma^i: x^i \times a^i \times x^i \rightarrow [0, 1]$, and can aim to find a policy $\pi^i: x^i \times a^i \rightarrow [0,1]$ that maximizes the return based on these functions. In an example, $\Pi^i$ is defined to be the space of all policies for agent i.

Given a learning method that converges to the optimal policy on a single-agent MDP task, applying this method independently to each of the agents of the SoC model, the overall policy of the SoC model converges to a fixed point. Moreover, this fixed point can depend only on the SoC model and not on the particular learning algorithm that is being used.

For stability analysis, each implementation of the general SoC model can be divided into different categories. These categories can be based on the relation between the different agents.

By assigning a stationary policy to each of the agents, the sequence of random variables $Y_0, Y_1, Y_2, \ldots$, with $Y_t \in Y$, is a Markov chain. This can be formalized by letting $\mu = \{\pi^1 \ldots \pi^n\}$ define a set of stationary policies for all agents, and $M = \Pi^1 \times \ldots \times \Pi^n$ be the space of all such sets. In this case, the following holds:

$$\mathbb{P}(Y_{t+1}|Y_t,\mu) = \mathbb{P}(Y_{t+1}|Y_t,Y_{t-1}, \ldots, Y_0,\mu), \forall \mu \in \mathcal{M}$$

Further, let $\mu^{-i}$ be a set of all stationary policies for all agents but i and $M^{-i}$ be the space of all such sets. The following relation holds for each agent i:

$$\mathbb{P}(x_{t+1}^i|Y_t,a_t^i,\mu^{-i}) = \mathbb{P}(x_{t+1}^i|Y_t,a_t^i, \ldots, Y_0,a_0^i,\mu^{-i}),$$
$$\forall \mu^{-i} \in M^{-i}$$

For a stability analysis, the following equation can be assumed to hold true for all agents i:

$$\mathbb{P}(x_{t+1}^i|x_t^i,a_t^i,\mu^{-i}) = \mathbb{P}(x_{t+1}^i|Y_t,a_t^i,\mu^{-i}), \forall \mu^{-i} \in M^{-i}$$

In other words, when all agents except agent i use a stationary policy, the task for agent i becomes Markov. This trivially holds if agent i is not partially observable (e.g., if $X^i=Y$).

With the equation holding true for all agents i, agent i can be defined as independent of agent j if the policy of agent j does not affect the transition dynamics of agent i in any way. Formally, the definitions with $\mu^{-i,-j}$ to be a set of stationary policies to each agent except agent i and j, and $M^{-i,-j}$ to be the space of all such sets. Then, agent i is independent of agent j if:

$$\mathbb{P}(x_{t+1}^i|x_t^i,a_t^i,\mu^{-i,-j},\pi^j) = \mathbb{P}(x_{t+1}^i|x_t^i,a_t^i,\mu^{-i,-j},\hat{\pi}^j),$$
$$\forall \mu^{-i,-j} \in M^{-i,-j}, \pi^j, \hat{\pi}^j \in \Pi^j$$

Agent i is dependent on agent j if it is not independent of agent j. In aspects, dependency relations of SoC agents can be shown using a dependency graph.

Dependency

Figure 4:
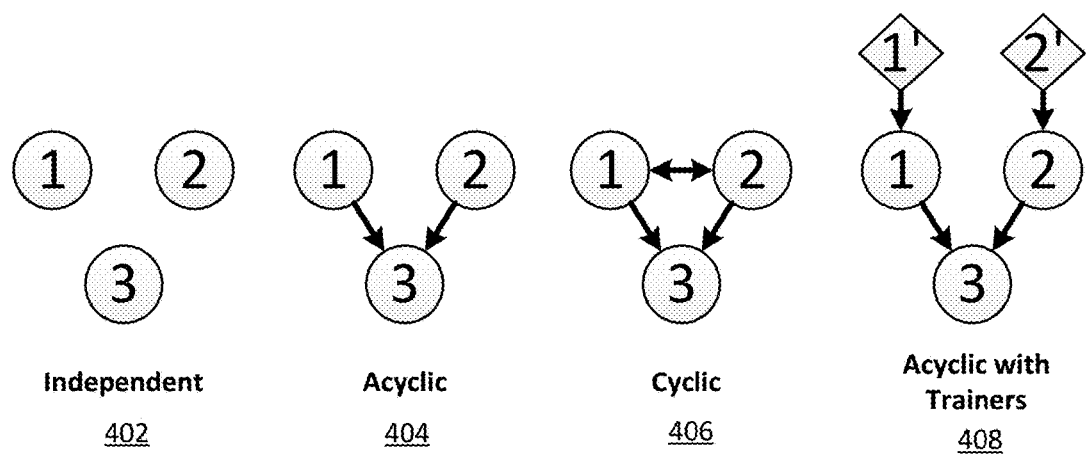
FIG. 4 illustrates subclasses of agents, including fully independent agents, agents with an acyclic relationship, agents with a cyclic relationship, and an acyclic relationship with trainer agents to break cycles in cyclic dependency graphs.

FIG. 4 illustrates subclasses of agents, including fully independent agents 402, agents with an acyclic relationship 404, agents with a cyclic relationship 406, and agents with an acyclic relationship 408 that uses trainer agents to break cycles in cyclic dependency graphs. An arrow pointing from an agent j (e.g., illustrated agents 1 and/or 2) to an agent i (e.g., illustrated as agents, 1, 2 and/or 3) means that agent i depends on agent j. Circles represent regular agents (e.g., agents 1, 2, 3) and diamonds represent trainer agents (e.g., trainer agents 1' and/or 2'). In general, a dependency graph can be acyclic (containing no directed cycles) or cyclic (containing directed cycles).

Independent Agents

As an example where agents are fully independent (e.g., as shown by relationship 402 in FIG. 4), consider the fruit-reaching robot example from FIG. 1, where there was only one piece of fruit at each position. The nine actions of an agent controlling the robot can be split into a horizontal action set $A^{horizontal}$ (e.g., west movement, east movement, and no-op actions) and a vertical action set $A^{vertical}$ (e.g., north movement, south movement, and no-op actions) such that $A^{flat}=A^{horizontal} \times A^{vertical}$. The task can then be decomposed into two kinds of agents: horizontal agents and vertical agents. The horizontal agents can see the state (agent$_{horizontal}$, fruit$_{horizontal}$) and receive a reward (e.g., +1) if agent$_{horizontal}$=fruit$_{horizontal}$. A vertical agent can be defined similarly for a vertical direction. With these agents being fully independent, it follows that the agents converge independent of each other. Hence, stable parallel learning occurs.

Agents with Acyclic Dependencies

When a dependency graph is acyclic (e.g., as shown by relationship 404 in FIG. 4), some of the agents depend on other agents, while some agents are fully independent. An example of such a relationship is shown in FIG. 5.

Figure 5:
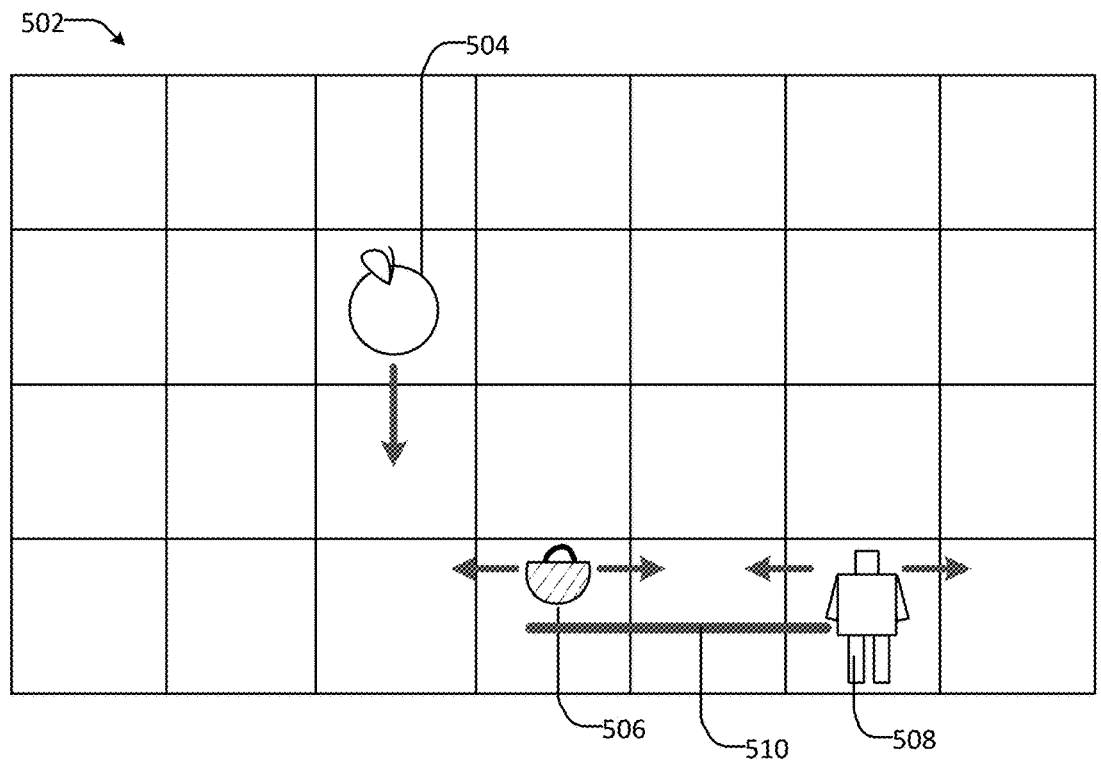
FIG. 5 illustrates a falling fruit example scenario.

FIG. 5 illustrates a falling fruit example scenario exhibiting an acyclic dependency graph.

Here, a robot 102 catches falling fruit 104 with a basket 106 to receive a reward. The basket 106 is attached to the robot's body 108 with an arm 110 that can be moved relative to the body 108. The robot 102 can move horizontally. Independent of that motion, the robot 102 can move the basket 106 a limited distance to the left or right. Here, $A^{flat}$ can be defined as: $A^{body} \times A^{arm}$. The scenario can be decomposed into an agent for the body 108 and an agent for the arm 110. The agent for the body 108 can control the body 108 by observing the horizontal position of the piece of fruit 104, the vertical position of the piece of fruit 104, and the horizontal position of the robot 102. The agent for the arm 110 can control the arm 110 and observe horizontal position of the piece of fruit 104, the vertical position of the piece of fruit 104, the horizontal position of the robot 102, and the horizontal position of the basket 106. The agent for the arm 110 can receive a reward if the piece of fruit 104 is caught. In this example, the agent for the body 108 is fully independent while the agent for the arm 110 depends on the agent for the body 108.

An acyclic graph contains some fully independent agents that have policies that will converge independent of other agents. Once these policies have converged, the agents that only depend on these agents will converge, and so on, until all agents have converged. Here too stable parallel learning occurs.

Agents with Cyclic Dependency

FIG. 4 also illustrates a relationship 406 exhibiting a cyclic dependency. For example, the behavior of agent 1 depends on the behavior of agents 2 and 3, the behavior of agent 2 depends on the behavior of agents 1 and 3, and the behavior of agent 3 depends on the behavior of agents 1 and 2. As an example, consider the falling fruit task of FIG. 5 where both agents see the full state-space and the agents receive a reward when the fruit 104 is caught. Now both agents depend on each other, forming a cyclic dependency.

For this setting, there is no guarantee of stable parallel learning, because the learning of one agent causes the environment to be non-stationary for the other agent, and vice versa. A possible approach for non-parallel learning is grouped coordinate descent, which involves iteratively learning the policy of one agent, while freezing the policies of the others, and rotating which policy learns until convergence occurs.

This approach may not provide convergence in the example case, though, because it requires that all agents have the same reward function. But a single iteration of grouped coordinate descent (or a few) gives a well-defined fixed point. And when there are no statements about how close a fixed point should be to the optimal policy, this fixed point is as good as any other fixed points. In aspects, the fixed point will depend strongly on the initial policies and the order in which the agents are updated.

The approach of pre-training a low-level agent with some fixed policy, then freezing its weights and training a high-level policy using the pre-trained agent, may be a more general update strategy.

Trainer Agents

Relationship 408 in FIG. 4 illustrates an acyclic relationship formed by transforming a cyclic graph into an acyclic graph using trainer agents. A trainer agent for an agent i defines fixed behavior for the agents that agent i depends on to ensure stable learning. It is to be appreciated with the benefit of this description that if the dependency graph is an acyclic graph, using single-agent Q-learning to train the different agents is straightforward. The trainer agent, assigned to a particular agent i, can be a fixed-policy agent that generates behavior for the agents on which agent i depends such that their affect on agent i is replaced by the affect of the trainer agent. Assigning a trainer agent to agent i implicitly defines a stationary MDP for agent i with a corresponding optimal policy that can be learned. Hence, agent i only depends on the trainer agent. The trainer agent itself is an independent agent. Hence, trainer agents can be used to break cycles in dependency graphs. Note that a cyclic graph can be transformed into an acyclic one in different ways. In practice, which agents are assigned trainer agents is a design choice that depends on how easy it is to define effective trainer behavior. In the simplest case, a trainer agent can just be a random or semi-random policy. As an example, in the cyclic graph 406 (shown in FIG. 4), agent 1 depended on the behavior of agents 2 and 3. In relationship 408, the dependency of agent 1 on agents 2 and 3 is replaced by the behavior of trainer agent 1' which generates behavior for agents 2 and 3 to replace their affect on agent 1 with the behavior of the trainer agent. Similarly, trainer agent 2' is defined, which generates behavior for agents 1 and 3 such that their affect on agent 1 is replaced by the behavior of trainer agent 2'.

Learning with trainer agents can occur in two ways. A first way is to pre-train agents with their respective trainer agents and then freeze their weights and train the rest of the agents. A second way is to train all agents in parallel with the agents that are connected to a trainer agent using off-policy learning to learn values that correspond to the policy of the trainer agent, while the behavior policy is generated by the regular agents.

Off-policy learning can be achieved by importance sampling, which corrects for the frequency at which a particular sample is observed under the behavior policy versus the frequency at which it is observed under the target policy. For example, consider agent i with actions $\{a_1^i, a_2^i\}$ that depends on agent j with actions $\{a_1^j, a_2^j\}$. Further, consider that agent i has a trainer agent i' attached to it mimicking behavior for agent j. In other words, agent i' also has actions $\{a_1^j, a_2^j\}$. At any moment in time, the actual behavior is generated by agents i and j. If at time t, agent j selects action $a_1^j$, while the selection probability for that action is $w_t^j$, and the selection probability for that same action is $w_t^{i'}$ for trainer agent i', then the off-policy update for agent i is:

$$Q(Y_t, a_t^i) \leftarrow Q(Y_t, a_t^i) + \frac{w_t^{i'}}{w_t^j} \alpha \Big( R_{t+1}^i + \max_a Q(Y_{t+1}, a) - Q(Y_t, a_t^i) \Big).$$

However, just because the use of trainers allows the previously-cyclic relationship to converge on a policy, does not necessarily mean that the obtained policy is a good policy. The optimality of policy is described in the following section.

Optimality

In the context of hierarchical learning, recursive optimality can be defined as a type of local optimality, in which the policy for each subtask is optimal given the policies of its child-subtasks. A recursive optimal policy is an overall policy that includes the combination of all locally-optimal policies. The recursive optimal policy is generally less desirable than the optimal policy for a flat agent, but can be easier to determine.

A similar form of optimality can be defined for a SoC model. If the dependency graph of a SoC model is acyclic (with or without added trainer agents), then a recursive optimal SoC policy $\eta := \langle \pi^1, \ldots, \pi^n \rangle$ can be defined as the policy including all locally optimal policies. In other words, policy $\pi^i$ is optimal for agent i, given the policies of the agents on which agent i depends.

The learning strategies discussed previously will generally converge to the recursive optimal policy. It is to be appreciated that how close this policy is to the optimal policy depends on the specific decomposition (e.g., the communication actions, the agent reward functions and, potentially, the employed trainer agents).

Ensemble Learning with SoC

Ensemble learning includes the use of a number of weak learners to build a strong learner. Weak learning can be difficult to use due to difficulties in framing RL problems into smaller problems. In some examples, there can be a combination of strong RL algorithms with policy voting or value function averaging to build an even stronger algorithm.

SoC allows for ensemble learning in RL with weak leaners through local state space and local reward definitions. In an ensemble setting, SoC agents can train their policies on the flat action space ($A^{flat}$) on the basis of a local state space ($X^i$) and reward function ($r^i$). Rather than sending actions to an aggregator, the agents may instead inform the aggregator of their preference over the flat action space. The aggregator then selects an action based on the preferences of all agents. Various aggregators may be used, including, majority voting, rank voting, Q-value generalized means maximizer. The SoC agents can be trained off-policy based on the actions taken by the aggregator because the aggregator is the controller of the SoC system.

Given any fixed strategy of the aggregator, stable (off-policy) learning occurs if the state-space of each agent is Markov. That is, stable (off-policy) learning occurs if for all agents i:

$$\mathbb{P}(X_{t+1}^i | X_t^i, A_t^{flat}) = \mathbb{P}(X_{t+1}^i | X_0^i, A_0^{flat}, \ldots, X_t^i, A_t^{flat}).$$

Example: Hierarchical Configuration

In an example, agents can be organized in a way that decomposes a task hierarchically. For instance, there can be three agents where Agent 0 is a top-level agent, and Agent 1 and Agent 2 are each bottom-level agents. The top-level agent only has communication actions, specifying which of the bottom level agents is in control. In other words, $B^0 = \emptyset$; and $c^0 = \{\text{"Agent1 in control"}, \text{"Agent2 in control"}\}$. Agent 1 and Agent 2 both have a state-dependent action-set that gives access to the environment actions A if they have been given control by Agent 0. That is, for Agent 1:

$$B^1 = \begin{cases} A & \text{if } c^0 = \text{"agent 1 in control"} \\ \text{'none'} & \text{if } c^0 = \text{"agent 2 in control"} \end{cases}$$

and vice-versa for Agent 2. By allowing Agent 0 to only switch its action once the agent currently in control has reached a terminal state (e.g., by storing a set of terminal state conditions itself or by being informed via a communication action), a typical hierarchical task decomposition can be achieved. This example illustrates that a SoC model can be a generalization of a hierarchical model.

Obtaining stable performance for some SoC configurations can sometimes be challenging. In one approach for mixed-strategy multi-agent systems, a single-agent algorithm for each of the agents is used. However, in many cases this does not result in convergence. Cases under which convergence does occur are identified below. A SoC configuration can be transformed into an SoC configuration for which convergence can be obtained by adding additional, fixed-policy agents.

In an example, by assigning a stationary policy to all agents, except agent i, an implicit MDP is defined for agent i with state space Y, reward function $r^i$ and (joint) action space $B^i \times C^i$.

It is also to be appreciated by a person of skill in the art with the benefit of this description that this holds if the next state $Y_{t+1} := (X_{t+1}, C_t^1, \ldots, C_t^n)$ only depends on the current state $Y_t$ and joint action $(B_t^i, C_t^i)$. Because the policies of all agents other than agent i are fixed, knowing $Y_t$ fixes a distribution over the environment and communication actions for each of the other agents. The distribution over these environment actions, together with the environment action of agent i determines a distribution for the random variable $X_{t+1}$. Together with the distribution over communication actions, this fixes a distribution for $Y_{t+1}$.

It then follows that if a policy is defined for agent i, a well-defined value-function is obtained. Let η be a tuple of policies, assigning a policy to each agent: $\eta := \langle \pi^1, \ldots, \pi^n \rangle$. A value-function $v^{i,\eta}$ can then be defined with respect to reward function and discount factor of agent i as follows:

$$v^{i,\eta}(\gamma) := \mathbb{E}\{R_{t+1}^i + \gamma R_{t+2}^i + \ldots | Y_t = \gamma, \eta\}$$

Using this, an independence relation between agents can be defined. In particular, agent i can be independent of agent j if the value $v^{i,\eta}(\gamma)$ does not depend on the policy of agent j. A simple example of a case where this independence relation holds is the hierarchical case, where the actions of the top agent remain fixed until the bottom agent reaches a terminal state.

Examples: Additional Combinations

The hierarchical models and other examples described herein can be combined with additional techniques, including but not limited to the techniques described in this section.

In some techniques, a high-level controller specifies a goal for the low-level controller. Once the goal is accomplished, the top-level controller selects a new goal for the low-level controller. The system can be trained in two phases: in the first phase the low-level controller is trained on a set of different goals; in the second phase the high-level and low-level controllers are trained in parallel.

In another technique, there is a system with a high-level and a low-level controller, and the high-level controller continuously sends a modulation signal to the low-level controller, affecting its policy.

In some techniques, there are conjugate MDPs where several agents coordinate to produce an action. The whole network can be trained using policy gradient. A distinction between that technique and the SoC approach is that the SoC approach can consider a non-cooperative setting while the technique can be viewed as a fully-cooperative multi-agent system.

In another technique, there is a framework of communicating agents based on deep neural networks to solve various complex tasks. A distinction between that technique and a SoC approach is that, like the work on conjugate MDPs, the technique considers cooperative multi-agent setting. SoC, by allowing to define different rewards for each agents, can have a wider range of expressivity. The Pac-Boy experiment discussed herein illustrates the power of a system of non-cooperative agents.

Experiment: Navigation Task Application

Figure 6:
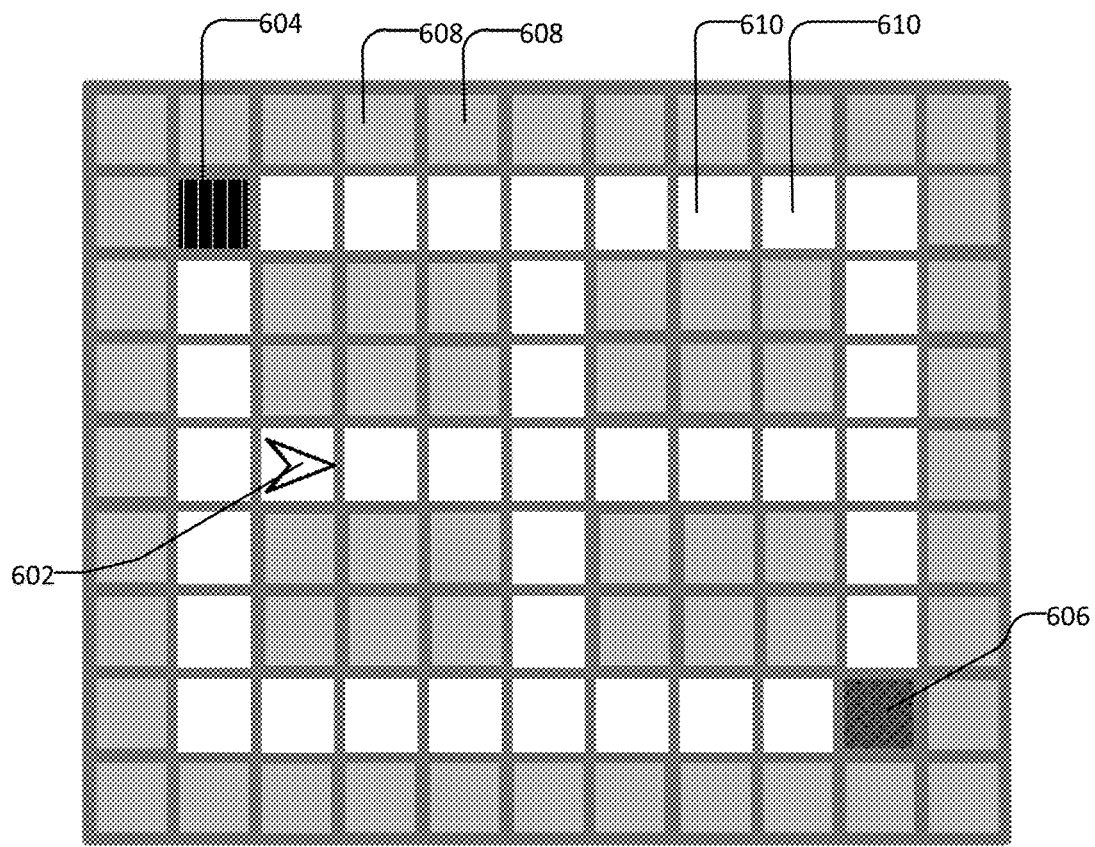
FIG. 6 illustrates an example application of a separation of concerns model on a tabular domain.

FIG. 6 illustrates an application of the SoC model on a navigation task within a tabular domain to show the scalability of the SoC model. In this task, the goal is to navigate a vehicle 102 from a start position 104 to an end position 106 through a maze formed by walls 608 and navigable, open positions 610. The action set of the vehicle 602 includes a move forward action that moves the vehicle 602 one position 610 forward, a turn clockwise action that rotates the vehicle 602 90-degrees clockwise and a turn counterclockwise action that rotates the vehicle 602 90-degrees counterclockwise. In addition, a varying number of extra 'no-op' actions (actions without effect) was added to control the complexity of the domain. In the experiment, the agent controlling the vehicle 602 received a reward of −5 when the vehicle 602 bumps into a wall 608 and a reward of −1 for all other actions.

In the experiment, a flat agent controlling the vehicle 102 was compared with a SoC agent controlling the vehicle 102. The SoC agent included a high and low level agent. The high-level agent communicated a compass direction to the low-level agent ($C^h$={north, south, east, west}) and had no environmental actions ($B^h = \emptyset$). The low-level agent had access to all environmental actions ($B^l = A$={move, clockwise turn, counterclockwise turn, noop 1, noop 2, ...}) and no communication actions ($C^l = \emptyset$). The reward function of the high-level agent was such that it receives a reward of −1 for each action. The reward function of the low-level agent was such that the agent receives a reward of −5 for hitting the wall and a reward of +1 if it made a move in the direction requested by the high-level agent. All agents were trained with Q-learning and used E greedy exploration with a fixed $\in$ value of 0.01 and a step size of 0.1.

Figure 7:
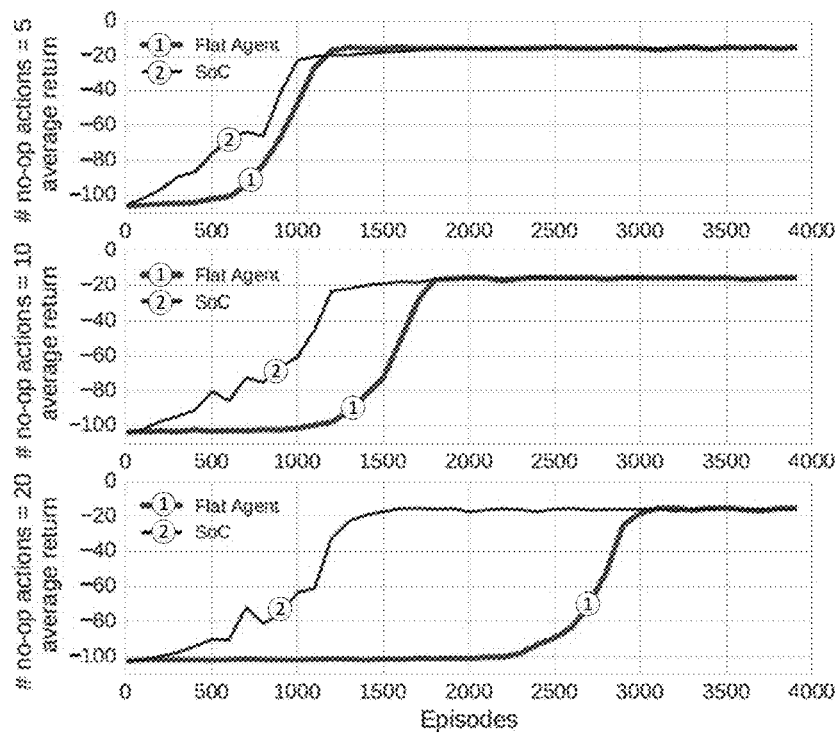
FIG. 7 illustrates learning behavior for tasks with different levels of complexity.

FIG. 7 shows the learning behavior within the experiment for tasks with different levels of complexity (e.g., no-op actions). Specifically, the average return of agents for tasks with 5, 10 and 20 no-op actions were compared. While the number of no-op actions had only a small effect on the performance of the SoC method, it affected the flat agent considerably by increasing the number of episodes it took for the flat agent to converge. This is further illustrated in FIG. 8.

Figure 8:
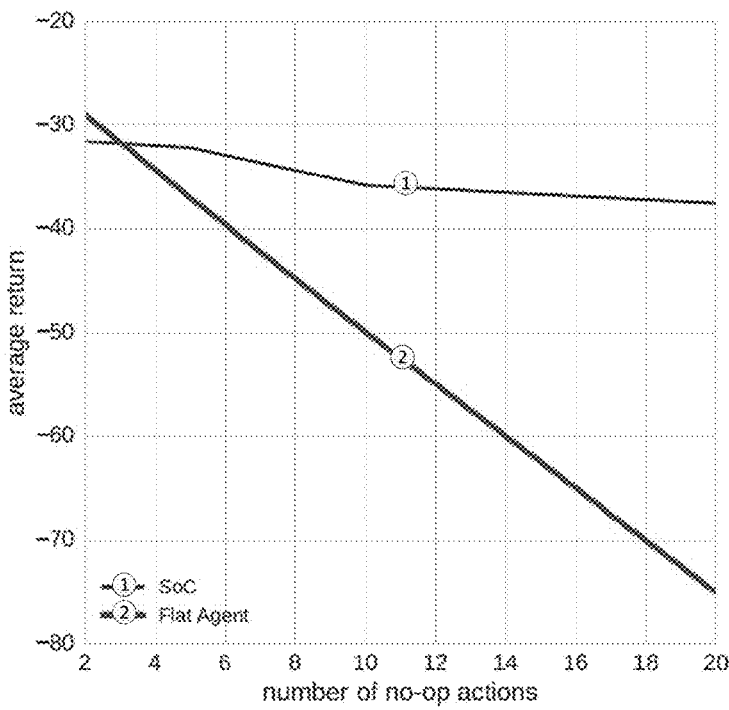
FIG. 8 illustrates an average return over 4,000 episodes for a different number of no-op actions.

FIG. 8 illustrates the average return for the SoC and flat agents over 4,000 episodes for a varying number of no-op actions. The curve shows that the SoC agent is more robust than the flat agent as the number of no-op actions increased because the average return for the SoC agent decreased significantly less than the average return of the flat agent as the number of no-op actions increased.

The results shown in FIGS. 7 and 8 illustrate the ability of the SoC model to improve the scalability.

In an alternative, hierarchical approach, the high-level agent knows the available compass directions in each grid-cell to avoid giving the low-level agent a goal that it cannot fulfill. For example, the vehicle 602 cannot move "north" while the vehicle 102 is in the start position 604 because doing so would cause the vehicle 602 to hit a wall 608. By contrast, the high-level agent of the SoC system does not require this information and therefore has a smaller state space and has improved performance.

Experiment: Catch

In another example application of the SoC model, a flat agent was compared with the SoC model on the game Catch. Catch is a simple pixel-based game involving a 24×24 screen of pixels in which the goal is to guide a basket moving along the bottom of the screen to catch a ball that is dropped at a random location at the top of the screen. In this example, both the ball and the basket are a single pixel in size. An agent can give the basket the following actions: left (which moves the basket one pixel to the left), right (which moves the basket one pixel to the right), and stay (which causes the basket to remain in place). In the experiment, the agent received a reward of 1 for catching the ball, a reward of −1 if the ball reaches the bottom of the screen without being caught, and a reward of 0 otherwise.

Similar to the navigation task described in FIG. 6, the SoC model for the Catch experiment includes a high-level and a low-level agent. The high-level agent has no direct access to the environment actions, but the high-level agent communicates a desired action to the low-level agent: $C^h$={left, right, stay}. The low-level agent has direct access to the environment actions and no communication actions: $B^l=A$ and $C^l=\emptyset$. In addition, the high-level agent has a discount factor of 0.99 and has access to the full screen, while the low-level agent has a discount factor of 0.65 and uses an optional bounding box of 10×10 pixels around the basket. The low-level agent only observes the ball when it is inside the bounding box. The high-level agents received a reward of 1 if the ball was caught and a reward of −1 otherwise. The low-level agent received a reward of 1 if the ball was caught and a reward of −1 otherwise. In addition, the low-level agent received a small positive reward for taking an action suggested by the high-level agent. The high-level agent took an action every two time steps, while the low-level agent takes actions every time step.

Both the flat agent and the high-level and low-level agents were trained using a Deep Q-Network (DQN). The flat agent used a convolutional neural network defined as follows: the 24×24 binary image was passed through two convolutional layers, followed by two dense layers. Both convolutional layers had 32 filters of size (5,5) and a stride of (2,2). The first dense layer had 128 units, followed by the output layer with 3 units.

The high-level agent in the SoC system used an identical architecture to that of the flat agent. However, due to the reduced state size for the low-level agent, it only used a small dense network instead of a full convolution network. The network flattened the 10×10 input and passed it through two dense layers with 128 units each. The output was then concatenated with a 1-hot vector representing the communication action of the high-level agent. The merged output was then passed through a dense layer with 3 units.

Figure 9:
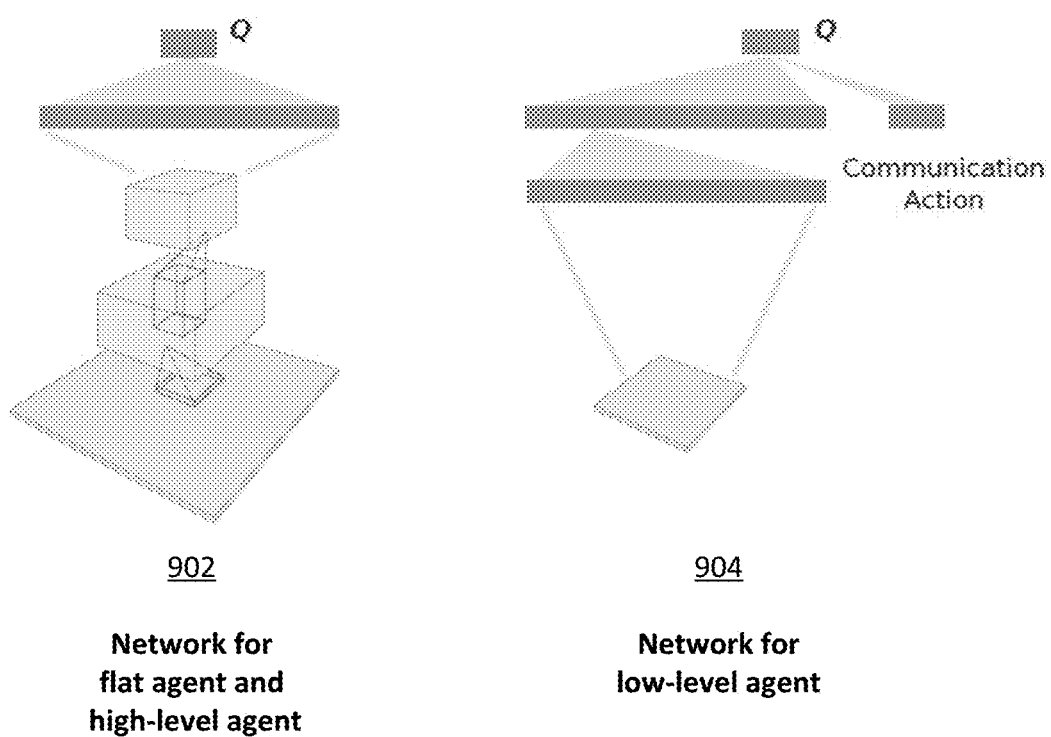
FIG. 9 illustrates a network used for the flat agent and the high level agent versus a network used for a low-level agent.

FIG. 9 illustrates a network used for the flat agent and the high level agent 902 versus a network used for the low-level agent 904. Because the low-level agent used a bounding box, it does not require a full convolutional network.

Figure 10A:
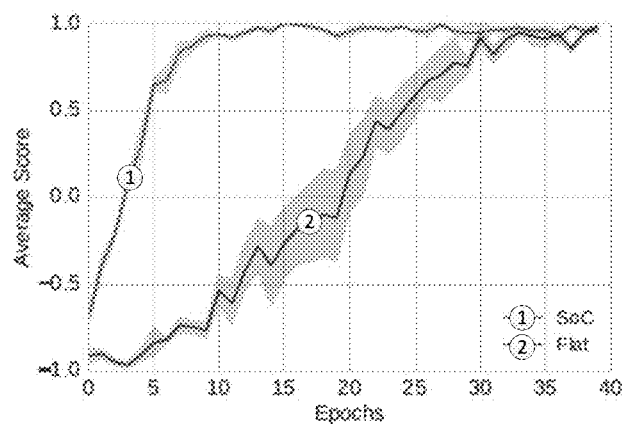
FIG. 10A illustrates a learning speed comparison between a separation of concerns model and a flat agent for a 24×24 grid.
Figure 10B:
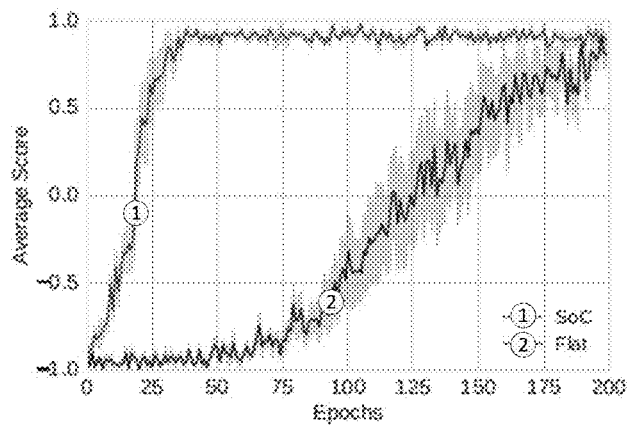
FIG. 10B illustrates a learning speed comparison between a separation of concerns model and a flat agent for a 48×48 grid.
Figure 10C:
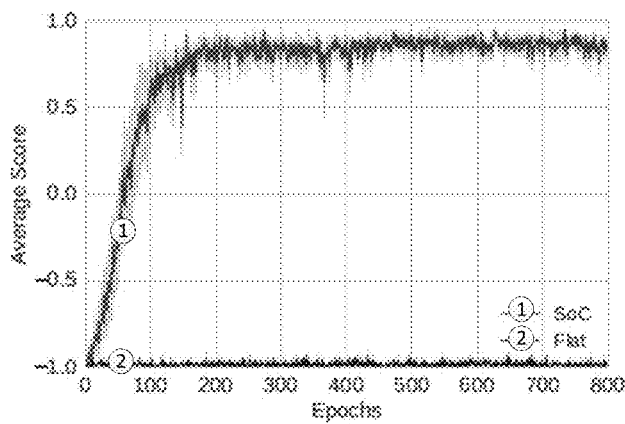
FIG. 10C illustrates a learning speed comparison between a separation of concerns model and a flat agent on an 84×84 grid.

FIGS. 10A-10C show the results of the comparison of performance between a SoC model and a flat agent showing the average score of each agent over a number of epochs for three different grid sizes.

FIG. 10A illustrates a learning speed comparison between a SoC model and a flat agent for a 24×24 grid. FIG. 10B illustrates a learning speed comparison between a SoC model and a flat agent for a 48×48 grid. FIG. 10C illustrates a learning speed comparison between a SoC model and a flat agent on an 84×84 grid. In each tested example, the SoC model learned significantly faster than the flat agent. In particular, in the 84×84 domain the flat agent failed to learn anything significant over a training period of 800 epochs. By contrast, in the same domain, the SoC model converged after only 200 epochs. In general, for the SoC model, the low-level agent was able to learn quickly due to its small state space and the high-level agent experienced a less sparse reward due to the reduced action selection frequency. For at least these reasons, the SoC model was able to significantly outperform the flat model.

Figure 11:
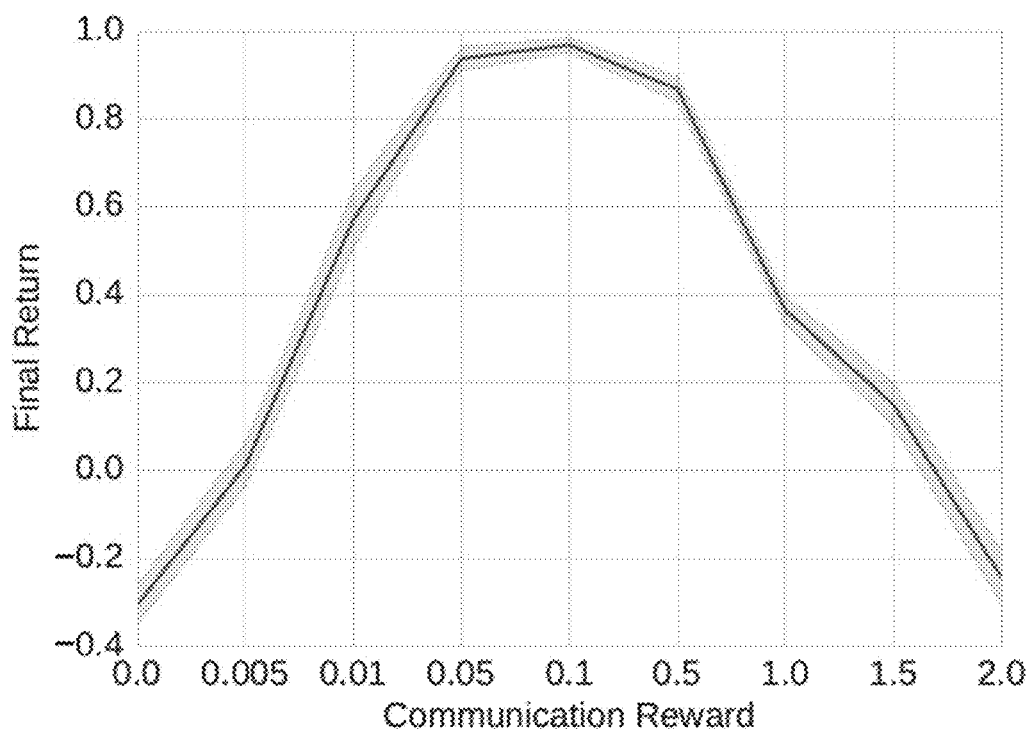
FIG. 11 illustrates the effect of varying communication reward on the final performance of a separation of concerns system on a 24×24 game of catch.

FIG. 11 illustrates the effect of varying communication reward on the final performance of the SoC model on a 24×24 game of Catch. The results show that if the additional reward is 0, the low-level agent has no incentive to listen to the high-level agent and will act fully independent. Alternatively, if the additional reward is very high, the low-level agent will follow the suggestion of the high-level agent. Because both agents are limited (the high-level agent has a low action-selection frequency and the low-level agent has a limited view), both these situations are undesirable. As illustrated, the ideal low-level agent in the experiment was one that acted neither fully independently nor fully dependently with respect to the high-level agent.

When the communication reward is too high or too low, the performance drops quickly. The reason for the performance drop appears to be different for these two cases. Where the communication reward was too low, the low-level agent tended to ignore the requests from the high-level agent and miss balls that are dropped relatively far away from the basket. Where the communication reward was too high, the low-level agent ignored the environment reward and instead follow the suggestion of the high-level agent. Because the high-level agent has a low action-selection frequency, the paddle tended to overshoot the basket. If the communication reward is set correctly, the agent nearly always successfully guided the basket to catch the ball. Based on this experiment, it appears that it is beneficial for a low-level agent to act neither fully independently nor fully dependently.

Figure 12:
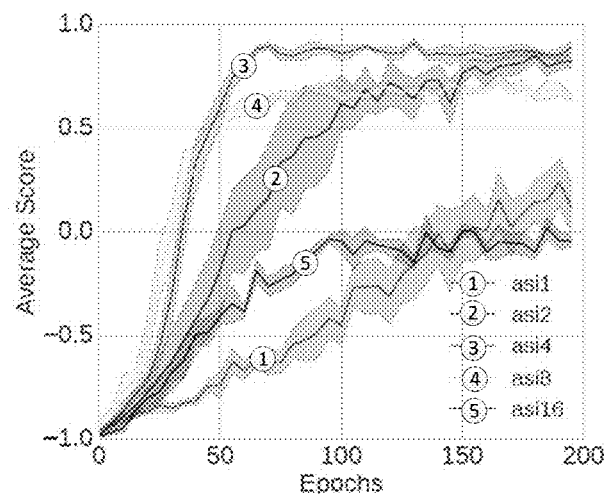
FIG. 12 illustrates the effect of different action selection intervals (asi) for the high-level agent of the separation of concerns system on 84×84 catch.

FIG. 12 illustrates the effect on the average score over a number of training epochs caused by different action selection intervals (asi) for a high-level agent of the SoC system on an 84×84 game of Catch. The intervals included every 1, 2, 4, 8, and 16 time intervals. As illustrated, an asi of 4 performed the best in the experiment, while an asi of 16 performed the worst over 200 epochs. When the communication is too frequent, the learning speed goes down, because relative to the action selections the reward appears more sparse, making learning harder. On the other hand, when it is too infrequent, asymptotic performance is reduced because the high-level agent has not enough control over the low-level agent to move it to approximately the right position.

For the Catch game, whether the high-level agent can learn to reduce its communication on its own was also tested by adding a "no-op" action to the communication action set of the high-level agent. The no-op action did not affect the reward function of the low-level agent in any way. In addition, the high-level agent was given a small penalty for choosing any communication action, other than the no-op action, and the action-selection frequency of the high-level agent was set to 1.

Figure 13:
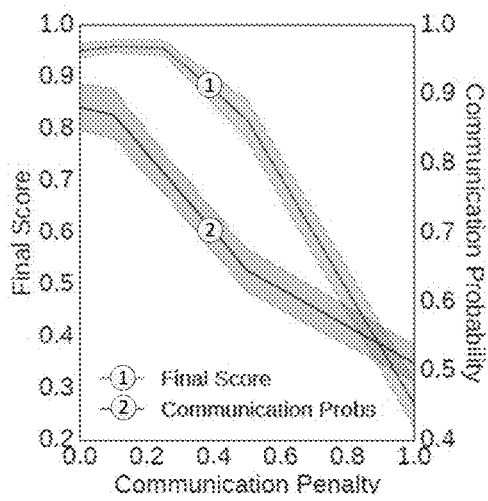
FIG. 13 illustrates the effect of penalizing communication for the high-level agent on the final performance of a separation of concerns system on a 24×24 catch game.

FIG. 13 illustrates the effect of penalizing communication for the high-level agent on the final performance of the system on a 24×24 catch game. The communication probability shows the fraction of time steps on which the high-level agent sends a communication action. It can be seen in FIG. 13 that the system can learn to maintain near optimal performance without the need for constant communication.

The result presented above in the navigation task and Catch examples show the validity of the separation of concerns principle. These results also show that separating a task into multiple related sub-tasks can result in considerable speed-ups in convergence compared to flat agents.

In the presented experiments, the decomposition was made a priori, however, it is to be appreciated by a person of skill in the art with the benefit of this description that this is only a non-limiting example. For example, in the transfer learning setting, where a high initial cost for learning a representation can be offset by many future applications of that representation, learning the decomposition can also prove to be useful.

Experiment: Pac-Boy

In another experiment, a SoC model for ensemble learning was applied to a simplified version of the game MS. PAC-MAN, which is called Pac-Boy. MS. PAC-MAN is considered a difficult game from the ATARI benchmark set. See Mnih, et al., Human-level control through deep reinforcement learning, Nature, 518:529-533 (2015), incorporated herein by reference. In Pac-Boy, Pac-Boy receives a reward of 1 for eating a pellet, and a reward of −10 for bumping into one of two ghosts moving randomly through a maze. An episode ends after all pellets in the maze are eaten by Pac-Boy or after 300 steps, whichever comes first. There are 75 potential pellet positions. The pellet distribution is randomized: at the start of each new episode, there is a 50% probability for each position to have a pellet. During an episode, pellets remain fixed until they are eaten by Pac-Boy. The state of the game includes the positions of Pac-Boy, pellets, and ghosts. This results in a state space of $76 \times 2^{75} \times 76^2 \approx 10^{28}$. This makes flat-agent implementation difficult without using function approximation, which can negatively affect results.

The SoC model was tested in this environment, and concerns were separated in the following manner: an agent was assigned to each possible pellet location. This pellet agent receives a reward of 1 only if a pellet at its assigned position is eaten. The pellet agent's state space includes Pac-Boy's position, which results in 76 states. A pellet agent is only active when there is a pellet at its assigned position. In addition, an agent was assigned to each ghost. This ghost agent receives a reward of −10 if Pac-Boy bumps into its assigned ghost. The ghost agent's state space includes Pac-Boy's position and the ghost's position, resulting in $76^2$ states. Because there are on average 38 pellets, the average number of agents is 40. Due to the small state spaces of the agents, a tabular representation was used. The agents were trained in parallel with off-policy learning using Q-learning. An aggregator function summed the Q-values for each action: $a \in A_{flat}: Q^{sum}(a, X_t^{flat}) := \Sigma_i Q^i(a, X_t^i)$, and used $\in$-greedy action selection with respect to these summed values. The Q-table of both ghost-agents where the same, so benefit was gained from intra-task transfer learning by sharing the Q-table between the two ghost agents, which resulted in the ghost-agents learning twice as fast.

The first non-SoC baseline was a flat agent that uses the exact same input features as the SoC model. Specifically, the state of each agent of the SoC model was encoded with a one-hot vector and the vectors were concatenated, resulting in a binary feature vector of size 17,252 with about 40 active features per time step. This vector was used for linear function approximation with Q-learning (referred to as Linear Q Learning).

Two non-SoC deep reinforcement learning baselines were also considered. The first used a standard DQN algorithm (see Mnih et al., above) with reward clipping (referred to as DQN-clipped). The second used Pop Art (see van Hasselt et al., Learning values across many orders of magnitude, Proceedings of Advances in Neural Information Processing Systems 29 (NIPS), 2016, incorporated herein by reference), which was combined with DQN to handle large magnitudes of reward (referred to as DQN-scaled). The input to both DQN-clipped and DQN-scaled was a 4-channel binary image, where each channel was in the shape of the game grid and represented the positions of one of the following features: the walls, the ghosts, the pellets, and Pac-Boy.

Figure 14A:
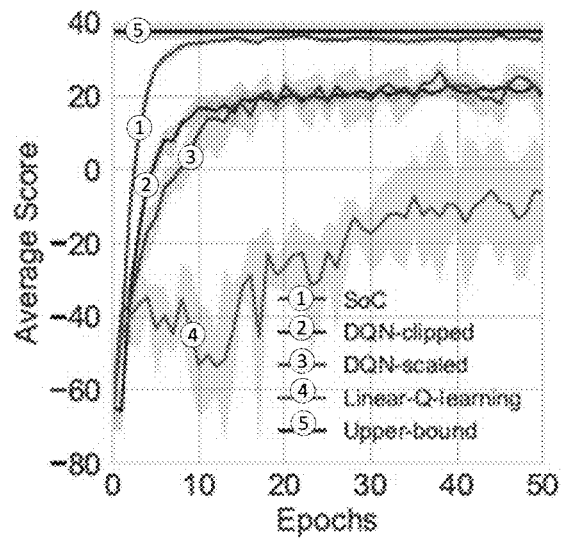
FIG. 14A shows the learning speed of a separation of concerns model compared to baselines for average score over a number of epochs.
Figure 14B:
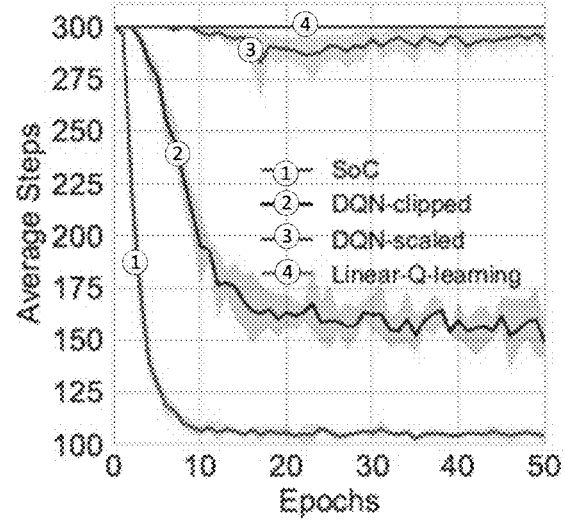
FIG. 14B shows the learning speed of a separation of concerns model compared to baselines for average number of steps over a number of epochs.

FIGS. 14A and 14B show the learning speed of the SoC model compared to the DQN-clipped, DQN-scaled, and Linear Q Learning baselines described above. In particular, FIG. 14A compares the average scores (higher is better) over a number of epochs for the models and FIG. 14B compares the average number of steps (lower is better) taken over a number of epochs for the models. One epoch corresponds to 20,000 environmental steps and each curve shows the average performance over 5 random seeds. The upper-bound line in FIG. 14A shows the maximum average score that can be obtained. As shown, the SoC model converged to a policy that was very close to the optimal, upper bound, and the baselines fell considerably short of the baseline even after converging. The Linear Q Learning baseline handled the massive state space with no reductions and thus took considerably longer to converge. While DQN-clipped and DQN-scaled converge to similar final performances, their policies differed significantly as can be seen in the differing average number of steps taken by each in FIG. 14B. DQN-scaled appeared to be much wearier of the high negative reward obtained from being eaten by the ghosts and thus took more steps to eat all of the pellets.

In order to evaluate SoC's capability for knowledge transfer, different forms of pre-training were tested, including: 1) pre-trained ghost agents, 2) pre-trained pellet agents, and 3) (separately) pre-trained pellet and ghost agents. Pre-training was performed using a random behavior policy. After pre-training, the agents were transferred to the full game and the remaining agents are trained.

Figure 15A:
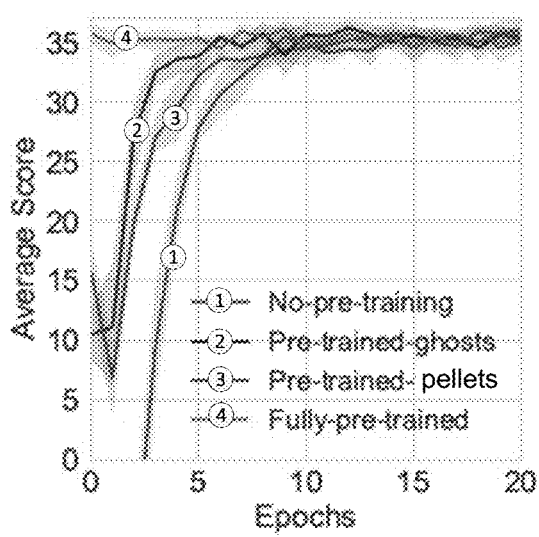
FIG. 15A shows separation of concern agent results for average score over a number of epochs with and without pre-training on Pac-Boy.
Figure 15B:
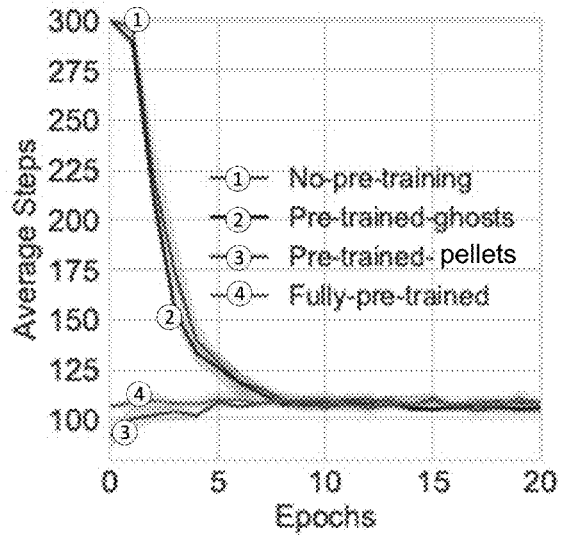
FIG. 15B shows separation of concern agent results for average number of steps over a number of epochs with and without pre-training on Pac-Boy.

FIGS. 15A and 15B show the average score and average steps over epochs, respectively, for SoC agents with and without pre-training on Pac-Boy. As can be seen, pre-training boosts performance with respect to average score and average number of steps compared to an agent without pre-training.

Experiment Setup: Catch and Pac-Boy

This section describes additional information regarding the set up for the Catch and Pac-Boy experiments. In order to speed up learning and take advantage of these smaller domains, the experiment parameters were tuned versions of parameters originally reported in Mnih et al. (see above) based on a rough search on each domain. Specifically the replay memory size, the target network update frequency, and number of annealing steps for exploration were reduced. Then a coarse search was performed over learning rates sampled from [0.0001, 0.00025, 0.0005, 0.00075, 0.001, 0.0025] on DQN for Pac-Boy and 24×24. For Pop-Art the learning rate was set to 0.00025 (which was found to be the best learning rate for DQN on Pac-Boy) and then a search was run for the adaptive-normalization rate by searching over the same parameters mentioned above. The settings used for the Catch and Pac-Boy agents and experiments is shown in Table 1 (below).

TABLE 1

Hyper-parameters used for agents

| | Catch (SoC and DQN) | Pac-Boy (DQN Baselines) | Pac-Boy (SoC) | Pac-Boy (linear) |
|---|---|---|---|---|
| Training steps per epoch | 1000 | 20000 | 20000 | 20000 |
| Evaluation steps per epoch | 1000 | 10000 | 10000 | 10000 |
| Mini-batch size | 32 | 32 | n/a | n/a |
| Experience replay size | 10000 | 100000 | n/a | n/a |
| Learning frequency | 4 | 1 | 1 | 1 |
| Target update frequency | 100 | 1000 | n/a | n/a |
| Gamma | 0.99 | 0.9 | 0.4 | 0.9 |
| Learning rate | 0.001 | 0.00025 | 1 pellet/ 0.1 ghosts | 0.005 |

TABLE 1-continued

Hyper-parameters used for agents

|  | Catch (SoC and DQN) | Pac-Boy (DQN Baselines) | Pac-Boy (SoC) | Pac-Boy (linear) |
|---|---|---|---|---|
| Momentum | 0.95 | 0.95 | n/a | n/a |
| Initial epsilon | 1 | 1 | 0.1 | 1 |
| Final epsilon | 0.01 | 0.1 | 0.1 | 0 |
| Epsilon annealing steps | 10000 | 100000 | 0 | 150000 |
| β | n/a | 0.00025 (Pop-Art) | n/a | n/a |

In the experiments, a core network architecture was used across DQN agents. The network began by passing the input through two convolutional layers sequentially with 16 and 32 filters, respectively. This is followed by two densely connected layers of size 256 and |Actions|. All layers except for the output used a rectified non-linear activation, whereas the output layer used a linear activation. Depending on the domain size, the size of the filters and the stride for the convolutional layers varied as seen in Table 2 (below).

TABLE 2

Filter shapes and strides used for DQN agents

|  | Catch 24 × 24 | Catch 48 × 48 | Catch 84 × 84 | Pac-Boy |
|---|---|---|---|---|
| Conv 1 Filter | (5, 5) | (5, 5) | (8, 8) | (3, 3) |
| Conv 2 Filter | (5, 5) | (5, 5) | (4, 4) | (3, 3) |
| Conv 1 Stride | (2, 2) | (2, 2) | (4, 4) | (1, 1) |
| Conv 2 Stride | (2, 2) | (2, 2) | (2, 2) | (1, 1) |

The low-level agent in the Catch experiment used a dense network defined as follows. The input was passed through dense layers both containing 128 units and used rectified non-linear activations. The output was concatenated with the communication action sent by the high level agent represented by a 1-hot vector of size |Actions|=3. The merged representation is passed through the output layer with a linear activation and |Actions|=3 units.

Multi-Advisor Reinforcement Learning

Multi-advisor reinforcement learning (RL) can be a branch of SoC where a single-agent reinforcement learning problem is distributed to n learners called advisors. Each advisor tries to solve the problem from a different angle. Their advice is then communicated to an aggregator, which is in control of the system.

Disclosed examples include three off-policy bootstrapping methods: local-max bootstraps with the local greedy action, rand-policy bootstraps with respect to the random policy, and agg-policy bootstraps with respect to the aggregator's policy.

In a multi-advisory model, a single-agent reinforcement learning task can be partitioned into a multi-agent problem (e.g., using a divide and conquer paradigm). All agents can be placed at a same level and be given advisory roles that include providing an aggregator with local Q-values for each available action. A multi-advisory model can be a generalization of reinforcement learning with ensemble models, allowing for both the fusion of several weak reinforcement learners and the decomposition of a single-agent reinforcement learning problem into concurrent subtasks. In some techniques for combining reinforcement learning and ensemble methods, agents are trained independently and greedily to their local optimality, and are aggregated into a global policy by voting or averaging.

This local greedy bootstrapping method, called local-max, presents theoretical shortcoming of inverting a max Σ into a Σmax into the global Bellman equation. In practice, this inversion causes some states to become attractors. An attractor is a state where advisors are attracting in every direction equally and where the local-max aggregator's optimal behavior is to remain static.

Disclosed examples include at least two attractor-free, off-policy bootstrapping methods. In a first example, there is rand-policy bootstrapping, which allows for convergence to a fair short-sighted policy. In some implementations, this example favors short-sightedness over long-term planning. In a second example, there is an agg-policy bootstrapping method that optimizes the system with respect to the global optimal Bellman equation. In some implementations, this example does not guarantee convergence in a general case. A multi-advisor reinforcement learning architecture can greatly speed up learning and converges to a better solution that certain reinforcement learning baselines.

As previously discussed, a reinforcement learning framework can be formalized as a Markov Decision Process (MDP). An MDP is tuple $\langle X, A, p, r, \gamma \rangle$. X is the state space, A is the action space, p: X×A→X is the Markovian transition stochastic function, r: X×A→$\mathbb{R}$ is the immediate reward stochastic function, and γ is the discount factor.

A trajectory $\langle x(t), a(t), x(t+1), x(t+1), r(t) \rangle_{t \in [0, T-1]}$ is the projection into the MDP of the task episode. In some examples, a goal is to generate trajectories with high discounted cumulative reward, also called the return: $\Sigma_{t=0}^{T-1} \gamma^t r(t)$. To do so, one needs to find a policy π: X×A→[0,1] that yields optimal expected returns. Formally, this means finding a policy that maximizes:

$$Q_\pi(x, a) = \mathbb{E}_x\left[\sum_{t' \geq t} \gamma^{t'-t} R(X_{t'}, A_{t'}) \;\middle|\; X_t = x, A_t = a\right].$$

Problem Setting

In an example, there are n advisors that are regarded as specialized, possibly weak, learners that are concerned with a sub part of the problem. Then an aggregator is responsible for merging the advisors' recommendations into a global policy.

Figure 16:
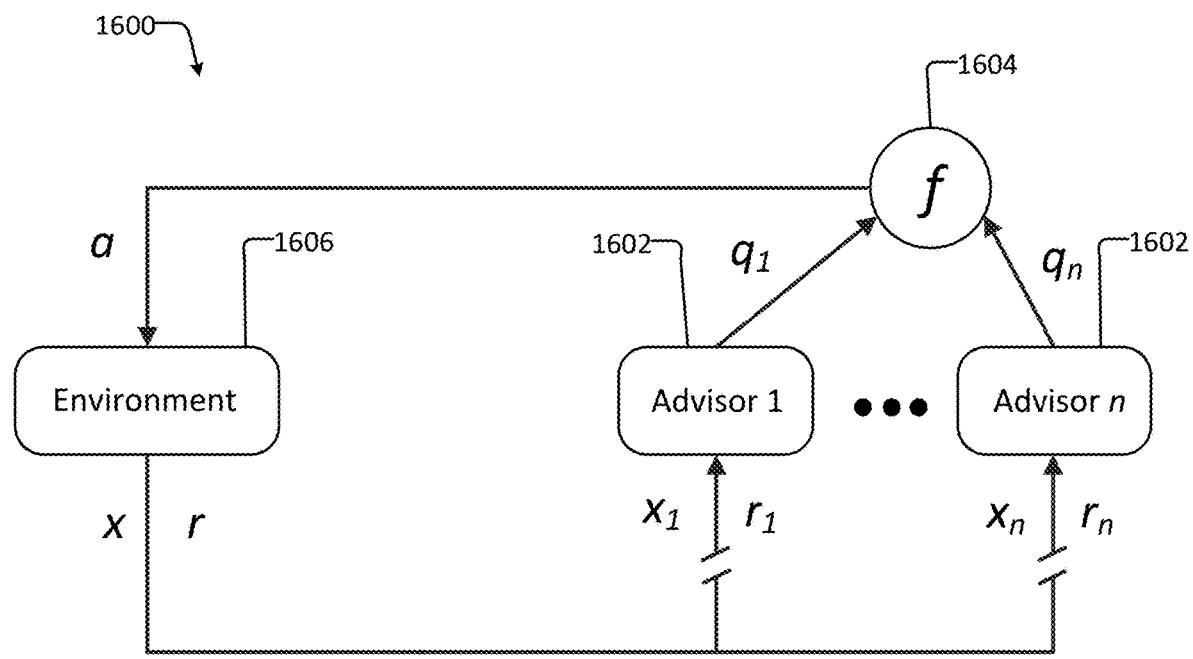
FIG. 16 illustrates an architecture of an example aggregator.

FIG. 16 illustrates an example of such an overall multi-advisor architecture 1600, including advisors 1602, an aggregator 1604, and an environment 1606. As illustrated, at each time step, each advisor 1602 sends its local Q-values q to the aggregator 1604 for all actions in the current state x. The aggregator 1604 is defined with function ƒ that maps the received $q_j$ values into an action a of: $f: \mathbb{R}^{n|A|} \to A$.

There are several ways to distribute a single-agent reinforcement learning problem over several advisors. Including the one or a combination of two or more of the following:

1) State space approximation where each advisor has a local state space representation of $X_j \subseteq X$. See Bohmer et al Autonomous learning of state representations for control: An emerging field aims to autonomously learn state representations for reinforcement learning agents from their real-world sensor observations, KI-Künstliche Intelligenz (2015); and Laroach et al, Algorithm selection of off-policy reinforcement learning algorithm, arXiv:1701.08810 (2017), both of which are incorporated by reference.

2) Sequencing of actions where each advisor is able to handle different sequences of actions. This can be related to the notion of options used in semi-MDP. See Sutton et al, Between mdps and semi-mdps: a framework for temporal abstraction in reinforcement learning, Artificial Intelligence (1999), incorporated herein by reference.

3) Factorization of actions where each advisor is responsible for a separate action dimension (e.g., a robot's arms and legs may be controlled with different advisors). See Laroach et al Hybridization of expertise and reinforcement learning in dialogue systems. In Proceedings of the 9th Annual Conference of the International Speech Communication Association (Interspeech) (2009), incorporated herein by reference.

4) Segmentation of rewards where a complex task is decomposed into subtasks defined by reward channels. Feudal reinforcement learning assigns sub-goals under a recursive hierarchy. See Dayan and Hinton Feudal reinforcement learning, In Proceedings of the 7th Annual Conference on Neural Information Processing Systems (NIPS) (1993); and Vezhnevets, et al, Feudal networks for hierarchical reinforcement learning. arXiv:1703.01161 (2017), both of which are incorporated herein by reference.

5) Criterion separation where sometimes no objective function can be clearly designed and the goal is to satisfy several criteria as much as possible. Multi-criteria reinforcement learning can result in segmentation of rewards with a specific aggregating policy. See Gabor et al, Multi-criteria reinforcement learning, In Proceedings of the 15th International Conference on Machine Learning (ICML) (1998), incorporated herein by reference.

6) Algorithm diversification where each algorithm intends to learn a global policy but with different optimizations, hypotheses, regularizers, and/or parameters. See Laroach 2017 (referenced above); and Wiering et al, Ensemble algorithms in reinforcement learning, IEEE transactions on Systems, Man, and Cybernetics (2008), incorporated herein by reference.

7) Randomization, where variance control through randomization of the learners is obtained via instance sampling (see Breiman, Bragging predictors, Machine learning (1996), incorporated herein by reference), random initialization (see Glorot et al, Understanding the difficulty of training deep feedforward neural networks, In Proceedings of the 13th International Conference on Artificial Intelligence and Statistics (2010), incorporated herein by reference), and randomization of algorithms (see Breiman, Random forests, Machine learning (2001), incorporated herein by reference).

Each advisor j can be defined on a local representation $\phi_j: X \to X_j$, and its local state is denoted by $x_j = \phi_j(x) \in X_j$. The advisor can aim to find an optimal evaluation of the state-action space in order to send the aggregator the most informative communication vector $$q_j = [Q_j(\chi_j, a)]_{a \in \mathcal{A}} = [Q_j(\phi_j(\chi), a)]_{a \in \mathcal{A}} \in \mathbb{R}^{|A|};$$

where the state-action (x, a) values correspond to advisor j.

The multi-advisor models fall within SoC. and SoC distributes the responsibilities among several agents that may communicate and have complex relationships, such as master-servant or collaborators-as-equal relationships. The following section transcribes under the multi-advisor reinforcement learning notations the main theoretical result: the stability theorem ensuring, under conditions, that the advisors' training eventually converges.

By assigning stationary behavior to each advisor, a sequence of random variables $X_0, X_1, X_2, \ldots$, with $X_t \in X$ is a Markov chain. To formalize, let $\mu$ define a set of n stationary advisers and let M be the space of all such sets. The following holds true for all $\mu \in M$:

$$\mathbb{P}(X_{t+1}|X_t, \mu) = \mathbb{P}(X_{t+1}|X_t, \ldots, X_0, \mu).$$

Further, let $\mu_{-j}$ be $\mu$ excluding advisor j, and $M_{-j}$ be the space of them. The following relation can hold for the advisors, and $\forall \mu_{-j} \in M_{-j}$:

$$\mathbb{P}(X_{j,t+1}|X_t, q_{j,t}, \mu_{-j}) = \mathbb{P}(X_{j,t+1}|X_t, q_{j,t}, \ldots, X_0, q_{j,0}, \mu_{-j}).$$

For stability analysis, these advisors are assumed to be Markov:

$$\mathbb{P}(X_{j,t+1}|X_{j,t}, A_t) = \mathbb{P}(X_{j,t+1}|X_t, A_t).$$

Given any fixed aggregator, stable (off-policy) learning can occur if the advisors are Markov because each advisor can be seen as an independent learner training from trajectories controlled by an arbitrary behavioral policy. If the assumption holds, the environment is Markov and off-policy algorithms can be applied with convergence. Given a learning method that converges on a single-agent MDP task, the overall policy of the SoC model converges too.

The agents can play the role of advisors. As a consequence, the role of function $f$ can be to aggregate their recommendations into a policy. These recommendations can be expressed as their value functions $q_j$. The local learners may not be able to be trained on-policy if the policy followed by the aggregator does not necessarily correspond to any of their respective locally optimal policies. There are at least three ways to learn off-policy: local-max, rand-policy, and agg-policy. These techniques, which are discussed in depth later, may be applied to any aggregator function. In an example the techniques are restrained to the linear decomposition of the rewards, which implies the same decomposition of return, and therefore of value functions:

$$R(x, a) = \sum_j w_j R_j(x_j, a),$$

$$Q(x, a) = \sum_j w_j Q_j(x_j, a).$$

Continuing the example, there is a setting where there is one advisor per reward channel (e.g., all $w_j$ are equal to 1) and each advisor is specialized with a predefined local state space relevant to its task. This also models the setting of the weighting average of several learners on the global task (e.g., all $w_j$ sum to 1). The aggregator function can then defined in a greedy manner:

$$f(x) = \operatorname*{argmax}_{a \in A} Q(x, a).$$

Multi-Advisor Reinforcement Learning as Ensemble Learning

Multi-advisor reinforcement learning can be interpreted as ensemble learning for reinforcement learning. In some techniques, a boosting algorithm is used in a RL framework, but the boosting is performed upon policies, not RL algorithms. This technique can be seen as a precursor to the policy reuse algorithm rather than Ensemble Learning.

In some approaches, several online RL algorithms are combined on several simple RL problems. The mixture models of the five experts performs generally better than any single one alone. The algorithms can include off-policy, on-policy, actor-critics, among others, and can continue this effort in a very specific setting where actions are explicit and deterministic transitions.

In still other approaches advisors are trained on different reward functions. These are potential-based reward shaping variants of the same reward function and are embed the same goals. As a consequence, it can be related to a bagging procedure. The advisors recommendation are then aggregated under the Horde architecture with local greedy off-policy bootstrapping.

Other approaches include boosting weak advisors' performances by aggregating their recommendation, selecting the best advisor. This approach can be beneficial for staggered learning or when one or several advisors may not find good policies. Though this may have challenges in variance reduction brought by the committee, and may not apply to compositional RL.

Although the analysis herein can be built on the linear composition of value functions, the same bootstrapping methods can be applied with the same distinctive features for any aggregator function (e.g., majority/ranking voting, or Boltzmann policy aggregation).

Off-Policy Bootstrapping Methods

This section presents three different local off-policy bootstrapping methods: local-max, rand-policy, and agg-policy. They are presented and analyzed under a linear composition aggregator, but most considerations are also valid with other aggregating functions, such as voting or policy mixtures.

Off-Policy Bootstrapping Methods: Local-Max Bootstrapping

One approach is to learn off-policy by bootstrapping on the locally greedy action: each advisor learns as if it was in control. See Harutyunyan et al., Off-policy reward shaping with ensembles, arXiv:1502.03248 (2015), incorporated herein by reference. For each advisor j there is convergence to the local optimal value function, denoted by $Q_j^{lm}$, which satisfies the Bellman optimality equation:

$$Q_j^{lm}(x_j, a) = \mathbb{E}[r_j] + \gamma \mathbb{E}\left[\max_{a' \in \mathcal{A}} Q_j^{lm}(x_j', a')\right]$$

where the first term is the expectation of the local stochastic immediate reward function $R_j(x_j, a)$, and the second term is the future return expectation over the local stochastic transition function $P_j(x_j, a, x_j')$. In the aggregator global view:

$$Q^{lm}(x, a) = \sum_j w_j Q_j^{lm}(x_j, a),$$
$$= \sum_j \mathbb{E}\left[w_j r_j + \gamma w_j \max_{a' \in \mathcal{A}} Q_j^{lm}(x_j', a')\right],$$
$$= \mathbb{E}\left[\sum_j w_j r_j\right] + \gamma \mathbb{E}\left[\sum_j w_j \max_{a' \in \mathcal{A}} Q_j^{lm}(x_j', a')\right]$$

By construction $r = \Sigma_j w_j r_j$, and therefore:

$$Q^{lm}(x, a) = \mathbb{E}[r] + \gamma \mathbb{E}\left[\sum_j w_j \max_{a' \in \mathcal{A}} Q_j^{lm}(x_j', a')\right],$$
$$\geq \mathbb{E}[r] + \gamma \mathbb{E}\left[\max_{a' \in \mathcal{A}} Q_j^{lm}(x', a')\right].$$

Local-max suffers from an inversion between the max and sum operators and can tend to overestimate the state-action values, in particular when the advisors disagree on the action to perform. This can create attractor situations, such as the one illustrated in FIG. 17. Such situations can be encountered in a variety of experiments, such as the Pac-Boy experiment.

Figure 17:
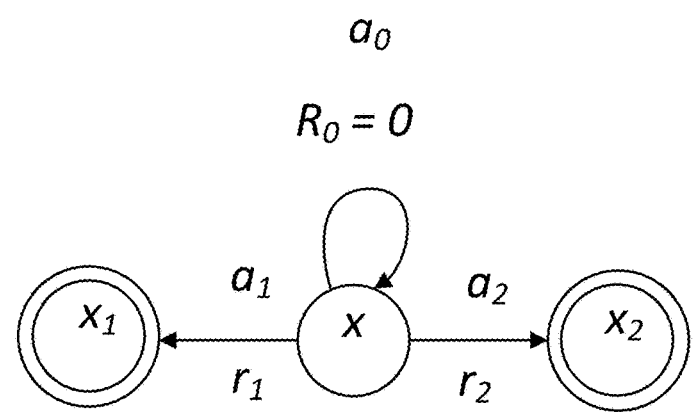
FIG. 17 illustrates an example attractor.

FIG. 17 illustrates a central state (as illustrated, x) in which the system has three possible actions: stay put (as illustrated, action $a_0$), perform the goal of advisor 1 (as illustrated, action $a_1$, which would cause a transition to illustrated state $x_1$) or perform the action of advisor 2 (action $a_2$, which would cause a transition to illustrated state $x_2$). Once achieving a goal, the trajectory ends. The Q-function values for each action can be computed as follows:

$$Q^{lm}(s, a_0) = \mathbb{E}[r] + \gamma \mathbb{E}\left[\sum_j \max_{a' \in \mathcal{A}} Q_j^{lm}(x_j', a')\right],$$
$$= 0 + \gamma r_1 + \gamma r_2,$$
$$= \gamma r_1 + \gamma r_2,$$
$$Q^{lm}(s, a_1) = r_1,$$
$$Q^{lm}(s, a_2) = r_2.$$

Consequently, if $$\gamma > \frac{r_1}{(r_1 + r_2)} \text{ and } \gamma > \frac{r_2}{(r_1 + r_2)},$$

the aggregator's policy after convergence will be to execute action $a_0$ indefinitely. Nevertheless, the local-max sub-optimality does not come from actions that are equally good, nor from the determinism of the policy, since adding randomness to the system may not help.

An attractor x is a state where local-max would lead to the aggregator staying in that state, if it had the chance. It verifies the following equation:

$$\max_{a \in \mathcal{A}} \sum_j w_j Q_j^{lm}(x_j, a) < \gamma \sum_j w_j \max_{a \in \mathcal{A}} Q_j^{lm}(x_j, a).$$

Note that there may be no condition on the existence of actions allowing the system to be actually static. More generally, the system might be stuck in an attractor set, keep moving, but opt for never achieving its goals. To understand how this may happen, just replace the middle state x in FIG. 17 with an indefinitely large set of similar attractors: where action $a_0$ performs a random transition in the attractor states, and actions $a_1$ and $a_2$ respectively achieve tasks of advisors 1 and 2. As well, note that there is no condition on the available actions to define x as an attractor. Indeed, it may happen that an attractor is escapable by the lack of actions keeping the system in an attractor set. For instance, in FIG. 17, if action $a_0$ is not available, the central state remains an attractor, but an unstable one.

An advisor j can be monotonous if the following condition is satisfied:

$$\forall x_j \in \mathcal{X}_j, \forall a \in \mathcal{A}, Q_j^{lm}(x_j, a) \geq \gamma \max_{a' \in \mathcal{A}} Q_j^{lm}(x_j, a').$$

The intuition behind the monotonous property is that no action is worse than losing one turn to do nothing. In other words, no action can move this advisor away from its goal. This is the case when only progress can be made towards any task, and therefore any no-op action is regarded by all the advisors as (one of) the worst option(s).

If all advisors are monotonous, there can be no attractors. This can be seen when the condition above is summed over the advisors:

$$\sum_j w_j Q_j^{lm}(x_j, a) \geq \gamma \sum_j w_j \max_{a' \in \mathcal{A}} Q_j^{lm}(x_j, a'),$$

$$\max_{a' \in \mathcal{A}} \sum_j w_j Q_j^{lm}(x_j, a') \geq \sum_j w_j Q_j^{lm}(x_j, a)$$

Monotony of advisors can be restrictive and most reinforcement learning problems do not fall into that category, even for low γ values. Navigation tasks do not qualify by nature: when the system goes into a direction that is opposite to some goal, it gets into a state that is worse than by staying in position. Monotony also does not apply to RL problems with states that terminate the trajectory although some goals are still incomplete. Still, there exist some RL problems where all advisors are monotonous, such as resource scheduling where each advisor is responsible for the progression of a given task. Note that a multi-advisor reinforcement learning problem without any attractors does not guarantee optimality. It simply means that the system will continue achieving goals as long as there are any.

Off-Policy Bootstrapping Methods: Rand-Policy Bootstrapping

For multi-advisor reinforcement learning problems, there can exist off-policy attractor-free algorithms. The advisors need not bootstrap their value function on the basis of their local policy, but rather on a shared reference. A first reference policy may be the random policy over the action set A. This Q-function bootstrapping method is called rand-policy hereafter. There is convergence of the local optimization process to its local optimal value, denoted by $Q_j^{rp}$, which satisfies the following Bellman equation:

$$Q_j^{rp}(x_j, a) = \mathbb{E}\left[r_j + \frac{\gamma}{|\mathcal{A}|} \sum_{a' \in \mathcal{A}} Q_j^{rp}(x_j', a')\right],$$

$$Q^{rp}(x, a) = \mathbb{E}\left[r + \frac{\gamma}{|\mathcal{A}|} \sum_j w_j \sum_{a' \in \mathcal{A}} Q_j^{rp}(x_j', a')\right],$$

$$= \mathbb{E}\left[r + \frac{\gamma}{|\mathcal{A}|} \sum_{a' \in \mathcal{A}} Q^{rp}(x', a')\right].$$

The local rand-policy optimization is equivalent to the global rand-policy optimization. As such, it does not suffer from local attractor issue previously described. However, optimizing the value function with respect to the random policy is in general far from the optimal solution to the global MDP problem.

Off-Policy Bootstrapping Methods: Agg-Policy Bootstrapping

Another solution is to use the aggregator's policy as the reference. In this view, referred to as agg-policy, the aggregator is in control, and the advisors are evaluating the current aggregator's policy ƒ. Here, the aggregator's policy is dependent on the other advisors, which means that, even though the environment can still be modelled as a MDP, the training procedure is not. Assuming that all advisors jointly converge to their respective local optimal value, denoted by $Q_j^{ap}$, it satisfies the following Bellman equation:

$$Q_j^{ap}(x_j, a) = \mathbb{E}[r_j + \gamma Q_j^{ap}(x_j', f(x'))],$$

$$Q^{ap}(x, a) = \mathbb{E}\left[r + \gamma \sum_j w_j Q_j^{ap}(x_j', f(x'))\right],$$

$$= \mathbb{E}[r + \gamma Q^{ap}(x', f(x'))],$$

$$= \mathbb{E}\left[r + \gamma Q^{ap}\left(x', \underset{a' \in \mathcal{A}}{\operatorname{argmax}} Q^{ap}(x', a')\right)\right],$$

$$= \mathbb{E}\left[r + \gamma \max_{a' \in \mathcal{A}} Q^{ap}(x', a')\right].$$

This global Bellman equation is actually the global Bellman optimality equation. Therefore its uniqueness is confirmed but unfortunately, this comes with the non-Markovian property of the aggregator's policy at the local learner scope. As a result, local learners are not guaranteed to converge. As a direct consequence of the global Bellman optimality equation, its convergence to the globally optimal policy can be demonstrated under some conditions.

If, for all advisors j, $X_j=X$, using a state-action-reward-state-action (SARSA) update rule for each advisor with respect to the aggregator's maximizing action can be equivalent to applying Q-learning update rule on the global agent. See Rummery et al. On-line Q-learning using connectionist systems, University of Cambridge, Department of Engineering (1994); and Watkins, Learning from Delayed Rewards, PhD thesis, Cambridge University (1989), both of which are incorporated herein by reference. For example, let $\bar{a}_x$, denote the aggregator's policy in state x'. The Q-learning update rule for the global agent can be decomposed as follows:

$$Q^{ap}(x, a) \leftarrow (1-\alpha)Q^{ap}(x, a) + \alpha\left[r + \gamma \max_{a' \in \mathcal{A}} Q^{ap}(x', a')\right],$$

$$= (1-\alpha)Q^{ap}(x, a) + \alpha[r + \gamma Q^{ap}(x', \bar{a}_{x'})],$$

$$= (1-\alpha)\sum_j w_j Q_j^{ap}(x, a) + \alpha\left[\sum_j w_j r_j + \gamma \sum_j w_j Q_j^{ap}(x', \bar{a}_{x'})\right].$$

The SARSA update rule for each advisor with respect to the aggregator's action $\bar{a}_x$, is written as follows:

$$Q_j^{ap}(x_j, a) \leftarrow (1-\alpha)Q_j^{ap}(x_j, a) + \alpha[r_j + \gamma Q_j^{ap}(x_j', \bar{a}_{x'})].$$

Experiment: Multi-Advisor Model: Pac-Boy

The multi-advisor model was evaluated using the Pac-Boy experiment as described above. Here, each advisor was responsible for a specific source of reward (or penalty). More precisely, concerns were separated follows: an advisor was assigned to each possible pellet location. This advisor sees reward of 1 only if a pellet at its assigned position gets eaten. Its state space includes Pac-Boy's position, resulting in 76 states. A pellet advisor is only active when there is a pellet at its assigned position and it is set inactive when its pellet is eaten. In addition, an advisor was assigned to each ghost. This advisor receives reward of −10 if Pac-Boy bumps into its assigned ghost. Its state space includes Pac-Boy's position and the ghost's position, resulting in $76^2$ states. Because there are on average 37.5 pellets, the average number of advisors running at the beginning of each episode is 39.5.

The learning was performed through Temporal Difference updates. Due to the small state spaces for the advisors, a tabular representation can be used. All learners can be trained in parallel with off-policy learning, with Bellman residuals computed as previously presented and a constant $\alpha=0.1$ parameter. The aggregator function sums the Q-values for each action $a \in A$: $Q(x, a) := \Sigma_j Q_j(x_j, a)$, and uses $\in$-greedy action selection greedy action selection with respect to these summed values.

Here, all advisors were Markov for local-max and rand-policy and that, consequently, stable (off-policy) learning occurs.

In the experiment, time scale was divided into 50 epochs lasting 20,000 transitions each. At the end of each epoch an evaluation phase was launched for 80 games. Each experimental result was presented along two dimensional performance indicators: the averaged non discounted rewards and the average length of the games. The average non discounted rewards can be seen as the number of points obtained in a game. Its theoretical maximum is 37.5 and the random policy average performance is around −80, which corresponds to being eaten around 10 times by the ghosts.

A first baseline was a system that used the exact same input features as the multi-advisor reinforcement learning model. Specifically, the state of each advisor of the multi-advisor reinforcement learning model was encoded with a one-hot vector and all these vectors are concatenated, resulting in a binary feature vector of size 17,252 with about 40 active features per time step. This vector was used for linear function approximation with Q-learning. This baseline is referred to as linear Q-learning.

Two deep RL baselines were also considered. The first was the standard DQN algorithm (see, e.g., Mnih et al., above) with reward clipping (referred to as DQN-clipped). The second was Pop-Art (see, e.g., van Hasselt et al., above), which can be combined with DQN in order to handle large magnitudes of reward (referred to as DQN-scaled). The input to both DQN-clipped and DQN-scaled was a 4-channel binary image, where each channel is in the shape of the game grid and represents the positions of one of the following features: the walls, the ghosts, the pellets, or Pac-Boy.
Experiment: Multi-Advisor Model: Pac-Boy: Attractor Examples Before discussing the results of the experiment, note that there can be situations in Pac-Boy where attractors occur. These situations are described in relation to FIGS. 18 and 19.

FIG. 18 illustrates an example three-pellet attractor in Pac-Boy. As illustrated, the example three-pellet attractor occurs when the game is in a state with equal distance between Pac-Boy 1802 and three pellets 1804, with Pac-Boy 1802 adjacent to a wall 1806, enabling Pac-Boy to perform a no-op action. Moving towards a pellet 1804, makes it closer to one of the pellets 1804, but further from the two other pellets 1804, since diagonal moves are not allowed. Expressing the real value of each action under local-max gives the following results:

$$Q^{lm}(x, N) = \gamma \sum_j \max_{a \in \mathcal{A}} Q_j^{lm}(x_j, a) = 3\gamma^2,$$

$$Q^{lm}(x, S) = Q^{lm}(x, E) = Q^{lm}(x, W) = \gamma + 2\gamma^3.$$

That means that if $\gamma > 0.5$, $Q^{lm}(x, N) > Q^{lm}(x, S) = Q^{lm}(x, E) = Q^{lm}(x, W)$. As a result the aggregator may opt to hit the wall 1806 indefinitely. Optimality is not guaranteed, and in this case, the system behavior would be sub-optimal.

FIG. 19 illustrates an example situation in Pac-Boy without a no-op action. Given the number of corridors in Pac-Boy, it is difficult to find a Pac-Boy situation without a wall enabling the no-op action. Nevertheless, the attractors can be encountered in navigation tasks even in settings without any no-op action For example, as illustrated, the Pac-Boy 1802 is placed in a 2×2 square with eight pellets 1804 surrounding Pac-Boy 1802. The action-state values of the aggregator under local-max are:

$$Q^{lm}(x,N) = Q^{lm}(x,W) = 2\gamma + 4\gamma^2 + 2\gamma^3,$$

$$Q^{lm}(x,S) = Q^{lm}(x,E) = 1 + \gamma + \gamma^2 + 3\gamma^3 + 2\gamma^4,$$

Once again, that means that, if $\gamma > 0.5$, $Q^{lm}(x, N) = Q^{lm}(x, W) > Q^{lm}(x, S) = Q^{lm}(x, E)$. After moving North or West, Pac-Boy 1802 arrives in a state that is symmetrically equivalent to the first one. More generally in a deterministic navigation task like Pac-Boy where each action can be cancelled by a new action, it can be shown that the condition on $\gamma$ is a function of the size of the action set A. A more general result on stochastic navigation tasks can be demonstrated.

If $\forall a \in A$, $\exists a^{-1} \in A$ such that $P(P(x, a), a^{-1}) = x$, and $$R(x, a) \geq 0, \gamma \leq \frac{1}{|A| - 1}$$

is a sufficient condition for showing that the state x is not an attractor. This can be shown by denoting $F_a^x$ as the set of advisors for which action a is optimal in state x. Let $Q_a^{lm}(x)$ be the sum of perceived value of performing action a in state x by the advisors that would choose it:

$$Q_a^{lm}(x) = \sum_{j \in \mathcal{F}_a^x} w_j Q_j^{lm}(x_j', a).$$

Let $a^+$ be the action that maximizes this $Q_a^{lm}(x)$ function:

$$a^+ = \operatorname{argmax}_{a \in \mathcal{A}} Q_a^{lm}(x).$$

Now consider the left hand side of the inequality characterizing attractors:

$$\max_{a \in A} \sum_j Q_j^{lm}(x_j, a) \geq \sum_j Q_j^{lm}(x_j, a^+),$$

$$= Q_{a^+}^{lm}(x) + \sum_{j \notin \mathcal{F}_{a^+}^x} w_j Q_j^{lm}(x_j, a^+),$$

$$= Q_{a^+}^{lm}(x) + \sum_{j \notin \mathcal{F}_{a^+}^x} w_j \left( R(x, a^+) + \gamma \max_{a' \in \mathcal{A}} Q_j^{lm}(x_j', a') \right)$$

Since $R(x, a^+) \geq 0$, and since the a' maximizing $Q_j^{lm}(x_j', a')$ is at least as good as the cancelling action $(a')^{-1}$, it can followed with:

$$\max_{a \in A} \sum_j Q_j^{lm}(x_j, a) \geq Q_{a^+}^{lm}(x) + \sum_{j \notin \mathcal{J}_{a^+}^x} w_j \gamma^2 \max_{a' \in \mathcal{A}} Q_j^{lm}(x_j, a').$$

By comparing this last result with the right hand size, the condition for x not being an attractor becomes:

$$(1 - \gamma)Q_{a^+}^{lm}(x) \geq (1 - \gamma)\gamma \sum_{j \notin \mathcal{J}_{a^+}^x} w_j \max_{a \in A} Q_j^{lm}(x_j, a),$$

$$Q_{a^+}^{lm}(x) \geq \gamma \sum_{a \neq a^+} \sum_{j \in \mathcal{J}_a^x} w_j Q_j^{lm}(x_j, a),$$

$$Q_{a^+}^{lm}(x) \geq \gamma \sum_{a \neq a^+} Q_a^{lm}(x).$$

It follows directly from the inequality $Q_{a^+}^{lm}(x) \geq Q_a^{lm}(x)$, that for $$\gamma \leq \frac{1}{|A| - 1}$$

there is no attractor.

Accordingly, there are sufficient conditions for not having any attractor in the MDP. In the Pac-Boy domain, the cancelling action condition is satisfied for every action in the set of actions. As for the γ condition, it is not only sufficient but also necessary, since Pac-Boy surrounded by goals of equal value is an attractor if $$\gamma > \frac{1}{3}.$$

In practice, an attractor becomes a problem only when there is an action enabling it to remain in the attraction set. Thus, the condition for not being stuck in an attractor set can be related to $$\gamma \leq \frac{1}{(|A| - 2)}.$$

Therefore, the result of γ>½ in examples illustrated by FIGS. 18 and 19. It is still a very restrictive condition, considering that most navigation problems have at least the four 2D actions of this kind.

Notice that there exists many navigation problems where the assumption of cancelling actions does not hold. For instance a car on the top of a hill with two equal goals on each side of the hill would go faster moving down the hill than up. As a consequence, even if the car has only three actions: left, no-op and right, the local-max aggregator would be stuck up in the attractor the hill by repeating the no-op action.

Experiment: Multi-Advisor Model: Pac-Boy: Results

FIGS. 20A-20C illustrate example results of the multi-advisor model applied to Pac-Boy. Seven different settings were compared: three baselines (linear Q-learning, DQN-clipped, and DQN-scaled), local-max with γ=4, local-max with γ=0.9, rand-policy with γ=9, and agg-policy with γ=0.9.

FIG. 20A illustrates the average score of agg-policy against baselines over a number of epochs. As illustrated, linear Q-learning performs the worst. It benefits from no state space reduction and does not generalize as well as the Deep RL methods. The two other baselines, DQN-clipped and DQN-scaled (DQN-Pop-Art), perform better but do not progress after reaching a reward close to 20. By contrast, the average score of agg-policy climbs rapidly and is closer to the upper bound than the baselines.

FIG. 20B illustrates average episode length against baselines over a number of epochs. Despite DQN-clipped and DQN-scaled (DQN-Pop-Art) having similar average scores in FIG. 20A, their learned policies are in fact very different. DQN-scaled (DQN-Pop-Art) appears to be much wearier of the high negative reward obtained from being eaten by the ghosts and thus takes much more time to eat all the pellets. Here too, the agg-policy outperforms the baselines by having a lower number of average steps across the epochs.

FIG. 20C illustrates average scores for different methods over a number of epochs. In particular, FIG. 20C compares performance for agg-policy with γ=0.9, local-max with γ=0.4, local-max with γ=0.9, and random-policy with γ=0.9. The comparison between the bootstrapping methods in FIG. 20C reveals that local-max performs poorly with γ=0.9. This provides empirical confirmation that the theoretical drawbacks previously discussed are also an issue in practice. However, by diminishing the γ value, local-max becomes very efficient, the best in the benchmark. The reason is that a small γ value does not have a large effect in the Pac-Boy domain for both pellet collection and ghost avoidance. The pellet collection problem is similar to the travelling salesman problem, which is known to be NP-complete. The suboptimal policy including moving towards the closest pellet, corresponding with a small γ, is in fact a decent one. Regarding the ghost avoidance, this is where local-max with low γ gets its advantage over other settings: the local optimization provides advantageous control of the system near the ghosts, while with rand-policy and agg-policy, the ghost advisor is uncertain of the aggregator's next action. As a result, they become more conservative around the ghosts, especially rand-policy, which considers each future action as equally likely.

Regarding agg-policy, even though its performance remains near that of local-max, it still suffers from the fact that the local learners cannot fully make sense of the aggregator's actions due to their limited state space representations. Other γ values for agg-policy were tested and a value close to 0.4 appeared to work well in this example by providing a good trade-off between the long-term horizon and the noise in the Q-function propagated by high values of γ. More precisely, a smaller γ made the ghost advisors less fearful of the ghosts, which is profitable when collecting the nearby pellets. But, even if using a very low γ works well (especially for local-max in the Pac-Boy game), it can be dangerous in other environments because the objective function can become distorted and the reward signal diminishes exponentially as a function of the distance to the goal, which might have significant consequences in a noisy environment It is worth mentioning here that hybrid settings with local-max for the ghost advisors and agg-policy for the pellet advisors also achieve very good performance, even with high γ. This can be because stale positions caused by attractors do not matter to ghost advisors which apply a repulsion mechanism and not a goal in of itself.

Experiment: Multi-Advisor Model: Pac-Boy: Results with Noisy Rewards

In another Pac-Boy experiment, several levels of Gaussian white noise $\eta_\sigma$ with standard deviation σ={0.01, 0.1} were applied to the reward signal: at each turn, each advisor now receives $\hat{r}_j = r_j + \eta_\sigma$ instead. Since white noise is used, the Q-functions remain the same, but their estimators obtained during sampling are corrupted by noise variance. Low $\gamma$ values are expected to cause the reward signal to be overwhelmed by this noise, and while high values may propagate the noise further, also propagate the reward signal in such a way that they should be more robust. These expectations were borne out in the experimental results as shown in FIG. 21.

Figure 21:
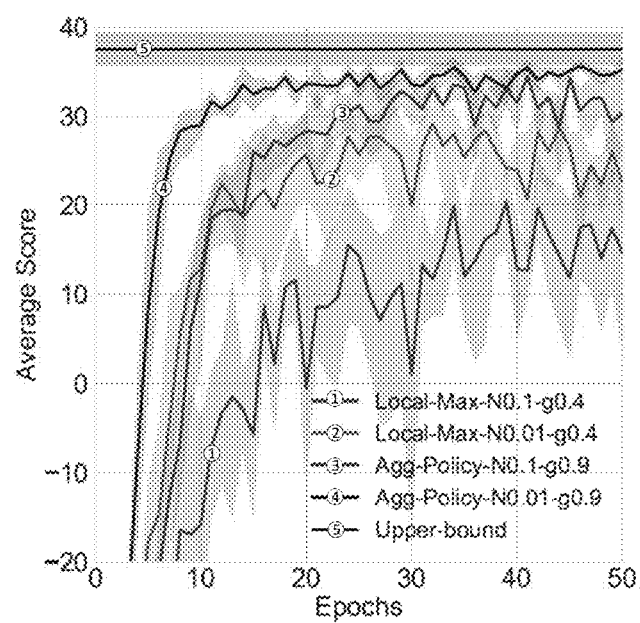
FIG. 21 illustrates average performance for this experiment with noisy rewards.
Figure 26A:
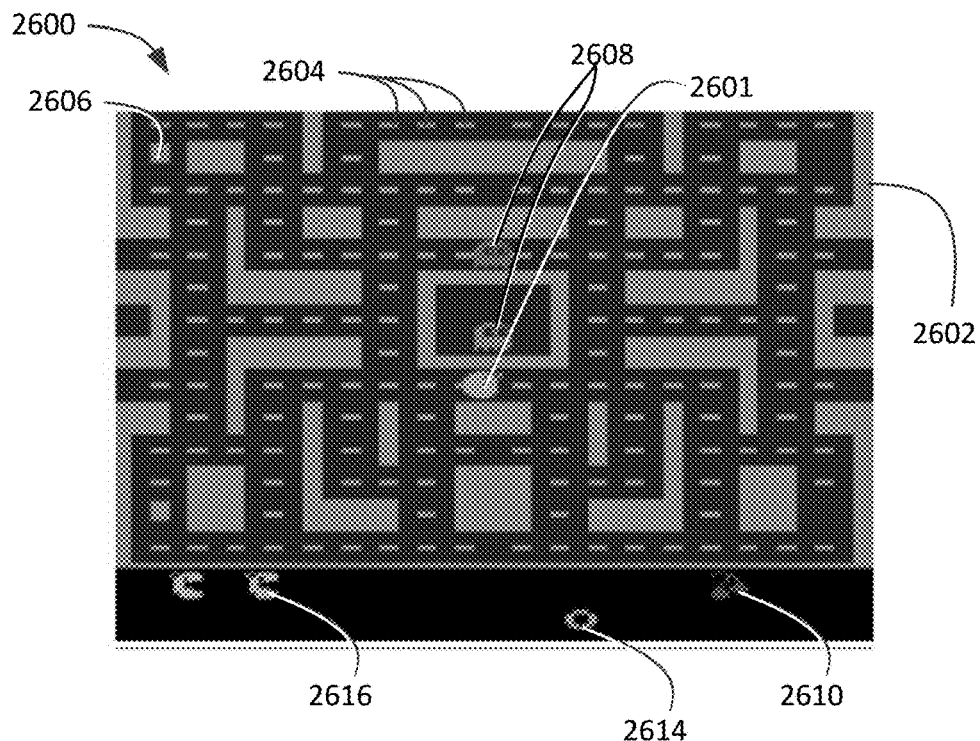
FIGS. 26A-D illustrate four different maps in the ATARI 2600 game MS. PAC-MAN.
Figure 26B:
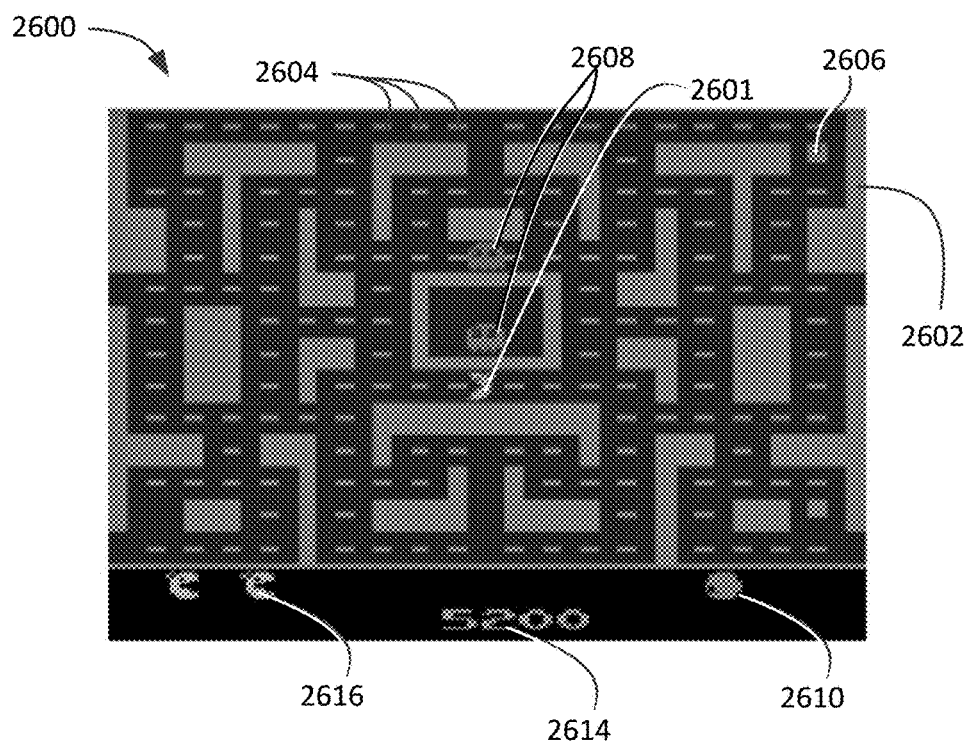
Figure 26C:
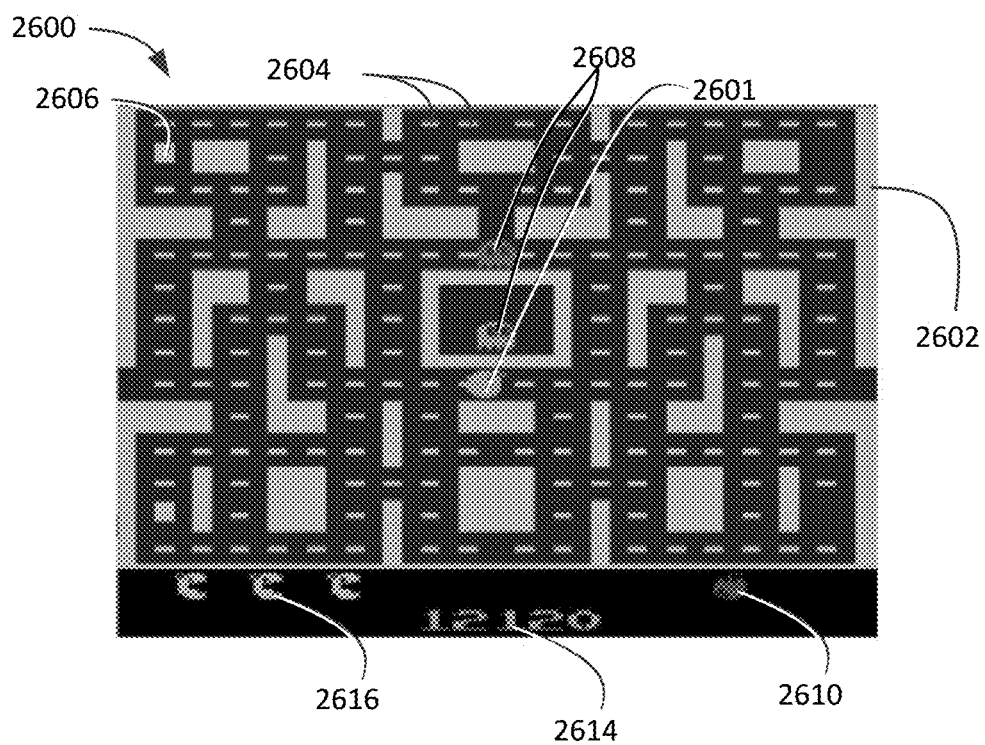
Figure 26D:
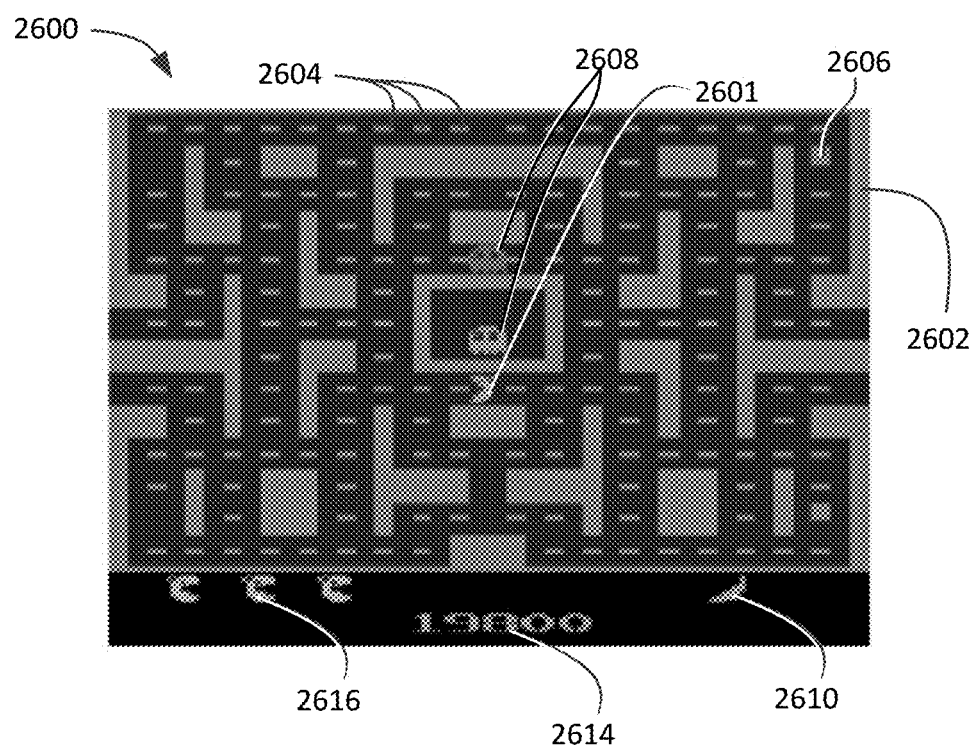

FIG. 21 illustrates average performance for this experiment with noisy rewards. In particular, performance was compared for local-max with $\eta=0.1$ and $\gamma=0.4$, local-max with $\eta=0.01$ and $\gamma=0.4$, agg-policy with $\eta=0.1$ and $\gamma=0.9$, and agg-policy with $\eta=0.01$ and $\gamma=0.9$. As illustrated, agg-policy performed better than local-max even under noise with variance 100 times larger. Indeed, in the experiment, the pellet advisors were able to perceive the pellets that were in a radius dependent on $\gamma$ and $\sigma$, with a lower $\gamma$ implying a lower radius. In the experiment, local-max was incompatible with high $\gamma$ values and was unable perceive distant pellets. The same kind of limitations may be encountered for small $\gamma$ values when the local advisors rely on state approximations, and/or when the transitions are stochastic. Optimizing with respect an artificial $\gamma$ value might converge to policies that are largely suboptimal regarding the true $\gamma$ value in an objective function.

Overview: Multi-Advisor

The multi-advisor framework allows for decomposing a single agent reinforcement learning problem into simpler problems tackled by learners called advisors. The advisors can be trained according to different local bootstrapping techniques. Local-max bootstraps with a local greedy action. It can converge but a sum-max inversion causes its optimal policy to be endangered by attractors. Rand-policy bootstraps with respect to the random policy. It can converge and is robust to attractors, but its random bootstrapping can prevent the advisors from planning in an efficient way. Finally, agg-policy bootstraps with respect to the aggregator's policy. It optimizes the system according to the global Bellman optimality equation, but does not necessarily guarantee convergence.

Each bootstrapping method was compared on the Pac-Boy domain, where the reward function was decomposed. The experiments showed that the attractors caused difficulties for local-max with high $\gamma$ values, but local-max with small $\gamma$ values performed well. In the experiment, agg-policy was almost as good as local-max and can be employed with high $\gamma$ values. Adding noise to the environment disrupts the training with small $\gamma$ values, and limited the effectiveness of local-max in such an environment.

Hybrid Reward Architecture

In a further example, embodiments are presented having a hybrid reward architecture.

A challenge in reinforcement learning (RL) is generalization. In some examples, generalization is achieved by approximating the optimal value function with a low-dimensional representation using a deep network. While this approach works well in many domains, in domains where the optimal value function cannot easily be reduced to a low-dimensional representation, learning can be very slow and unstable.

This section provides a Hybrid Reward Architecture (HRA) relevant to addressing the generalization challenge in RL. HRA takes as input a decomposed reward function and learns a separate value function for each component reward function. Because each component typically only depends on a subset of all features, the overall value function can be much smoother and can be easier approximated by a low-dimensional representation, enabling more effective learning. Experiments with HRA were carried out using a toy-problem and the ATARI game MS. PAC-MAN, where HRA achieved above-human performance.

In reinforcement learning (RL), a goal is to find a behavior policy that maximizes the return—the discounted sum of rewards received over time—in a data-driven way. One challenge of RL is to scale methods such that they can be applied to large, real-world problems. Because the state-space of such problems is typically massive, strong generalization is usually required to learn a good policy efficiently. RL techniques can be combined with deep neural networks.

The generalization properties of Deep Q-Networks (DQN) can be achieved by approximating the optimal value function. A value function predicts expected return, conditioned on a state or state-action pair. Once an optimal value function is known, an optimal policy can be derived. By modelling the current estimate of the optimal value function with a deep neural network, DQN can achieve strong generalization of the value function and the policy. The generalization behavior of DQN can be achieved by regularization on the model for the optimal value function. However, if the optimal value function is very complex, then learning an accurate low-dimensional representation can be challenging. When the optimal value function cannot easily be reduced to a low-dimensional representation, a new, complementary form of regularization can be applied on the target side. The reward function can be replaced with an alternative reward function that has a smoother optimal value function that still yields a reasonable (though not necessarily optimal) policy, when acting greedily.

A key observation behind regularization on the target function is the difference between the performance objective, which specifies what type of behavior is desired, and the learning objective, which provides the feedback signal that modifies an agent's behavior. In RL, a single reward function often takes on both roles. However, the reward function that encodes the performance objective might be bad as a learning objective, resulting in slow or unstable learning. At the same time, a learning objective can be different from the performance objective but still perform well with respect to it.

Intrinsic motivation uses the above observation to improve learning in sparse-reward domains. It can achieve this by adding a domain-specific intrinsic reward signal to the reward coming from the environment. Typically, an intrinsic reward function is potential-based, which maintains optimality of the resulting policy. A learning objective can be defined based on a different criterion: smoothness of the value function, such that it can easily be represented by a low-dimensional representation. Because of this different goal, adding a potential-based reward function to the original reward function may not be a good strategy, because this typically does not reduce the complexity of the optimal value function.

A strategy for constructing a learning objective can be to decompose the reward function of the environment into n different reward functions. Each reward function can be assigned to a separate reinforcement learning agent. These agents can learn in parallel on the same sample sequence by using off-policy learning (e.g., using a Horde architecture). An aggregator can generate or select an action to take with respect to the environment. This can be referred to as an environment action and can define a set of all possible actions that can be taken with respect to the environment. Each agent can give its values for the actions of the current state to an aggregator. In an example, the aggregator can select one of the received actions as the environment action. For example, the aggregator can combine two more received action values into a single action-value for each action (for example, by averaging over all agents). Based on these action-values the current action is selected (for example, by taking the greedy action). In another example, the aggregator combines two or more of the received actions to form the environment action (e.g., combining two actions with the highest action-values). The actions or action values received from the agents may but need not necessarily correspond to actions that can be taken with respect to the environment. For example, an environment may define possible actions as: "Up" and "Down", but there may be a "caution" agent that, rather than describing an action to take, instead provides a warning, such as "Danger: Up", which may indicate that there is danger associated with the up action. Even though "Danger: Up" is not an action that can be taken with respect to the environment, an agent may nonetheless provide such an output, which can affect the action taken.

Hybrid Reward Architecture: Model

In an example HRA model, consider a Markov decision process (MDP) that models an agent interacting with an environment at discrete time steps t. It has a state set S, an action set A, transition probability function P: S×A×→[0,1] and environment reward function $R_{env}$:S×A→$\mathbb{R}$. At time step t, the agent observes state $s_t \in S$ and takes action $a_t \in A$. The agent observes the next state $s_{t+1}$, drawn from the transition probability function P, and a reward $r_t = R_{env}(s_t, a_t)$. The behavior is defined by a policy π:S×A→[0,1], which represents the selection probabilities over actions. The goal of an agent is to find a policy that maximizes the expected return, which is the discounted sum of rewards $G_t$: $\Sigma_{i=0}^{\infty} \gamma^i r_{t+1}$, where the discount factor γ∈[0,1] controls the importance of immediate rewards versus future rewards. Each policy π has a corresponding action-value function that gives the expected return, conditioned on the state and action, when acting according to that policy:

$$Q^\pi(s,a) = \mathbb{E}[G_t|s_t=s,a_t=a,\pi]$$

Model-free methods improve their policy by iteratively improving an estimate of the optimal action-value function $Q^*(s, a) = \text{argmax}_\pi Q^\pi$, using sample-based updates. By acting greedily with respect to Q* (e.g., taking the action with the highest Q*-value in every state), the optimal policy π* is obtained.

Because a Q-value function is high-dimensional, it is typically approximated with a deep network with parameters θ: Q(s, a; θ). DQN estimates the optimal Q-value function by minimizing the sequence of loss functions:

$$\mathcal{L}_i(\theta_i) = \mathbb{E}_{s,a,r,s'}[(y_i^{DQN} - Q(s,a;\theta_i))^2],$$

with $$y_i^{DQN} = r + \gamma_{a'} Q(s',a';\theta_i^-);$$

where $\theta_i^-$ are the parameters of a target network that is frozen for a number of iterations, while the online network Q(S, a, $\theta_i$) is updated.

Let the reward function of the environment be $R_{env}$. The target function of the deep network can be regularized by splitting the reward function into n reward functions, weighted by $w_i$:

$$R_{env}(s, a) = \sum_{i=1}^{n} w_i R_i(s, a), \text{ for all } s, a, s',$$

and training a separate reinforcement-learning agent on each of these reward functions. There are many different decompositions of a reward function possible, but to achieve smooth optimal value functions the decomposition should be such that each reward function is mainly affected by only a small number of state variables. The reward function may be decomposed such that the sub-reward functions depend on a subset of the entire set of state variables. These sub-reward functions may be smooth value functions that are easier to learn. Smooth functions can be simplified in comparison to other value functions and can be described by fewer parameters.

Because each agent has its own reward function, each agent i also has its own Q-value function associated with it: $Q_i$(s, a; θ). To derive a policy from these multiple action-value functions, an aggregator receives the action-values (i.e., a single value for each action), using the same linear combination as used in the reward decomposition.

$$Q_{HRA}(s, a; \theta) = \sum_{i=1}^{n} w_i Q_i(s, a; \theta)$$

By acting greedily with respect to $Q_{HRA}$, the policy can be obtained. The way that $Q_i$ is updated affects performance on large tasks. Traditionally, there is a tradeoff between convergence to an optimal police and efficient learning. Disclosed embodiments can be relevant to achieving more efficient convergence to a close-to-optimal policy. In some embodiments, this can be achieved by acting greedily with respect to Q-values of a uniformly random policy. Evaluating a random can result in Q-values of individual agents being fully independent of each other, which can result in a smooth value function that can be efficiently learned.

In an example, let $\bar{\pi}$ be a uniform random policy. The function $Q_i^{\bar{\pi}}$ can be estimated by updating $Q_i$ according to:

$$Q_i(s_t,a_t) \leftarrow (1-\alpha)Q_i(s_t,a_t) + \alpha U_{t,i}$$

with $U_{t,i}$ being an update target defined as:

$$U_{t,i} = R_i(s_t, a_t, s_{t+1}) + \frac{\gamma}{|A|} \sum_{a' \in A} Q_i(s_{t+1}, a'),$$

where |A| is the number of actions. This update can be referred to as a local-mean update.

Different agents can share multiple lower-level layers of a deep Q-network, the collection of agents can be viewed alternatively as a single agent with multiple heads, with each head producing the action-values of the current state under a different $Q_i$. A single vector θ can be used for the parameters of this network. Each head can be associated with a different reward function.

FIG. 22 illustrates an example single-head architecture having a single reward function: $R = \Sigma_{i=1}^{i=3} R_i$.

FIG. 23 illustrates an example HRA with multiple heads, each having its own reward function R. The loss function for HRA is:

$$\mathcal{L}_i(\theta_i) = \mathbb{E}_{s,a,r,s'}\left[\sum_{n=1}^{N}(y_{n,i} - Q_n(s, a; \theta_i))^2\right],$$

$$y_{n,i} = R_n(s, a, s') + \gamma \max_{a'} Q_n(s', a'; \theta_i^-).$$

By minimizing this loss function, the different heads of HRA approximate the optimal action-value functions under the different reward functions $Q_1^*, \ldots, Q_n^*$. Further, $Q_{HRA}^*$ can be defined as follows:

$$Q_{HRA}^*(s, a) := \sum_{i=1}^{n} w_i Q_i^*(s, a) \text{ for all } s, a.$$

Therefore, the aggregator's Q-values approximate $Q_{HRA}^*$. In general, $Q_{HRA}^*$ is not equal to $Q_{env}^*$, the optimal value function corresponding to $R_{env}$. If HRA's policy performs poorly with respect to $R_{env}$, a different aggregation scheme can be used, for example, instead of mean over heads, an aggregator action-value could be defined as the max over heads, or a voting based aggregation scheme could be used. Alternatively, an update target based on the expected State-Action-Reward-State-Action update rule can be used:

$$y_{n,i} = R_n(s, a, s') + \gamma \sum_{a'} \pi(s', a') Q_n(s', a'; \theta_i^-).$$

In this case, minimization of the loss function results in the heads approximating the action-values for $\pi$ under the different reward functions: $Q_1^\pi, \ldots, Q_n^\pi$. And $Q_{HRA}^\pi(s, a):=\sum_{i=1}^{n} w_i Q_i^\pi(s, a)$. In contrast to $Q_{HRA}^*$, $Q_{HRA}^\pi$ can be equal to $Q_{env}^\pi$, as shown below. With the aggregator $Q_{HRA}(s, a; \theta) \sum_{i=1}^{n} w_i Q_i(s, a; \theta)$, for any reward decomposition the following holds:

$$Q_{HRA}^\pi(s,a) = Q_{env}^\pi \text{ for all } s,a.$$

because:

$$Q_{env}^\pi(s, a) = \mathbb{E}\left[\sum_{i=0}^{\infty} \gamma^i \sum_{k=1}^{n} w_k R_k(s_{t+i}, a_{t+i}) \Big| s_t = s, a_t = a, \pi\right],$$

$$= \sum_{k=1}^{n} w_k \cdot \mathbb{E}\left[\sum_{i=0}^{\infty} \gamma^i R_k(s_{t+i}, a_{t+i}) \Big| s_t = s, a_t = a, \pi\right],$$

$$= \sum_{k=1}^{n} w_k Q_k^\pi(s, a)$$

$$= Q_{HRA}^\pi(s, a).$$

Accordingly, a local-mean update with an aggregator that implements $Q_{HRA}(s, a) = \sum_{i=1}^{n} w_i Q_i(s, a)$ can converge to the Q-values of the random policy with respect to the full reward function, $R_{env}$. This becomes useful because, acting greedily with respect to the Q-values of a uniformly random policy evaluated under $R_{env}$ can result in very good performance with respect to $R_{env}$. Because acting greedily with respect to Q-values of a random policy results in sub-optimality, it would be expected that it may result in poor performance; however, counterintuitively, it can result in good performance, as will be shown in the experiment section.

In some approaches, HRA builds on the Horde architecture. The Horde architecture includes a large number of "demons" that learn in parallel via off-policy learning. Each demon trains a separate general value function (GVF) based on its own policy and pseudo-reward function. A pseudo-reward can be any feature-based signal that encodes useful information. The Horde architecture can focus on building general knowledge about a world encoded via a large number of GVFs. In some examples, HRA focuses on training separate components of the environment-reward function to achieve a smoother value function to efficiently learn a control policy. In some examples, HRA can apply multi-objective learning to smooth a value function of a single reward function.

Some approaches can be related to options and hierarchical learning. Options are temporally-extended actions that, like HRA's heads, can be trained in parallel based on their own (intrinsic) reward functions. However, once an option has been trained, the role of its intrinsic reward function is over. A higher-level agent that uses an option sees it as just another action and evaluates it using its own reward function. This can yield great speed increases in learning and help substantially with better exploration, but they do not directly make the value function of the higher-level agent less complex. The heads of HRA can represent values, trained with components of the environment reward. Even after training, these values can stay relevant because the aggregator uses the values of all heads to select its action.

Hybrid Reward Model: Improving Performance with High-Level Domain Knowledge

In its basic setting, the only domain knowledge applied to HRA is in the form of the decomposed reward function. However, one of the strengths of HRA is that it can easily exploit more domain knowledge, if available. In particular, domain knowledge can be exploited in one of the following three ways:

1) By removing irrelevant features. Features that do not affect the received reward in any way (directly or indirectly) only add noise to the learning process and can be removed.

2) By identifying terminal states. Terminal states are states from which no further reward can be received; they have by definition a value of 0. Using this knowledge, HRA can refrain from approximating this value by the value network, such that the weights can be fully used to represent the non-terminal states.

3) By using pseudo-reward functions. Instead of updating a head of HRA using a component of the environment reward, it can be updated using a pseudo-reward. In this scenario, each head of HRA representatives a GVF. GVFs are more general than value functions based on reward components and they can often be used to learn more efficiently. However to derive a policy from them requires a more specialized aggregator.

The first two types of domain knowledge are not limited to being used only by HRA; they can be used many different methods. However, because HRA can apply this knowledge to each head individually, it can exploit domain knowledge to a much greater extent.

The HRA approach was tested in two different experiment domains: the previously-discussed fruit collection problem (e.g., reaching 5 randomly located fruits), and the ATARI 2600 game MS. PAC-MAN, one of the hard games from the Arcade Learning Environment (ALE) benchmark set.

Hybrid Reward Model: Experiments

In a first experiment, the performance of HRA is compared with a standard DQN that uses the same network on a small toy domain. The performance of HRA can be improved by adding different forms of domain knowledge. In a second experiment, performance on the challenging MS. PAC-MN domain is shown.

Hybrid Reward Model: Experiments: Fruit Collection Task

In a first domain, there is an agent controlling a robot for collecting a number of random pieces of fruit as quickly as possible in a 10×10 grid. There are ten possible fruit locations, spread across the grid. At the start of each episode, on five of those ten locations (selected at random) a piece of fruit appears. The agent starts at a random position. An episode ends after all five pieces of fruit have been eaten, or over 300 steps, whichever comes first.

FIG. 24 illustrates an example DQN neural network 2410, HRA neural network 2420, and HRA with pseudo-rewards neural network 2430.

The DQN neural network 2410 can include an input layer 2412, one or more hidden layers 2414, and an output layer 2416 used to produce an output 2418. Backpropagation can be used to train the neural network 2410 based on error measured at the output 2418.

The HRA neural network 2420 includes an input layer 2422, one or more hidden layers 2424, and a plurality of heads 2426, each with their own reward function (as illustrated $R_1$, $R_2$, and $R_3$). The heads 2426 inform the output 2428 (e.g., using a linear combination). Backpropagation can also be used to train the HRA neural network 2420. Backpropagation can be used to train the neural network 2420 based on error measured at each of the reward function heads 2426. By measuring error at the heads 2426 (e.g., rather than at the output 2428 as in the DQN network 2410), faster learning can occur.

In an example, the DQN neural network 2410 and the HRA neural network 2420 can have the same network architecture but differ in how the network is updated. In the DQN neural network 2410, a gradient based on $R_{env}$ can be computed and the gradient is propagated through the network from the output 2418. In the HRA neural network 2420, the gradient can be propagated from the layer prior to the last layer: the heads 2426.

The HRA with pseudo-rewards neural network 2430 can include an input layer 2432, one or more hidden layers 2434, a plurality of heads 2436 with general value functions (as illustrated $R_1'$, $R_2'$, and $R_3'$), mappings 2437 from the results of the generalized value functions to output for the head 2438, and an overall output for the network 2430. As an example of a mapping 2437, consider the fruit-collection example where there can be heads 2426 that provide a reward for reaching a particular location that can have a piece of fruit. The mapping 2437 may be based on whether there actually was a piece of fruit at a current location. If so, the mapping 2437 can prove the value of the general value function for the location. If not, the mapping 2437 can provide an output with a value of zero. In this manner, there can be learning even if there is no fruit at a particular location. For example, the weights of the network 2430 can be updated via backpropagation based on the error of the general value function regardless of whether there is fruit at the location. The mappings 2437 can be used to filter out results where the fruit is not there prior to providing the output of the heads 2438, so as to not affect the overall output of the network 2439 (and thus a decision taken by an agent based on the network 2430) while still allowing for training.

In an example, the HRA with pseudo-rewards neural network 2430 the heads 2438 are not updated directly. Instead, general value functions learn based on a pseudo-reward. The output of the general value functions can then be used to compute the output of each head 2438.

In the experiments, the performance of DQN was compared with HRA. The learning objective for DQN gave a +1 reward for each piece of fruit and used γ=0.95. For HRA, the reward function was decomposed into ten different reward functions: one per possible fruit locations. The network included an input layer of length 110, encoding the agent's position and whether there is a piece of fruit on each location. This was followed by a fully connected hidden layer of length 250. This layer was sparsely connected to ten heads of four linear nodes each, representing the action-values of the four actions under the different reward functions. The mean of nodes across heads was computed using a linear layer of length four that connected the output of corresponding nodes in each head. This layer had fixed weights with value 1/10 that are not updated. HRA updated the network from the second layer using the HRA loss function described above and the DQN used the DQN loss function described above.

Besides the full network, different levels of prior knowledge were tested, as outlined above, including removing the irrelevant features for each head (e.g., only providing the position of the agent and the corresponding fruit feature), identifying terminal states, and using pseudo rewards for learning GVFs that go to each of the ten locations. Advantageously, these GVFs can be trained even if there is no fruit at these locations anymore. The head for a particular fruit copied the Q-values of the GVF corresponding to the fruit's location or output zeroes if there is currently no fruit at the location.

Experiments were performed with update targets that estimate some optimal policy, as well as evaluate the random policy. For DQN estimating the optimal policy performed better, while for HRA estimating the random policy performed better. Further, the step-size for each method was optimized.

FIG. 25A illustrates the results comparing DQN max, DQN max (removed features), HRA mean, and HRA mean (removed features). In the experiment, HRA showed a clear performance boost over DQN by requiring fewer steps, even though the network was identical. Further, adding different forms of domain knowledge caused additional large improvements. Whereas using a network structure enhanced by domain knowledge caused large improvements for HRA, using that same network for DQN, resulted in DQN not learning anything at all. In the experiments, there was a big boost in performance that occurred when the terminal states were identified due to the representation becoming a one-hot vector. Hence, the hidden layer was removed and directly fed in the one-hot vector into the different heads. Because the heads are linear, this representation reduces to an exact, tabular representation resulting in an optimal step-size of 1.0 versus an optimal step-size of around 0.001 for the other methods.

FIG. 25B illustrates results comparing tabular HRA GVF, Tabular HRA, and HRA mean (removed features). As illustrated, the Tabular HRA GVF converged to a low number of average steps much more quickly than tabular HRA and HRA mean (removed features).

Hybrid Reward Model: Experiments: MS. PAC-MAN

A second domain experiment was performed using is the ATARI 2600 game MS. PAC-MAN. In MS. PAC-MAN the player scores points by reaching pellets in a map while avoiding ghosts.

FIGS. 26A-D each illustrate the four different maps 2601 in the game. Each of the four different maps 2601 include a different maze formed by walls 2602. Within the maze are pellets 2604 and power pellets 2606. Ghosts 2608 and bonus fruit 2610 can also appear in the maze. The player controls Ms. Pac-Man 2612 during the game. Points 2614 are scored when Ms. Pac-Man 2612 "eats" (reaches) the pellets 2604 and power pellets 2606. Contact with a ghost 2608 causes Ms. Pac-Man 2612 to lose a life 2616, but eating one of the power pellets 2606 turns ghosts 2608 blue for a small duration, allowing them to be eaten for extra points. Bonus fruit 2610 can be eaten for extra points twice per level. When all pellets 2604 and power pellets 2606 have been eaten, a new map 2601 is started. There are seven different types of fruit 2610, each with a different point value.

Different points are granted for "eating" different kinds of objects. The points associated with eating the various objects are shown in Table 3, below. Different levels of the game are associated with different maps and different kinds of fruit as shown in Table 4, below.

TABLE 3

Points per object

| Object | Points |
|---|---|
| Pellet | 10 |
| Power Pellet | 50 |
| 1st blue ghost | 200 |
| 2nd blue ghost | 400 |
| 3rd blue ghost | 800 |
| 4th blue ghost | 1,600 |
| Cherry | 100 |
| Strawberry | 200 |
| Orange | 500 |
| Pretzel | 600 |
| Apple | 1,000 |
| Pear | 2,000 |
| Banana | 5,000 |

TABLE 4

Maps and fruit per level

| Level | Map | Fruit |
|---|---|---|
| 1 | Red (FIG. 26A) | Cherry |
| 2 | Red | Strawberry |
| 3 | Blue (FIG. 26B) | Orange |
| 4 | Blue | Pretzel |
| 5 | White (FIG. 26C) | Apple |
| 6 | White | Pear |
| 7 | Green (FIG. 26D) | Banana |
| 8 | Green | <Random> |
| 9 | White | <Random> |
| 10 | Green | <Random> |
| 11 | White | <Random> |
| 12 | Green | <Random> |
| ... | ... | ... |

In the MS. PAC-MAN experiment, the performance of the HRA framework was compared to an Asynchronous Advantage Actor-Critic (A3C) model.

In the experiment, the bottom part and top part of the game's screen were cut to reach a size of 160×160 pixels. From this, the position of different objects were extracted and a separate input channel for each object was created. This resulted in eleven binary channels of a size of 40×40. There was a channel for Ms. Pac Man 2601, each of the ghosts 2608, each of blue ghosts, the fruit 2610, and one channel with all of the pellets 2604 (including power pellets 2606). For A3C, the channels of the ghosts 2607 were combined into a single channel to allow it to generalize better across ghosts. The same was done with the blue ghosts. For HRA, the pellets channel was not used and instead the HRA learned the location of each pellet. This use of channels, which can be referred to as A3C (channels) is different from typical processing in the ATARI benchmark set, which is pixel based (referred to here as A3C (pixels)).

Hybrid Reward Model: Experiments: MS. PAC-MAN: HRA Architecture

The HRA architecture for this experiment used one head for each pellet, one head for each ghost, and one head for each blue ghost, and one head for the fruit. Similar to the fruit collection task, HRA used GVFs that learned the Q-values for reaching a particular location on the map (separate GVFs can be learned for each of the maps in the game). The agent learns part of this representation during training. It started with zero GVFs and zero heads for the pellets. By wandering around the maze, it discovered new map locations it could reach, which resulted in new GVFs being created. Whenever the agent found a pellet at a new location, it created a new head corresponding to the pellet.

The Q-values of the head of an object (e.g., pellet, fruit, ghost, or blue ghost) were the Q-values of the GVF that correspond with the object's location (e.g., moving objects use a different GVF each time). If an object was not on the screen, its Q-values were zero. Each head i was assigned a weight $w_i$, which could be positive or negative. For the head of a pellet/blue ghost/fruit, the weight corresponded to the reward received when the object is eaten. For the regular ghosts, the weights were set to −1,000 because contact with a ghost causes Ms. Pac-Man to lose a life.

Two aggregator types were tested. The first one was linear that summed the Q-values of all heads multiplied with the weights. For the second one, the weighted sum of all the heads that produce points was taken, and the resulting Q-values were normalized; then, the weighted Q-values of the heads of the regular ghosts were added.

For exploration, two complementary types of exploration were tested. Each type added an extra exploration head to the architecture. The first type ("diversification") produced random Q-values drawn from a uniform distribution in [0, 20]. The second type ("count-based") added a bonus for state-action pairs that were not significantly explored. For a final experiment, a special head implemented an executive memory capability.

GVF Heads: Eaters and Avoiders:

Ms. Pac-Man's state was defined as its low-level features position on the map and her direction (North, South, East, or West). Depending on the map, there are about 400 positions and 950 states. A GVF was created online for each visited Ms. Pac-Man position. Each GVF was then in charge of determining the value of the random policy of Ms. Pac-Man's state for getting the pseudo-reward placed on the GVF's associated position. The GVFs were trained online with off-policy one-step bootstrapping with $\alpha=1$ and $\gamma=0.99$. Thus, the full tabular representation of the GVF grid contained $$nb_{maps} \times nb_{positions} \times nb_{states} \times nb_{actions} \approx 14M$$

entries.

Aggregator:

For each object of the game (e.g., pellets, ghosts, and fruits), the GVF corresponding to its position was activated with a multiplier depending on the object type. Edible objects' multipliers were consistent with the number of points they grant (e.g., a pellet multiplier was 10, a power pellet multiplier was 50, a fruit multiplier was 200, and a blue-and-edible-ghost multiplier was 1000). A ghost multiplier of −1000 appeared to produce a fair balance between gaining points and not losing a life. Finally, the aggregator summed up all the activated and multiplied GVFs to compute a global score for each nine actions and choose the action that maximized it.

Figure 27:
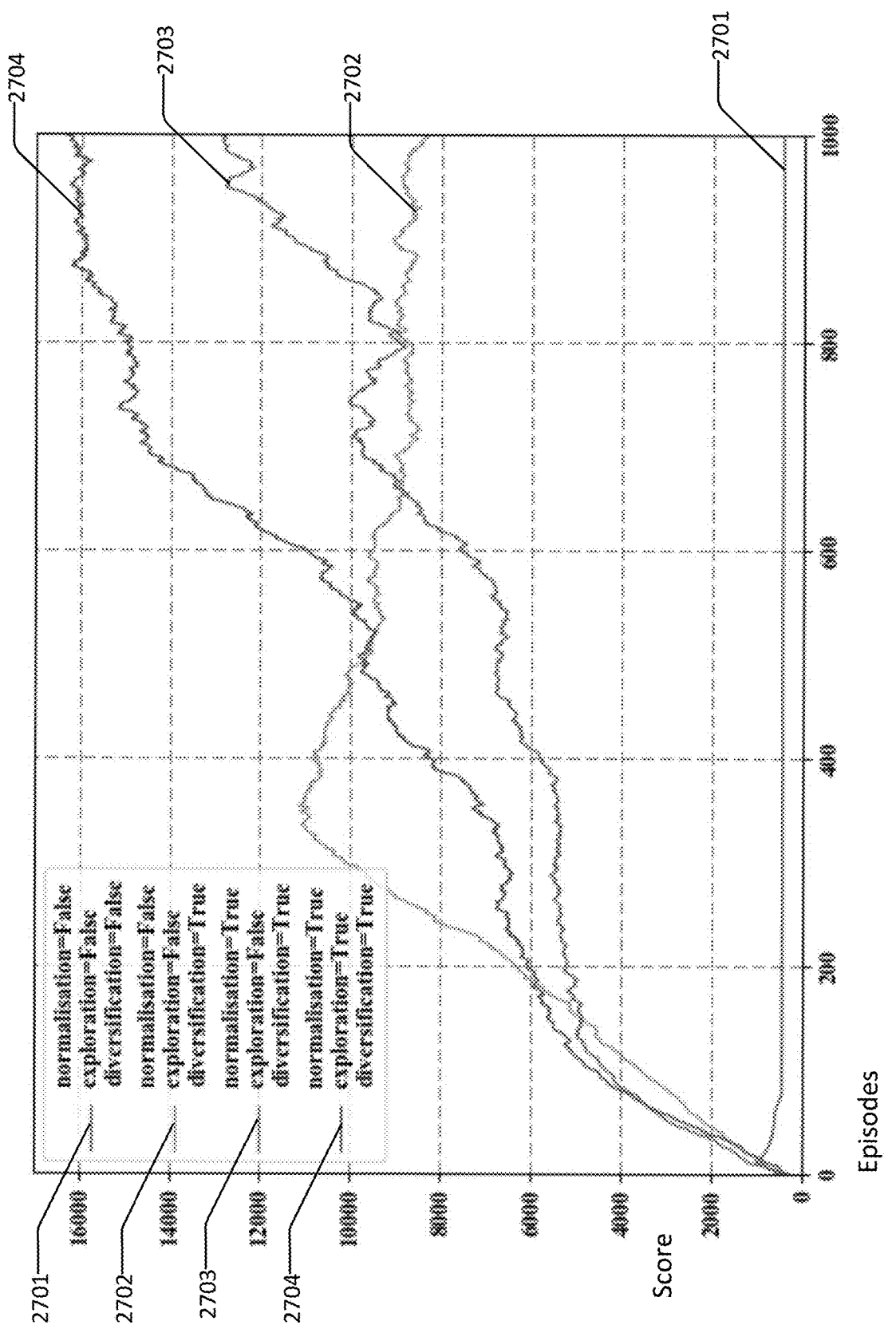
FIG. 27 illustrates training curves for incremental head additions to the HRA architecture.

FIG. 27 illustrates training curves (scores over episodes) for incremental head additions to the HRA. These curves include curve 2701 showings results for a HRA without normalization, exploration, or diversification; curve 2702 showing results for a HRA without normalization or exploration but with diversification; curve 2703 showing results for a HRA with normalization and diversification but without exploration; and curve 2704 showing results for a HRA with normalization, exploration, and diversification.

Curve 2701 on FIG. 27 reveals that a HRA with naïve settings without normalization, exploration, or diversification performs relatively poorly because it tends to deterministically repeat a bad trajectory like a robot hitting a wall continuously.

Diversification Head.

In order to address the pitfall shown in curve 2701, an exploratory mechanism can be added to the HRA. An $\in$-greedy exploration may be less suitable for this problem since it might unnecessarily put Ms. Pac-Man in danger. A Boltzmann-distributed exploration can be more suitable because it favors exploring the safe actions. It would be possible to apply it on top of the aggregator, but here a diversification head that generates for each action a random value was added. This random value was drawn according to a uniform distribution in [0,20]. Experiments indicate that it was only necessary during the first fifty steps to ensure starting each episode randomly.

The HRA of curve 2702 builds on the settings of the HRA of curve 2701 by adding a diversification head that addresses the determinism issue. The architecture progressed quickly up to about 10,000 points, but then started regressing. The analysis of the generated trajectories reveals that the system had difficulty finishing levels: when only a few pellets remained on the screen, the aggregator was overwhelmed by ghost avoider values. The regression in score can be explained by the system becoming more adverse to ghosts the more it learns, which makes it difficult to finish levels.

Score Heads Normalization:

This issue shown in curve 2702 can be addressed by modifying the additive aggregator with a normalization over the score heads between 0 and 1. To fit this new value scale, the ghost multiplier was modified to −10.

The HRA of curve 2703 builds on the HRA of curve 2702 by adding normalization, and curve 2703 shows results that grow over time as expected. It might be surprising to see that curve 2702 grows faster than curve 2703, but it is because the episodes without normalization tend to last much longer, which allows more GVF updates per episode.

Targeted Exploration Head:

In order to speed up learning, a targeted exploration head (teh) that is motivated by trying out the less explored state-action couples was used. The value of this agent is computed as follows:

$$\text{value}_{teh}(s, a) = \kappa \sqrt{\frac{\sqrt[4]{N}}{n(s, a)}},$$

where N is the number of actions taken until now and n(s, a) is the number of times an action a has been performed in state s. This formula replaces the stochastically motivated logarithmic function of an upper confidence bounds approach (see Auer et al.) with a less drastic one that is more compliant with bootstrapping propagation. The targeted exploration head is not necessarily a replacement for a diversification head. Rather, they are complimentary: diversification for making each trajectory unique and targeted exploration for prioritized exploration.

The HRA of curve 2704 builds on the HRA of curve 2703 by adding targeted exploration. The HRA of curve 2704 reveals that the new targeted exploration head helps exploration and makes the learning faster. This setting constitutes the HRA architecture that will be used in further experiments.

Executive Memory Head:

When a human game player maxes out cognitive and physical ability, the player may start to look for favorable situations or even glitches to memorize. This cognitive process can be referred to as executive memory. The executive memory head records every sequence of actions that led to pass a level without any player deaths. Then, when facing the same level, the head gives a very high value to the recorded action, in order to force the aggregator's selection. Since it does not allow generalization this head was only employed for the level-passing experiment. An executive memory head can be added to HRA to further improve results.

Hybrid Reward Model: Experiments: MS. PAC-MAN: Results

MS. PAC-MAN is considered as one of the hardest games from the ALE benchmark set. There are two different evaluation methods used across literature to compare performance. Because ALE is ultimately a fully deterministic environment (it implements pseudo-randomness using a random number generator that always starts with the same seed), both evaluation metrics aim to create randomness in the evaluation in order to rate methods with more generalizing behavior higher. The first metric introduces a mild form of randomness by taking a random number of no-op actions before control is handed over to the learning algorithm (called a "fixed start"). In the case of Ms. Pac-Man, however, the game starts with a certain inactive period that exceeds the maximum number of no-op steps, resulting in the game having a fixed start after all. The second metric selects random starting points along a human trajectory and results in much stronger randomness, and does result in the intended random start evaluation (called a "random start").

Table 5, below, illustrates final, high-scores for various methods. The best-reported fixed start score comes from STRAW (Vezhnevets et al, 2016); the best reported random start comes from the Dueling network architecture (Wang et al., 2016). The human fixed start score comes from Mnih et al (2015); the human random start score comes from Nair et al. (2015).

TABLE 5

Final Scores

| Method | Fixed Start Score | Source | Random Start Score | Source |
|---|---|---|---|---|
| HRA | 25,304 | — | 23,770 | — |
| A3C (pixels) | 2,168 | — | 626 | — |
| A3C (channels) | 2,423 | — | 589 | — |

TABLE 5-continued

Final Scores

| Method | Fixed Start Score | Source | Random Start Score | Source |
|---|---|---|---|---|
| A3C (Reported) | — | — | 654 | Mnih et al. (2016) |
| Best reported Agent | 6,673 | Vezhnevets et al. (2016) | 2,251 | Wang et al. (2016) |
| Random | 308 | Mnih et al. (2015) | 198 | Nair et al. (2015) |
| Human | 15,693 | Mnih et al. (2015) | 15,375 | Nair et al. (2015) |
| DQN | 2,311 | Mnih et al. (2015 | 764 | Nair et al. (2015) |
| DDQN | 3,210 | Van Hasselt et al. (2016b) | 1,241 | Van Hasselt et al. (2016b) |
| Prio. Exp. Rep. | 6,519 | Schaul et al. (2016) | 1,825 | Schaul et al. (2016) |
| Dueling | 6,284 | Wang et al. (2016) | 2,251 | Wang et al. (2016) |
| Gorila | 3,234 | Nair et al. (2015) | 1,263 | Nair et al. (2015) |
| Pop-art | 4,964 | Van Hasselt et al. (2016a) | — | — |
| STRAW | 6,673 | Vezhnevets et al (2016) | — | — |

In the MS. PAC-MAN experiment, the performance of the HRA framework was compared to an Asynchronous Advantage Actor-Critic (A3C) model. A3C was trained for 800 million frames. Because HRA learns quickly, it was trained for only 5,000 episodes, which corresponds to approximately 150 million frames. The score shown for HRA uses the best combination: with normalization, diversification, and exploration. Different combinations (with/without normalization and with/without each type of exploration) was also tried for HRA. All of the combinations achieved over 10,000 points in training, except the combination with no exploration at all, which performed poorly. With the best combination, HRA not only outperforms on both metrics, it also significantly outperforms the human score.

Comparing A3C (pixels) and A3C (channels) in Table 5 shows that while advanced preprocessing was used by separating the screen image into relevant object channels, it does not appear to significantly change the performance of A3C.

The use of low level features for the HRA architecture allow for the implementation of A3C and evaluated it both on the pixel-based environment and the low-level features.

The implementation of A3C was performed in a way to reproduce the results of Mnih et al (2016). The pixel-based and low-level A3C implementations were trained similarly as in Mnih on $8 \times 10^8$ frames with $\gamma=0.99$, entropy regularization of 0.01, n-step return of 5, 16 threads, gradient clipping of 40, and $\alpha$ set to take the maximum performance over the following values: [0.0001, 0.00025, 0.0005, 0.00075, 0.001]. The pixel-based environment was a reproduction of the preprocessing and the network except a history of two was used because the steps were twice as long.

With the low-level features, five channels of a 40×40 map were used with the positions of Ms. Pac-Man, the pellets, the ghosts, the blue ghosts, and the special fruit. The input space was therefore 5×40×40 plus the direction appended after convolutions: 2 of them with 16 (respectively 32) filters of size 6×6 (respectively 4×4) and substampling of 2×2 and ReLU activation (for both). Then, the network used a hidden layer of 256 fully connected units with ReLU activation. Finally, the policy head had $nb_{actions}=9$ fully connected unit with softmax activation, and the value head had 1 unit with linear activation. All weights were uniformly initialized.

Training Curves.

Figure 28:
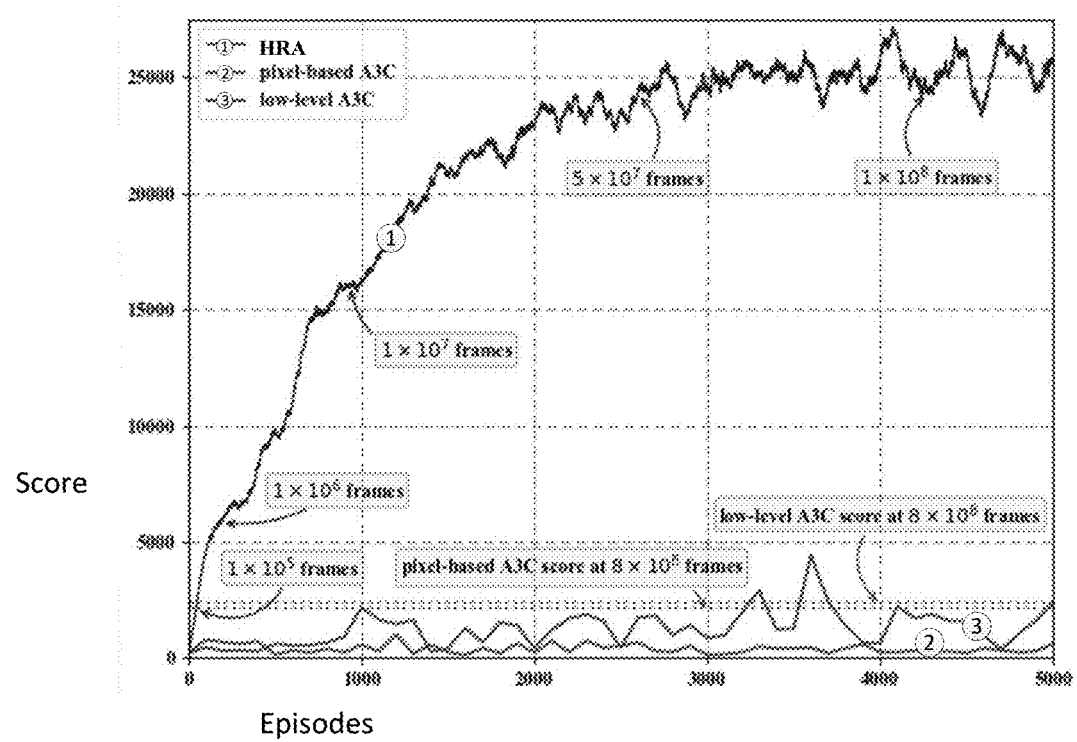
FIG. 28 compares training curves of HRA with the Asynchronous Advantage Actor-Critic (A3C) baselines.

FIG. 28 compares training curves for HRA, pixel-based A3C baseline, and low-level A3C baseline. The curves reveal that HRA reaches an average score of 25,000 after only 3,000 episodes. This is ten times higher than the A3C baselines after 100,000 episodes, and four times higher than the best result in the literature (6,673 for STRAW by Vezhnevets et al 2016) and 60% higher than human performance.

Random Start Evaluation:

HRA reached a score of 23,770 on this evaluation which is forty times higher than the A3C baselines (626 for pixel-based A3C and 589 for low-level A3C) and ten times higher than the best-reported result in the literature (2,251 for Dueling, Wang et al. 2016). This shows that the HRA model does not overfit. The diversification head helps resist the HRA being stuck in a local optimum, so the HRA does not become stuck replaying the same successful trajectory.

Level Passing Experiment.

In this experiment, the determinism of ALE environment was exploited by using the executive memory head. This experiment intends to demonstrate the HRA ability to integrate various techniques and compare it with the best human performance ever recorded (according to highscore.com, as of May 20, 2017, the high score for MS. PAC-MN on an emulated ATARI 2600 is 266,330 points, set by user oyama-family).

Figure 29:
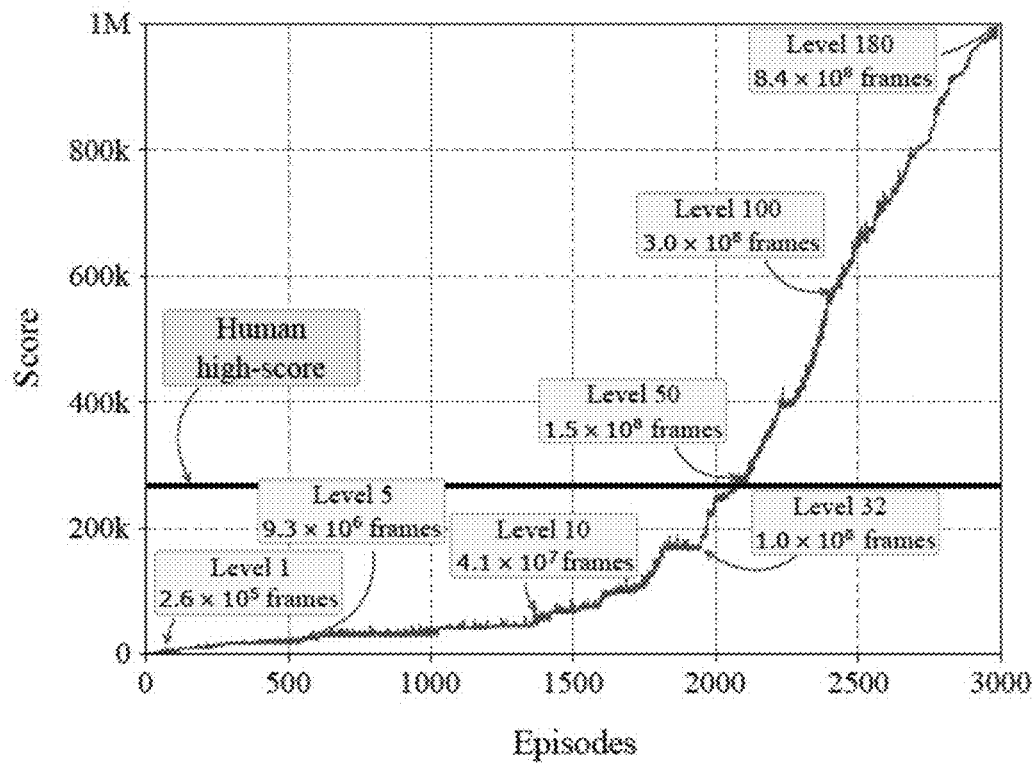
FIG. 29 illustrates a training curve for HRA in the game MS. PAC-MAN smoothed over 100 episodes for a level passing experiment

FIG. 29 illustrates a training curve for HRA in the game MS. PAC-MAN smoothed over 100 episodes for the level passing experiment. The curves include a curve showing scores for HRA, pixel-based A3C, and low-level A3C. As illustrated, in this experiment, HRA was able to exploit the weakness of the fixed-start evaluation metric by using executive memory capabilities. The training curve shows that HRA was able to achieve the maximum possible score of 999,990 points in less than 3,000 episodes. The curve is slow in the first stages as the model is trained, but, even though the further levels become more difficult, the level passing speeds up because the HRA is able to take advantage of already knowing the maps.

In MS. PAC-MAN it appears to be impossible to reach 1,000,000 points, because the developers of the game did not allow it graphically or in RAM. Therefore, HRA appears to be the first to reach the maximum score of 999,990 points.

Grid Search Experiment.

In another experiment, a grid search was performed for $\gamma$ values both with and without executive memory. Values of [0.95, 0.97, 0.99] were tried independently for both $\gamma_{score}$ and $\gamma_{ghosts}$.

Figure 30:
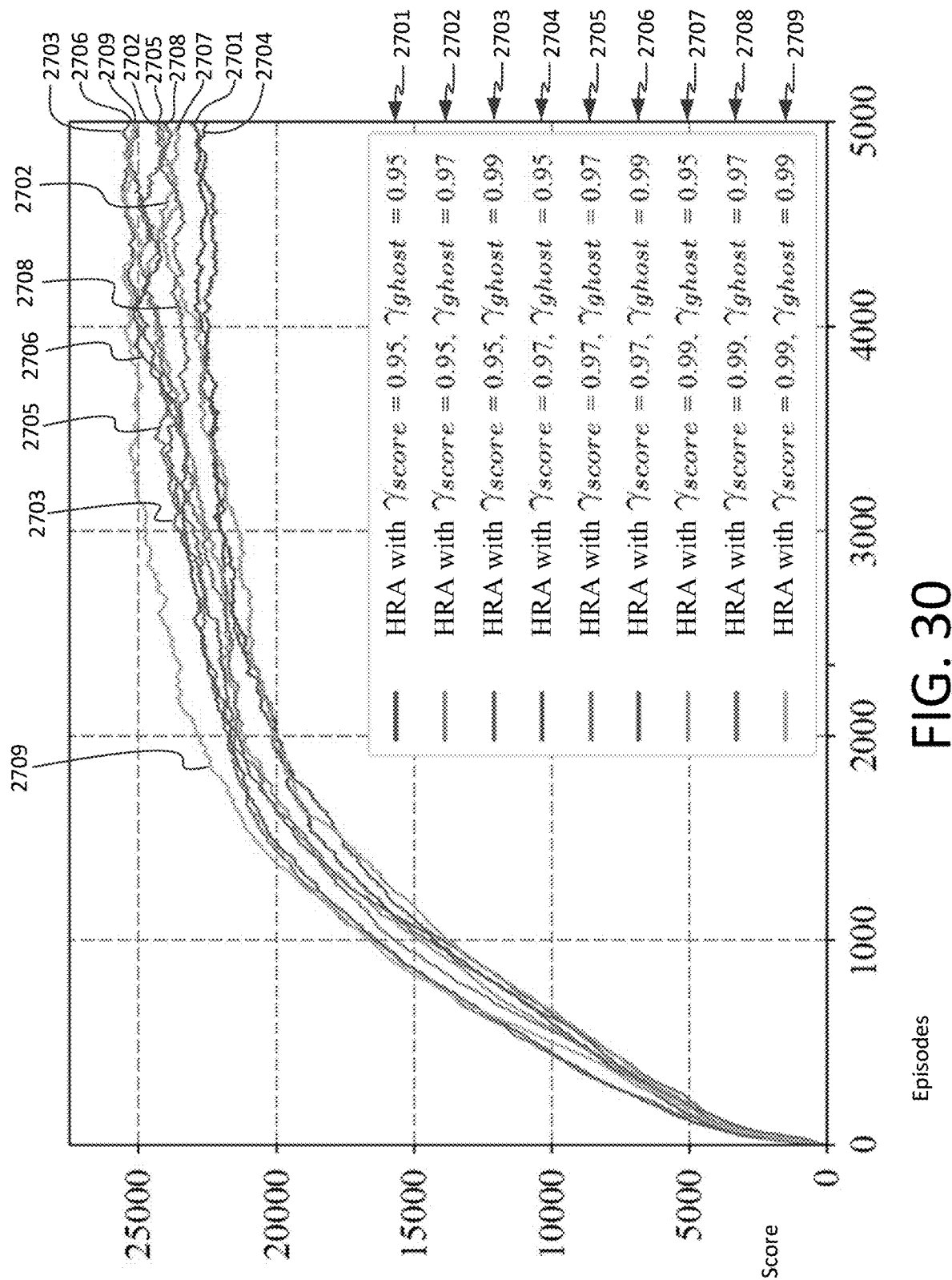
FIG. 30 illustrates training curves for HRA in the game MS. PAC-MAN over various $\gamma$ values without executive memory.

FIG. 30 illustrates training curves for HRA in the game MS. PAC-MAN over various $\gamma$ values without executive memory. Curve 2701 illustrates results for $\gamma_{score}=0.95$ and $\gamma_{ghost}=0.95$. Curve 2702 illustrates results for $\gamma_{score}=0.95$ and $\gamma_{ghost}=0.97$. Curve 2703 illustrates results for $\gamma_{score}=0.95$ and $\gamma_{ghost}=0.99$. Curve 2704 illustrates results for $\gamma_{score}=0.97$ and $\gamma_{ghost}=0.95$. Curve 2705 illustrates results for $\gamma_{score}=0.97$ and $\gamma_{ghost}=0.97$. Curve 2706 illustrates results for $\gamma_{score}=0.97$ and $\gamma_{ghost}=0.99$. Curve 2707 illustrates results for $\gamma_{score}=0.99$ and $\gamma_{ghost}=0.95$. Curve 2708 illustrates results for $\gamma_{score}=0.99$ and $\gamma_{ghost}=0.97$. Curve 2709 illustrates results for $\gamma_{score}=0.99$ and $\gamma_{ghost}=0.99$.

As shown in the results of FIG. 30, all tested $\gamma$ values appear to yield good results. Those results generalize over random human starts. High γ values for the ghosts tend to perform better than lower γ values. The tested γ values for score appear to have relatively little impact on overall results.

Figure 31:
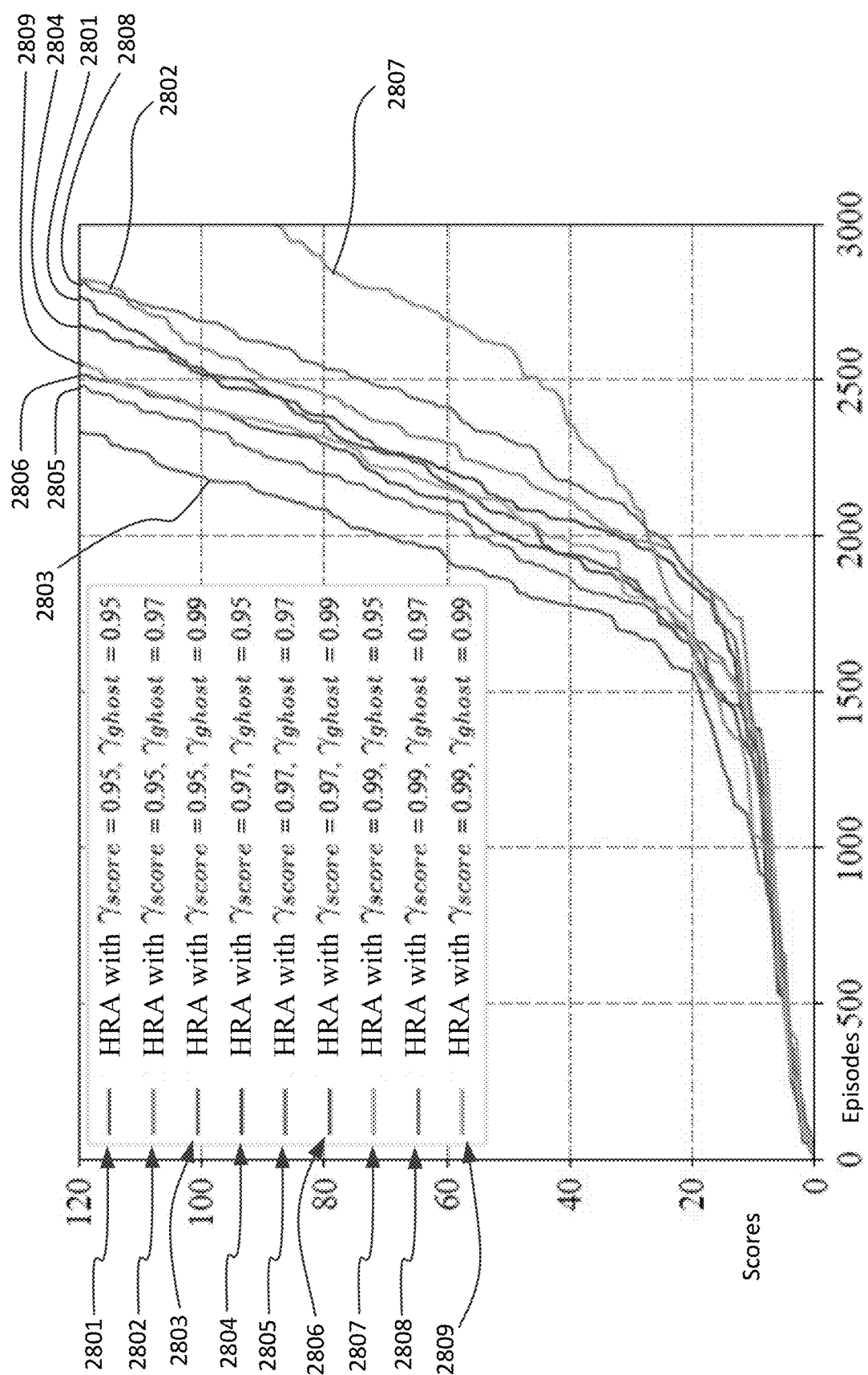
FIG. 31 illustrates training curves for HRA in the game MS. PAC-MAN for various $\gamma$ values with executive memory.

FIG. 31 illustrates training curves for HRA in the game MS. PAC-MN for various γ values with executive memory. Curve 2801 illustrates results for $\gamma_{score}$=0.95 and $\gamma_{ghost}$=0.95. Curve 2802 illustrates results for $\gamma_{score}$=0.95 and $\gamma_{ghost}$=0.97. Curve 2803 illustrates results for $\gamma_{score}$=0.95 and $\gamma_{ghost}$=0.99. Curve 2804 illustrates results for $\gamma_{score}$=0.97 and $\gamma_{ghost}$=0.95. Curve 2805 illustrates results for $\gamma_{score}$=0.97 and $\gamma_{ghost}$=0.97. Curve 2806 illustrates results for $\gamma_{score}$=0.97 and $\gamma_{ghost}$=0.99. Curve 2807 illustrates results for $\gamma_{score}$=0.99 and $\gamma_{ghost}$=0.95. Curve 2808 illustrates results for $\gamma_{score}$=0.99 and $\gamma_{ghost}$=0.97. Curve 2809 illustrates results for $\gamma_{score}$=0.99 and $\gamma_{ghost}$=0.99.

As shown in the results of FIG. 31, the observations from FIG. 30 appear to continue to hold and there is a bit more variation in level passing efficiency with the training curves with executive memory compared to the training curves without executive memory.

As should be appreciated, the disclosed examples, experiments, processes, methods, systems, and aspects described above are for the purpose of illustrating the present methods and systems and are not intended to limit the disclosure to a particular sequence of steps. For example, steps may be performed in differing order, two or more steps may be performed concurrently, additional steps may be performed, and disclosed steps may be excluded without departing from the present disclosure. Similarly, additional configurations may be used to practice the methods and systems herein and/or some components described may be excluded without departing from the methods and systems disclosed herein.

Overview

Disclosed embodiments related to, among other things, separating concerns for a single-agent task both analytically, by determining conditions for stable learning, as well as empirically, through evaluation on two domains. By giving agents a reward function that depends on the communication actions of other agents, it can be made to listen to requests from other agents to different degrees. How well it listens can depend on the specific reward function. In general, agents can be made to fully ignore other agents, fully be controlled by other agents or something in between, where it makes a trade-off between following the request of another agent and ignoring it. An agent that retains some level of independence can in some cases yield strong overall performance. In addition, an SoC model can convincingly beat (single-agent) state-of-art methods on a challenging domain. An SoC model can use domain-specific knowledge to improve performance. RL can be scaled up such that it can be applied in specific real-world systems, for example complex dialogue systems or bot environments. In this context, using domain knowledge to achieve good performance on an otherwise intractable domain is acceptable. SoC is illustrated in at least two specific settings, called action aggregation, and ensemble RL. SoC's expressive power is wider and that other SoC settings are possible.

The SoC configuration used in the some embodiments included a high-level agent with only communication actions and a low-level agent that only performs environment actions. As an example of a variation, alternative configurations that use more than two agents can be substituted. The reward function in reinforcement learning often plays a double role: it acts as both the performance objective, specifying what type of behavior is desired, as well as the learning objective, that is, the feedback signal that modifies the agent's behavior. That these two roles do not always combine well into a single function becomes clear from domains with sparse rewards, where learning can be prohibitively slow. The SoC model addresses this by fully separating the performance objective, including the reward function of the environment, from the learning objectives of the agents, including their reward functions.

Separation between performance objective and learning objective further separates the SoC model from options. Options, once learned, aggregate the rewards obtained from the environment. Hence, the top-level agent of a hierarchical system based on options learns a value function based on the environment reward.

In some examples, there is a framework for solving single-agent tasks using multiple agents where different agents are concerned with different parts of the task. Conditions under which convergence of Q-learning occurs (to a recursive optimal policy) were identified and validated.

Disclosed embodiments further relate to a Hybrid Reward Architecture (HRA). One of the strengths of HRA is that it can exploit domain knowledge to a much greater extent than single-head methods. This was shown clearly by the fruit collection task: while removing irrelevant features caused a large improvement in performance for HRA, for DQN no effective learning occurred when provided with the same network architecture. Furthermore, separating the pixel image into multiple binary channels only caused a small improvement in the performance of A3C over learning directly from pixel. This demonstrates that the reason that modern deep RL struggle with Ms. Pac-Man is not related to learning from pixels; the underlying issue is that the optimal value function for Ms. Pac-Man cannot easily be mapped to a low-dimensional representation.

HRA performs well in the MS. PAC-MAN experiment, in part, by learning close to 1800 general value functions. This results in an exponential breakdown of the problem size: whereas the input state-space corresponding with the binary channels is in the order of $10^{77}$, each GVF has a state-space in the order of $10^3$ states, small enough to be represented without function approximation. While a deep network for representing each GVF could have been used, using a deep network for such small problems can hurt more than it helps, as evidenced by the experiments on the fruit collection domain.

Many real-world tasks allow for reward decomposition. Even if the reward function can only be decomposed in two or three components, reward decomposition can provide significant improvements due to the exponential decrease of the problem size that decomposition might cause.

EXAMPLE PROCESSES

Figure 32:
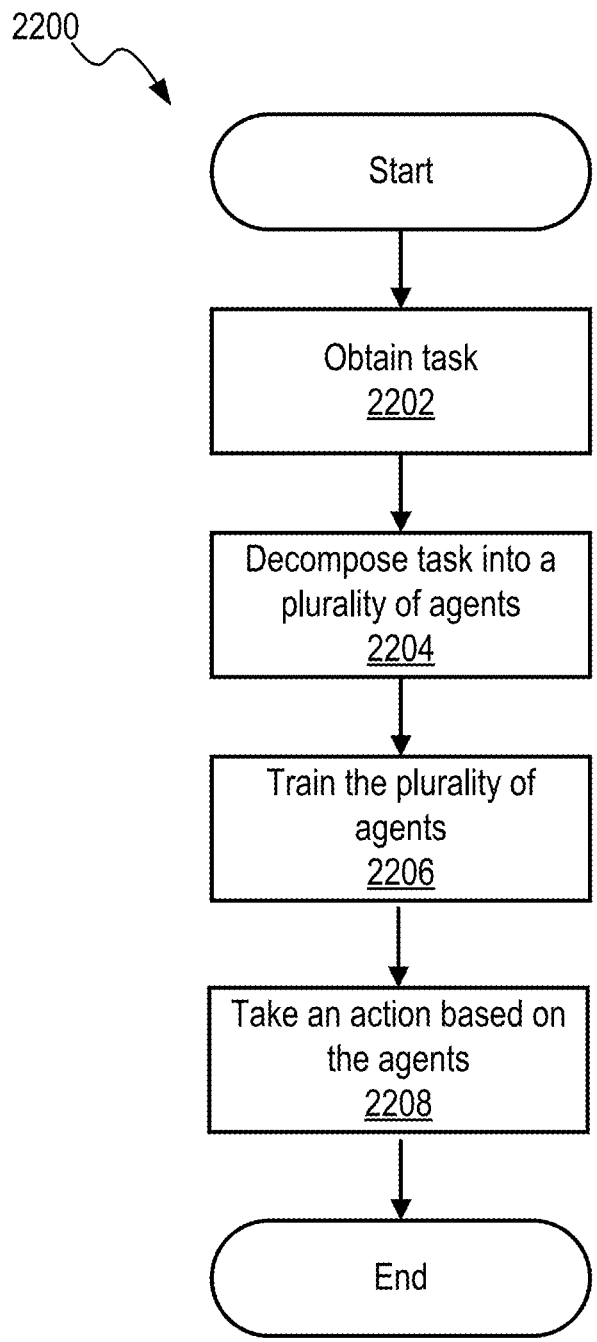
FIG. 32 illustrates an example process for taking an action with respect to a task using separation of concerns.

FIG. 32 illustrates an example process 2200 for taking an action with respect to a task using separation of concerns. The process 2200 can begin with the flow moving to operation 2202, which involves obtaining the task. Following operation 2202, the flow can move to operation 2204, which involves decomposing the task into a plurality of agents. Following operation 2204, the flow can move to operation 2206, which involves training the plurality of agents. Following operation 2206, the flow can move to operation 2208, which involves taking an action with respect to the task based on the agents.

As should be appreciated, the disclosed steps of process 2200 are described for purposes of illustrating the present methods and systems and are not intended to limit the disclosure to a particular sequence of steps. For example, the steps may be performed in differing order, two or more steps may be performed concurrently, additional steps may be performed, and disclosed steps may be excluded without departing from the present disclosure.

Figure 33:
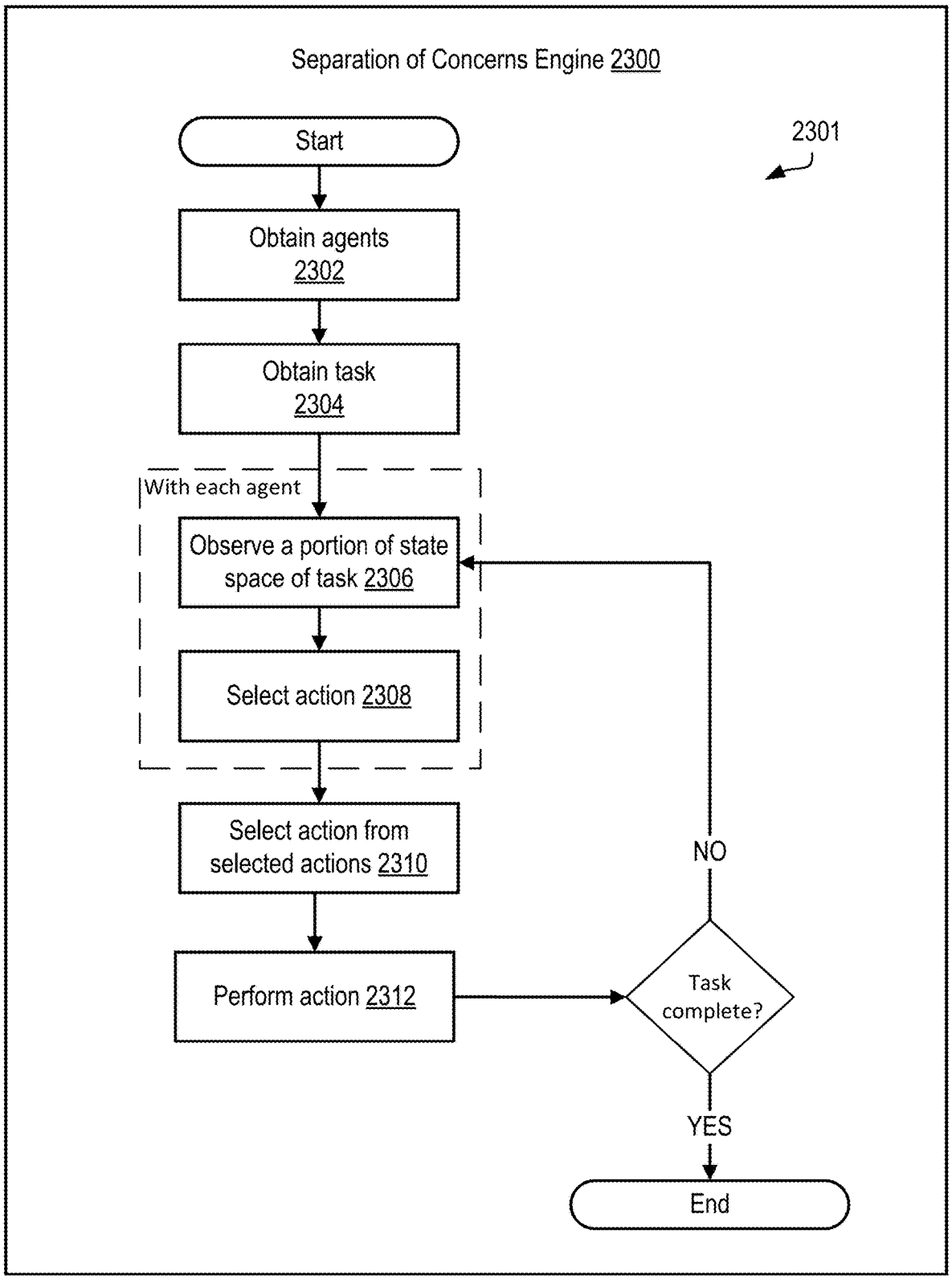
FIG. 33 illustrates an example separation of concerns engine implementing a process for completing a task using separation of concerns.

FIG. 33 illustrates an example separation of concerns engine 2300 implementing a process 2301 for completing a task using separation of concerns. The process can begin with the flow moving to operation 2302, which involves obtaining agents. Following operation 2302, the flow can move to operation 2304, which involves obtaining a task. Following operation 2304, the flow can move to operation 2306 and then operation 2308. Operation 2306 involves observing a portion of the state space of the task. Operation 2308 involves selecting an action. Operations 2306 and 2308 can be performed for each agent. Following operation 2306 and operation 2308, the flow can move to operation 2310, which involves selecting an action from the actions selected with each agent. Following operation 2310, the flow can move to operation 2312, which involves performing the selected action with respect to the task. If the task is complete following the action, the method can end. If the task is not complete, the flow can return to operation 2306 where a portion of an updated state space of the task is observed.

As should be appreciated, the various devices, processes, components, etc., described with respect to FIG. 33 are not intended to limit the systems and methods to the particular aspects described. Accordingly, additional configurations may be used to practice the methods and systems herein and/or some components described may be excluded without departing from the methods and systems disclosed herein.

Figure 34:
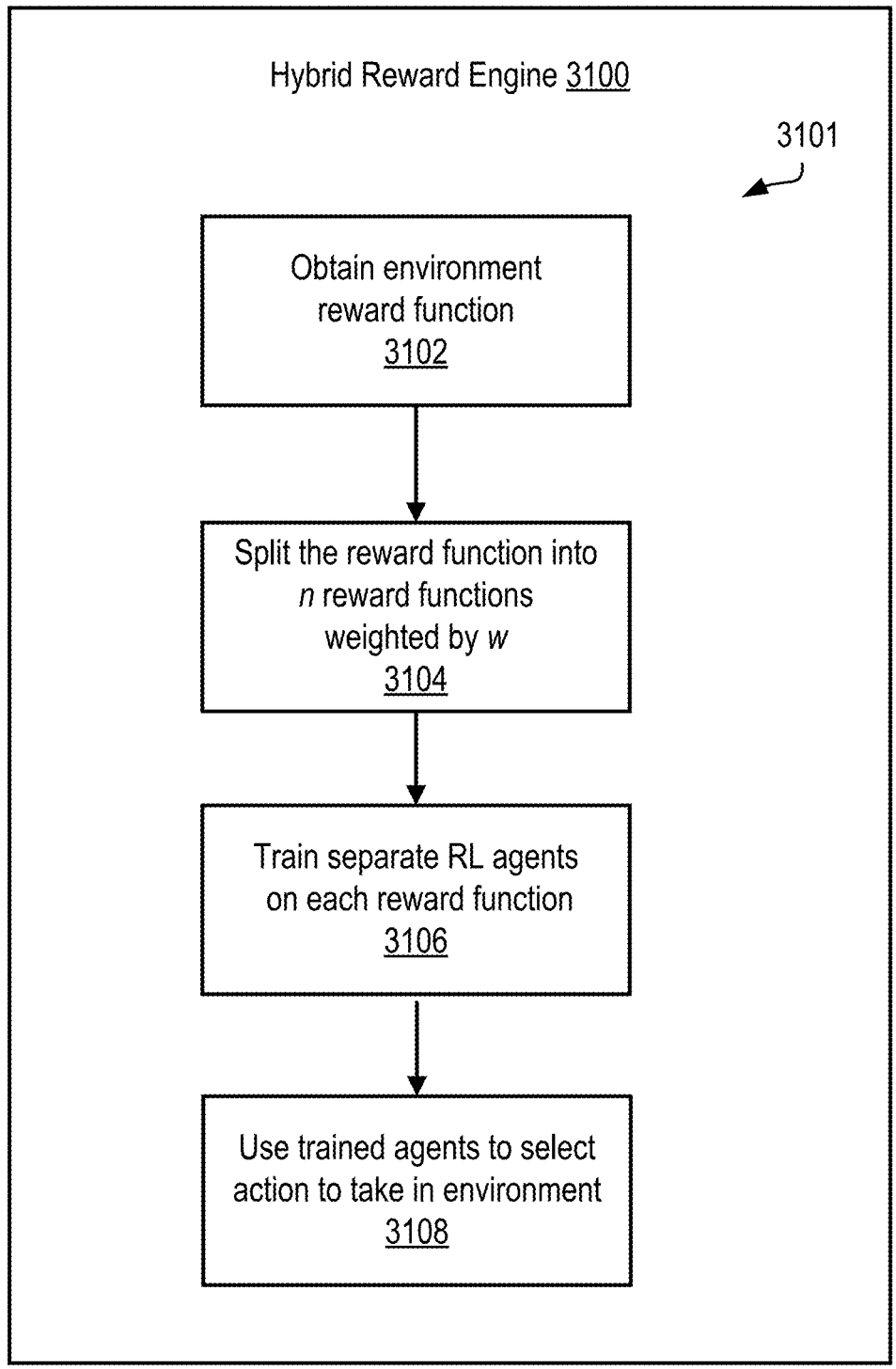
FIG. 34 illustrates an example hybrid reward engine.

FIG. 34 illustrates an example hybrid reward engine 3100, including a process 3101 for selecting an action to take in an environment based on a hybrid reward. The process 3101 can begin with operation 3102, which involves obtaining a reward function associated with an environment. After operation 3102, the flow can move to operation 3104, which involves splitting the reward function into n reward functions weighted by w. After operation 3104, the flow can move to operation 3106, which involves training separate reinforcement learning (RL) agents on each reward function. After operation 3106, the flow can then move to operation 3108, which involves using trained agents to select an action to take in the environment.

As should be appreciated, the various methods, devices, components, etc., described with respect to FIG. 34 are not intended to limit systems or methods to being performed by or include the particular components described. Accordingly, additional configurations may be used to practice the methods and systems herein and/or components described may be excluded without departing from the aspects disclosed herein.

Figure 35:
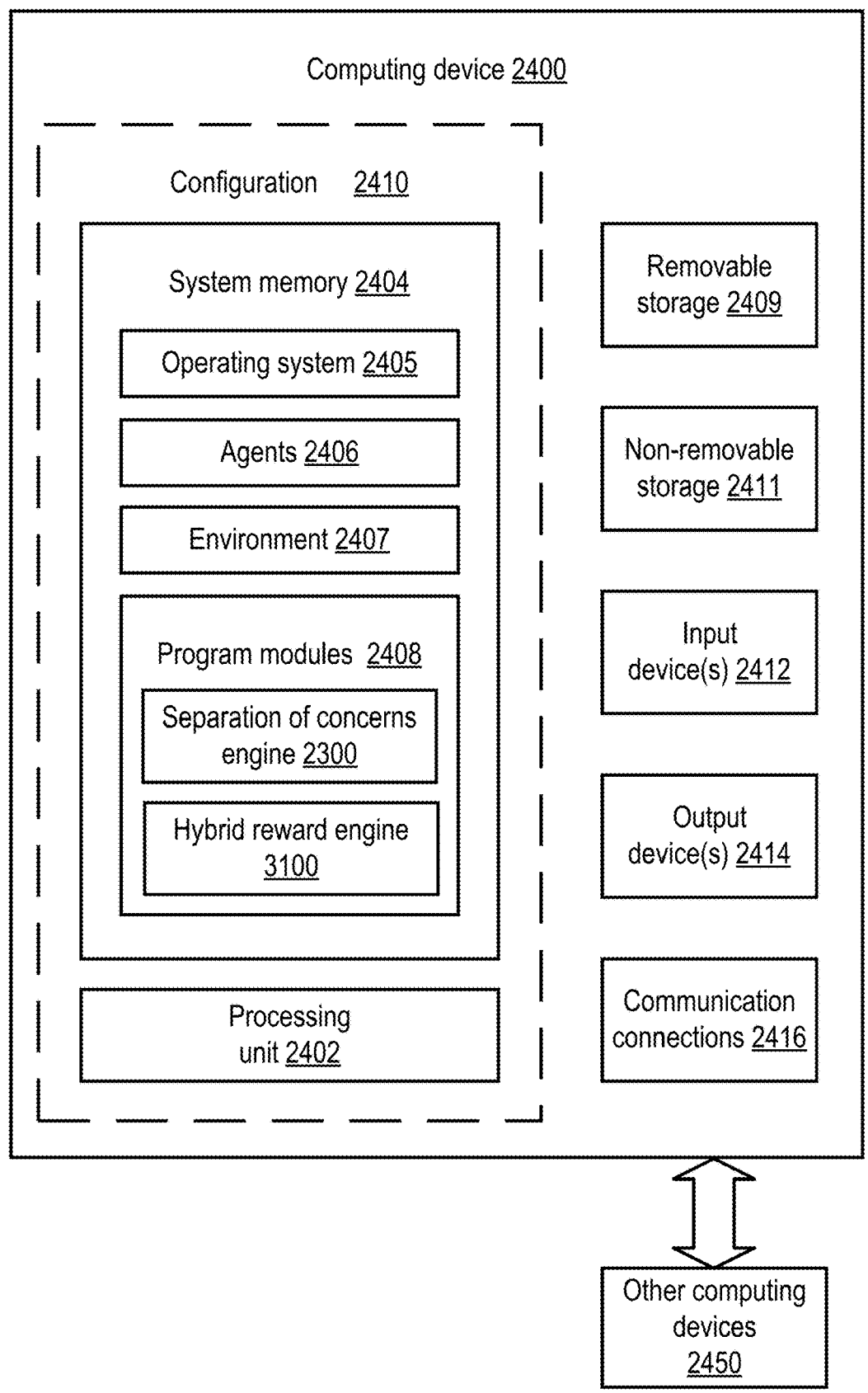
FIG. 35 illustrates physical components of a computing device with which aspects of the disclosure may be practiced.
Figure 36A:
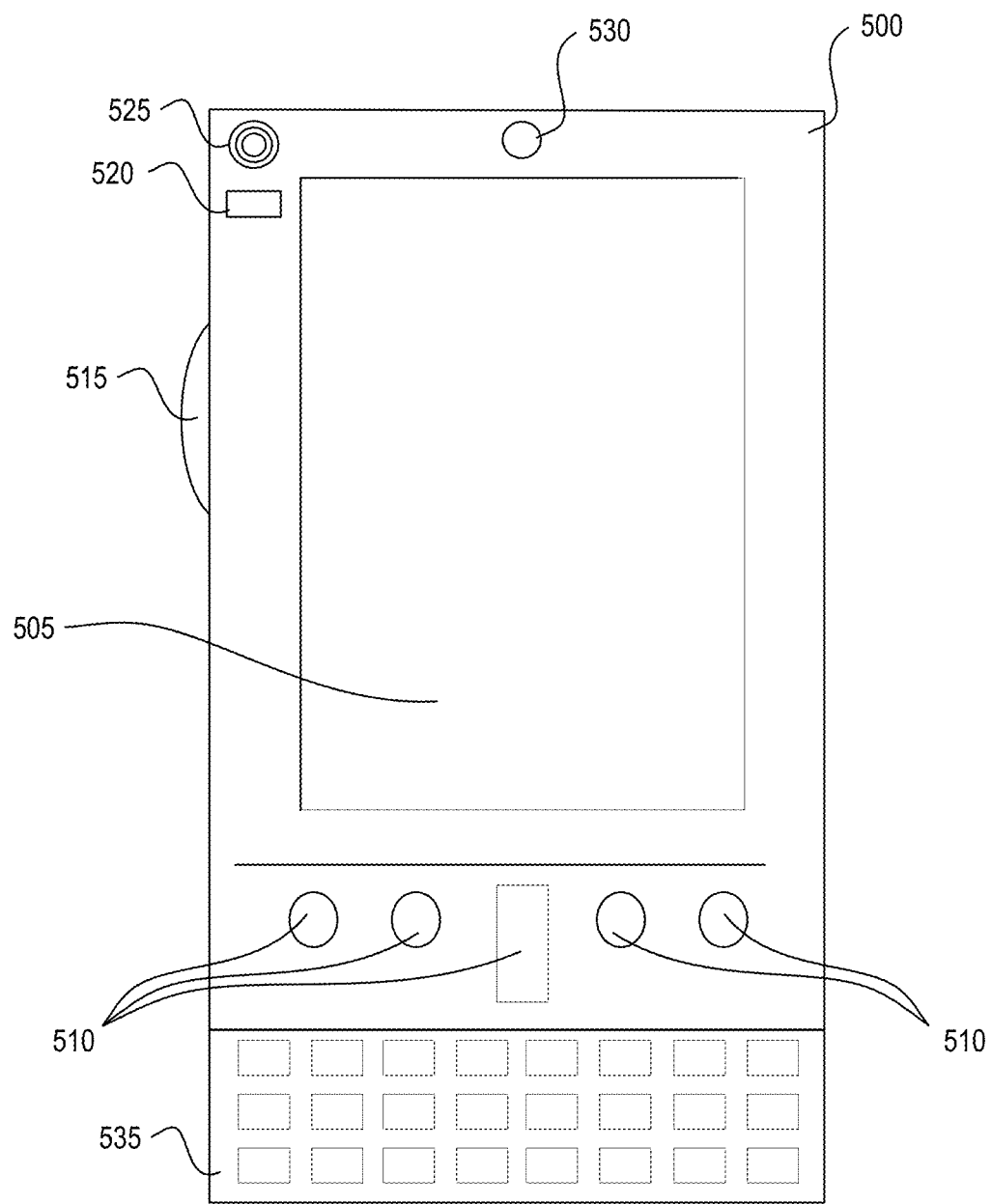
FIG. 36A illustrates an example mobile computing device.
Figure 36B:
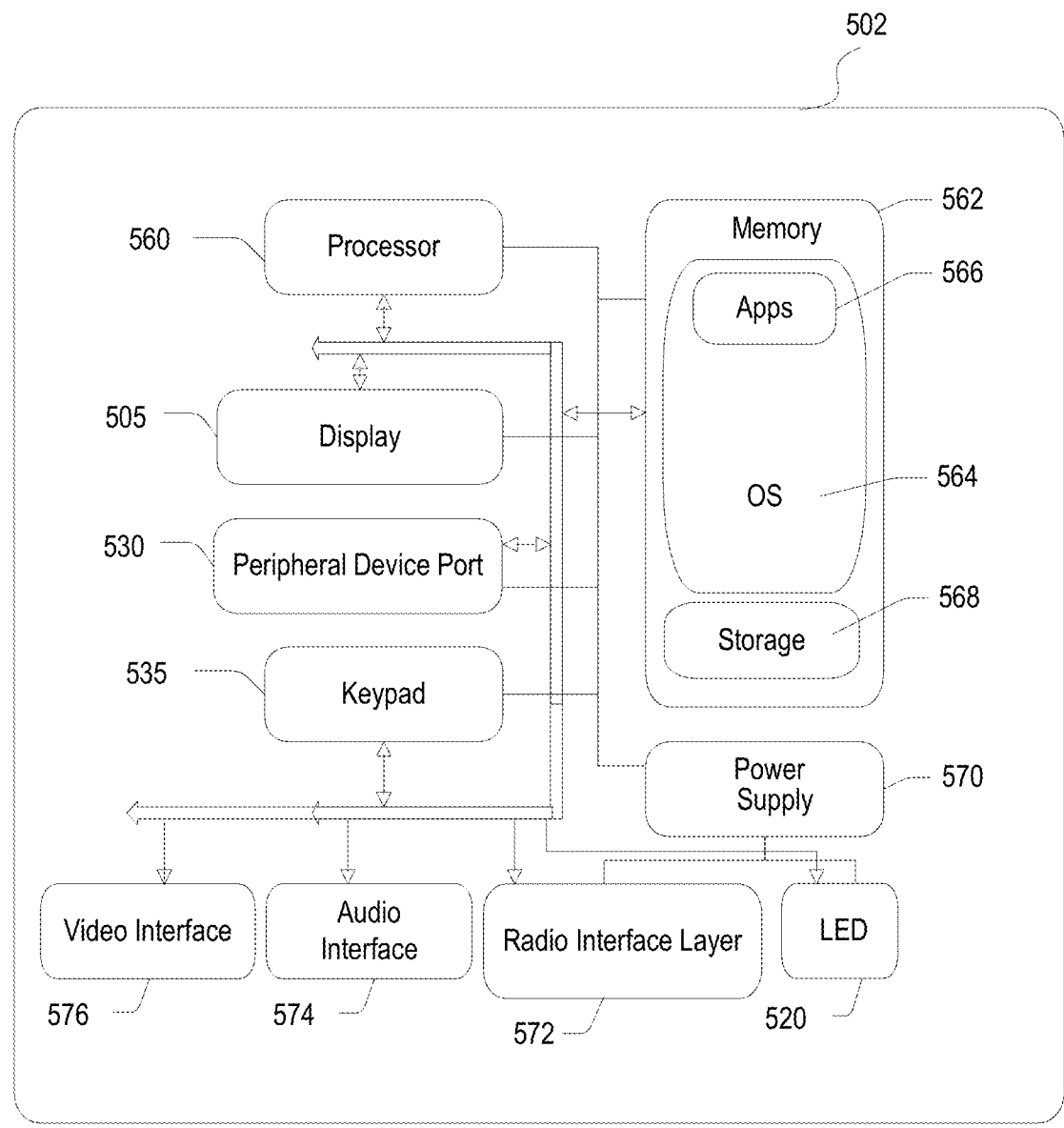
FIG. 36B illustrates the architecture of one aspect of a mobile computing device.
Figure 37:
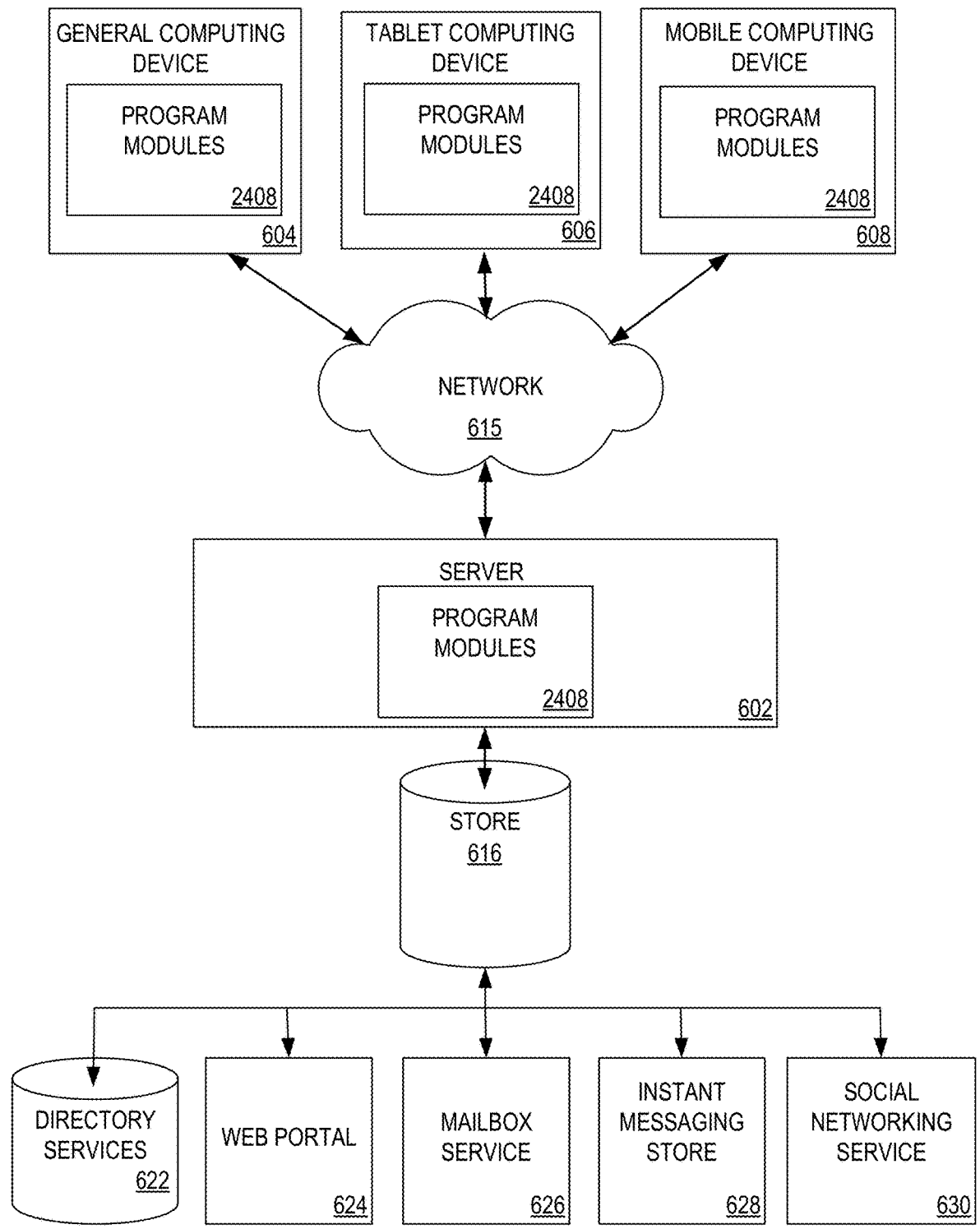
FIG. 37 illustrates an aspect of an architecture of a system for processing data received at a computing system from a remote source, such as a general computing device, tablet computing device, or mobile computing device.

FIG. 35, FIG. 36, FIG. 37 and the associated descriptions provide a discussion of a variety of operating environments in which aspects of the disclosure may be practiced. However, the devices and systems illustrated and discussed with respect to FIGS. 35-37 are for purposes of example and illustration and are not limiting of a vast number of computing device configurations that may be utilized for practicing aspects of the disclosure, as described herein.

FIG. 35 is a block diagram illustrating physical components (e.g., hardware) of a computing device 2400 with which aspects of the disclosure may be practiced. The computing device components described below may have computer executable instructions for implementing the separation of concerns engine 2300 and the hybrid reward engine 3100, among or other aspects disclosed herein. In a basic configuration, the computing device 2400 may include at least one processing unit 2402 (e.g., a central processing unit) and system memory 2404. Depending on the configuration and type of computing device, the system memory 2404 can comprise, but is not limited to, volatile storage (e.g., random access memory), non-volatile storage (e.g., read-only memory), flash memory, or any combination of such memories.

The system memory 2404 may include one or more agents 2406 and training data 2407. The training data 2407 may include data used to train the agents 2406. The system memory 2404 may include an operating system 2405 suitable for running the separation of concerns engine 2300 or one or more aspects described herein. The operating system 2405, for example, may be suitable for controlling the operation of the computing device 2400. Embodiments of the disclosure may be practiced in conjunction with a graphics library, a machine learning library, other operating systems, or any other application program and is not limited to any particular application or system.

A basic configuration 2410 is illustrated in FIG. 35 by those components within a dashed line. The computing device 2400 may have additional features or functionality. For example, the computing device 2400 may also include additional data storage devices (removable and/or non-removable) such as, for example, magnetic disks, optical disks, or tape. Such additional storage is illustrated in FIG. 35 by a removable storage device 2409 and a non-removable storage device 2411.

As stated above, a number of program modules and data files may be stored in the system memory 2404. While executing on the processing unit 2402, the program modules 2408 may perform processes including, but not limited to, the aspects, as described herein. Other program modules may also be used in accordance with aspects of the present disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip where each or many of the components illustrated in FIG. 35 may be integrated onto a single integrated circuit. Such a system-on-a-chip device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 2400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 2400 may also have one or more input device(s) 2412 such as a keyboard, a mouse, a pen, a sound or voice input device, a touch or swipe input device, and other input devices. The output device(s) 2414 such as a display, speakers, a printer, actuators, and other output devices may also be included. The aforementioned devices are examples and others may be used. The computing device 2400 may include one or more communication connections 2416 allowing communications with other computing devices 2450. Examples of suitable communication connections 2416 include, but are not limited to, radio frequency transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules 2408. The system memory 2404, the removable storage device 2409, and the non-removable storage device 2411 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 2400. Any such computer storage media may be part of the computing device 2400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency, infrared, and other wireless media.

FIGS. 36A and 36B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 36A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative aspects, mobile computing device 500 may incorporate more or fewer input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 36B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as email or other messages used by an email application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500, including the instructions for determining relationships between users, as described herein.

The system 502 has a power supply 570, which may be implemented as one or more batteries. The power supply 570 may further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via an audio transducer 525 (e.g., audio transducer 525 illustrated in FIG. 5A). In the illustrated embodiment, the visual indicator 520 is a light emitting diode (LED) and the audio transducer 525 may be a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of peripheral device 530 (e.g., on-board camera) to record still images, video stream, and the like. Audio interface 574, video interface 576, and keyboard 535 may be operated to generate one or more messages as described herein.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

As should be appreciated, FIGS. 33A and 33B are described for purposes of illustrating the present methods and systems and are not intended to limit the disclosure to a particular sequence of steps or a particular combination of hardware or software components.

FIG. 37 illustrates one aspect of the architecture of a system for processing data received at a computing system from a remote source, such as a general computing device 604 (e.g., personal computer), tablet computing device 606, or mobile computing device 608, as described above. Content displayed at server device 602 may be stored in different communication channels or other storage types. For example, various messages may be received and/or stored using a directory service 622, a web portal 624, a mailbox service 626, an instant messaging store 628, or a social networking service 630. The program modules 2408 may be employed by a client that communicates with server device 602, and/or the program modules 2408 may be employed by server device 602. The server device 602 may provide data to and from a client computing device such as a general computing device 604, a tablet computing device 606 and/or a mobile computing device 608 (e.g., a smart phone) through a network 615. By way of example, the aspects described herein may be embodied in a general computing device 604 (e.g., personal computer), a tablet computing device 606 and/or a mobile computing device 608 (e.g., a smart phone). Any of these embodiments of the computing devices may obtain content from the store 616, in addition to receiving graphical data useable to either be pre-processed at a graphic-originating system or post-processed at a receiving computing system.

As should be appreciated, FIG. 37 is described for purposes of illustrating the present methods and systems and is not intended to limit the disclosure to a particular sequence of steps or a particular combination of hardware or software components.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
obtaining a reward function associated with an environment, wherein the environment describes multiple state variables;
splitting the reward function into a plurality of sub-reward functions according to a number of state variables that affect each sub-reward function;
training a plurality of reinforcement-learning agents using the plurality of sub-reward functions; and
applying an aggregator function that receives action-values from each of the plurality of reinforcement-learning agents and combines the received action-values into a set of action-values.

2. The method of claim 1, further comprising: taking an action with respect to the environment based, at least in part, on the set of action-values.

3. The method of claim 1, wherein the action-values from each of the plurality of reinforcement-learning agents comprise a value for each action, and wherein each agent of the plurality of reinforcement-learning agents provides action-values to the aggregator function at each time step.

4. The method of claim 1, wherein combining the action-values comprises applying a linear combination scheme, wherein the linear combination scheme is a same linear combination scheme used for splitting the reward function into the plurality of sub-reward functions.

5. The method of claim 1, wherein each of the plurality of reinforcement-learning agents is associated with a single sub-reward function.

6. The method of claim 1, wherein splitting the reward function into the plurality of sub-reward functions comprises minimizing the number of state variables that each sub-reward function is affected by.

7. The method of claim 1, further comprising applying domain knowledge in a manner selected from the group consisting of: removing irrelevant features, identifying terminal states, and using pseudo-reward functions.

8. The method of claim 7, further comprising applying domain knowledge by using pseudo-reward functions, wherein each agent represents a general value function.

9. The method of claim 7, wherein the domain knowledge is applied to each agent individually.

10. A computer-implemented method comprising:
providing a current environment state to a trained reinforcement learning agent, wherein the trained reinforcement learning agent comprises a plurality of heads each associated with a respective single reward function depending on a subset of variables of the current environment state, wherein at least one head of the plurality of heads comprises a general value function specific to a variable of the subset of variables;
producing a plurality of action-values of the current environment state with the plurality of heads;
aggregating the plurality of action-values; and
selecting an action to take with respect to the current environment state based in part on the aggregated plurality of action values.

11. The method of claim 10, wherein aggregating the plurality of action-values comprises applying a scheme selected from the group consisting of: a linear combination scheme, a max scheme, a voting-based aggregation scheme, and an excepted state-action-reward-state-action update rule.

12. The method of claim 10, wherein at least one of the heads is of a type selected from the group consisting of: a diversification head configured to provide action values generated randomly, an exploration head configured to provide action values that prioritize exploration, and an executive memory head configured to provide action values that prioritize performing actions that led to a positive outcome in the past.

13. The method of claim 10, further comprising normalizing rewards from the plurality of heads.

14. A method comprising:
receiving a single-agent task having a set of states, a set of environment actions, and a reward function; and
decomposing the single-agent task by:
instantiating a plurality of non-cooperating agents, each agent of the plurality of non-cooperating agents having a defined output set and a sub-reward function associated with an aspect of the task, wherein each sub-reward function is a decomposition of the reward function characterized by a low-dimensional representation, and wherein each agent of the plurality of non-cooperating agents is configured to select an output from its defined output set based, in part, on the sub-reward function associated with the aspect of the task, and provide the selected output to an aggregator; and
defining the aggregator to select an environment action from the set of environment actions based, in part, on the selected output from each agent of the plurality of non-cooperating agents.

15. The method of claim 14, wherein defining the aggregator comprises defining an aggregator that selects the environment action using a technique selected from the group consisting of: majority voting, rank voting, and Q-value generalized means maximizer.

16. The method of claim 14, further comprising training the plurality of non-cooperating agents in parallel on a same sample sequence using off-policy learning.

17. The method of claim 14, wherein the defined output set of at least one agent comprises an output associated with an action of the set of environment actions.

\* \* \* \* \*